United States Patent
Iwaki et al.

(10) Patent No.: US 7,657,435 B2
(45) Date of Patent: *Feb. 2, 2010

(54) ACOUSTIC SIGNAL TRANSMISSION METHOD AND APPARATUS WITH INSERTION SIGNAL

(75) Inventors: Satoshi Iwaki, Iruma (JP); Akira Nakayama, Hachioji (JP); Tamotsu Machino, Tokorozawa (JP); Ikuo Kitagishi, Hachioji (JP); Yukihiro Nakamura, Higashiyamato (JP)

(73) Assignee: Nippon Telegraph, Tokyo (JP)

( * ) Notice: Subject to any disclaimer, the term of this patent is extended or adjusted under 35 U.S.C. 154(b) by 956 days.

This patent is subject to a terminal disclaimer.

(21) Appl. No.: 11/200,288

(22) Filed: Aug. 8, 2005

(65) Prior Publication Data
US 2006/0153390 A1 Jul. 13, 2006

Related U.S. Application Data

(63) Continuation of application No. 09/712,945, filed on Nov. 16, 2000, now Pat. No. 6,947,893.

(30) Foreign Application Priority Data

| Nov. 19, 1999 | (JP) | 11-329914 |
| Dec. 16, 1999 | (JP) | 11-356827 |
| Dec. 22, 1999 | (JP) | 11-363811 |
| Dec. 24, 1999 | (JP) | 11-366345 |
| Dec. 24, 1999 | (JP) | 11-366346 |
| May 10, 2000 | (JP) | P2000-136716 |
| May 10, 2000 | (JP) | P2000-136717 |
| Aug. 18, 2000 | (JP) | P2000-248800 |

(51) Int. Cl.
*G10L 13/00* (2006.01)
*G01C 21/00* (2006.01)

(52) U.S. Cl. ............ 704/258; 704/270; 704/272; 701/200; 901/1

(58) Field of Classification Search .......... 704/258, 704/270, 272; 901/1; 701/200
See application file for complete search history.

(56) References Cited

U.S. PATENT DOCUMENTS 4,923,428 A  5/1990 Curran (Continued)

FOREIGN PATENT DOCUMENTS

| JP | 62-145697 | 9/1987 |
| JP | 62-183894 | 11/1987 |
| JP | 8-37511 | 2/1996 |
| JP | 11-327872 | 11/1999 |
| JP | 2000-020744 | 1/2000 |

OTHER PUBLICATIONS

Kitawaki, "*Speech Communication Technology—Speech and Acoustics Technologies for Multimedia Services*", Corona Publishing Co., Ltd., 1996 (with abstract).

(Continued)

*Primary Examiner*—Martin Lerner
(74) *Attorney, Agent, or Firm*—Nixon Peabody LLP

(57) ABSTRACT

The acoustic signal transmission method is based on generating a synthesized sound electrical signal by electrically synthesizing an audible sound signal and another signal different than the audible sound signal at the sending side, and transmitting the synthesized sound electrical signal, and extracting the another signal different than the audible sound signal from the synthesized sound electrical signal at the receiving side. Here, generation of the synthesized sound electrical signal is made by using a data hiding technique, for example. Accordingly, the acoustic signal represented by the synthesized sound electrical signal can be heard by human ears in the same way as the audible sound signal, and the synthesized another signal cannot be detected by human ears. Here, the synthesized sound electrical signal can be transmitted as a sound wave in air space, as electrical signal through a transmission line or as radio signals such as infrared and electromagnetic waves.

23 Claims, 54 Drawing Sheets

U.S. PATENT DOCUMENTS

| | | | |
|---|---|---|---|
| 5,209,695 A | 5/1993 | Rothschild | |
| 5,802,488 A | 9/1998 | Edatsune | |
| 5,960,447 A | 9/1999 | Holt et al. | |
| 5,966,691 A | 10/1999 | Kibre et al. | |
| 6,108,515 A | 8/2000 | Freeman | |
| 6,290,566 B1 | 9/2001 | Gabai et al. | |
| 6,400,826 B1 | 6/2002 | Chen et al. | |
| 6,449,377 B1 | 9/2002 | Rhoads | |
| 6,574,349 B1 | 6/2003 | Linnartz et al. | |
| 6,584,439 B1 * | 6/2003 | Geilhufe et al. | 704/270 |
| 6,650,761 B1 | 11/2003 | Rodriguez et al. | |
| 6,748,362 B1 | 6/2004 | Meyer et al. | |
| 6,779,112 B1 | 8/2004 | Guthery | |
| 6,785,814 B1 | 8/2004 | Usami et al. | |
| 6,850,555 B1 | 2/2005 | Barclay | |
| 6,947,893 B1 | 9/2005 | Iwaki et al. | |
| 7,044,395 B1 * | 5/2006 | Davis et al. | 235/494 |
| 7,120,251 B1 * | 10/2006 | Kawada et al. | 380/201 |
| 2002/0193989 A1 * | 12/2002 | Geilhufe et al. | 704/208 |
| 2003/0093281 A1 * | 5/2003 | Geilhufe et al. | 704/275 |

OTHER PUBLICATIONS

Nikkei Electronics, "*Special Issue—Digital Signal Processing, 'Electronic Watermark' protects multimedia age*", pp. 99-124, No. 683, Feb. 24, 1997 (with abstract).

Nikkei Electronics, "*Digital Signal Processing, Data hiding technique to support electronic watermark (part one)*", pp. 149-162, No. 683, Feb. 24, 1997 (with abstract).

Nikkei Electronics, "*Digital Signal Processing, Data hiding technique to support electronic watermark (part two)*", pp. 1153-1168, No. 684, Mar. 10, 1997 (with abstract).

* cited by examiner

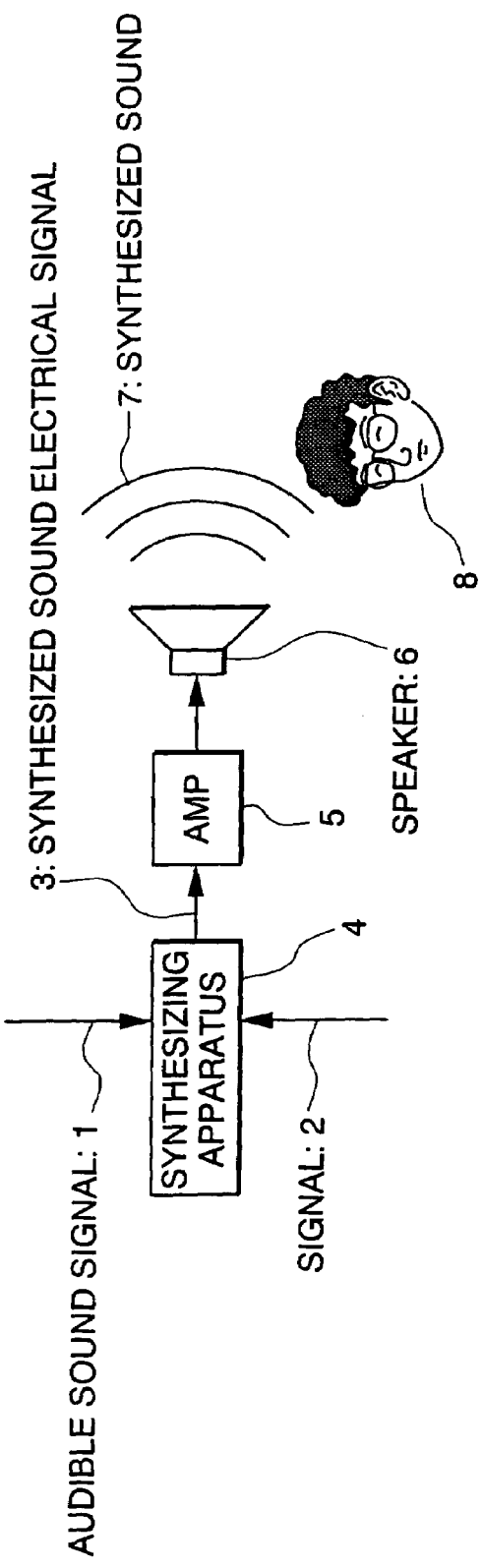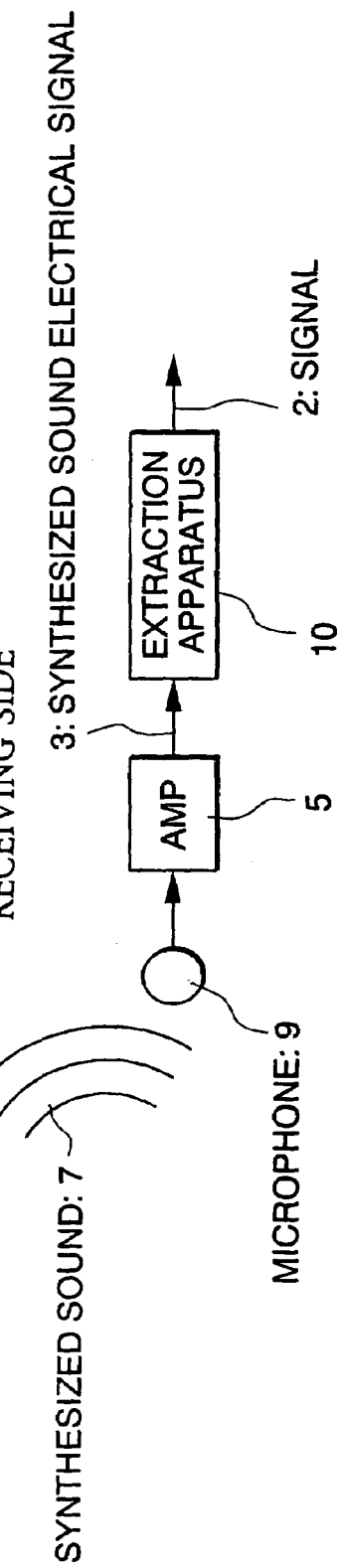

SENDING SIDE

RECEIVING SIDE

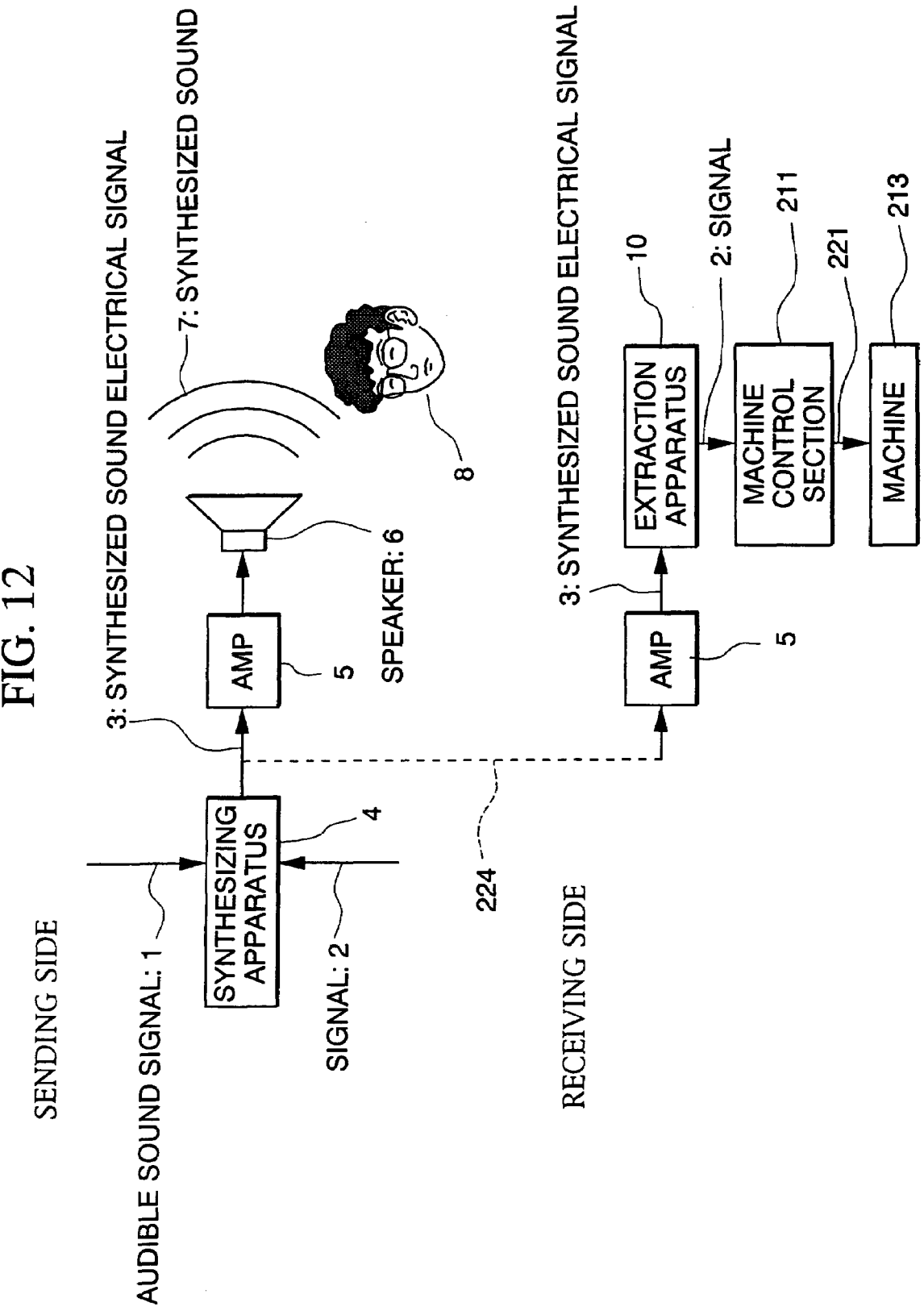

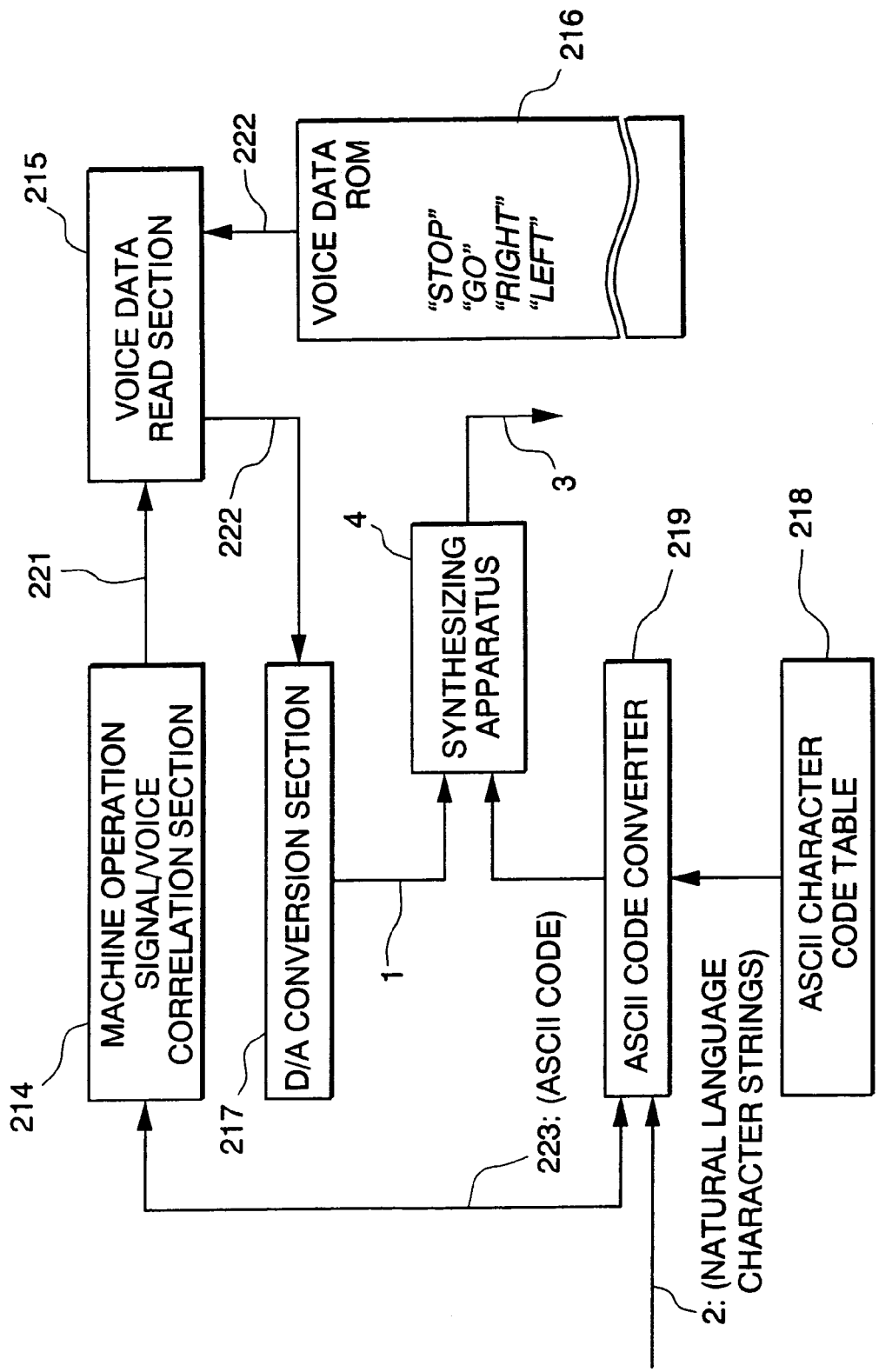

FIG. 16
| MACHINE OPERATION SIGNAL A (NATURAL LANGUAGE CHARACTER STRINGS) | S,T,O,P | G,O | R,I,G,H,T | L,E,F,T |
|---|---|---|---|---|
| MACHINE OPERATION SIGNAL B (MAN-MADE CODES) | (0,0) | (0,1) | (1,0) | (1,1) |
| VOICE SIGNAL | "STOP" | "GO" | "RIGHT" | "LEFT" |
| MOTION PATTERN (MOTION DIRECTION) | 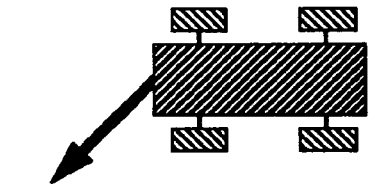 | 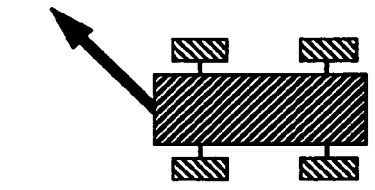 | 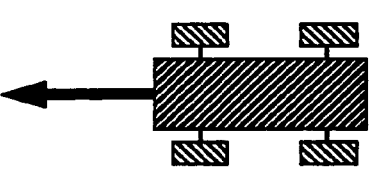 | 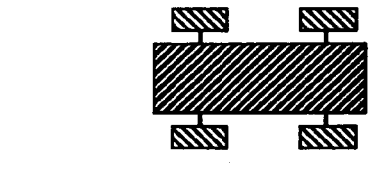 |

FIG. 17

| VOICE SIGNAL | "STOP" | "HEAT" | "COOL" | "AIR" |
|---|---|---|---|---|
| MACHINE OPERATION SIGNAL A (NATURAL LANGUAGE CHARACTER STRINGS) | S,T,O,P | H,E,A,T | C,O,O,L | A,I,R |
| MACHINE OPERATION SIGNAL B (MAN-MADE CODES) | (0,0) | (0,1) | (1,0) | (1,1) |
| AIR CONDITIONING OPERATION | STOP | WARM | COOL | BLOW AIR |

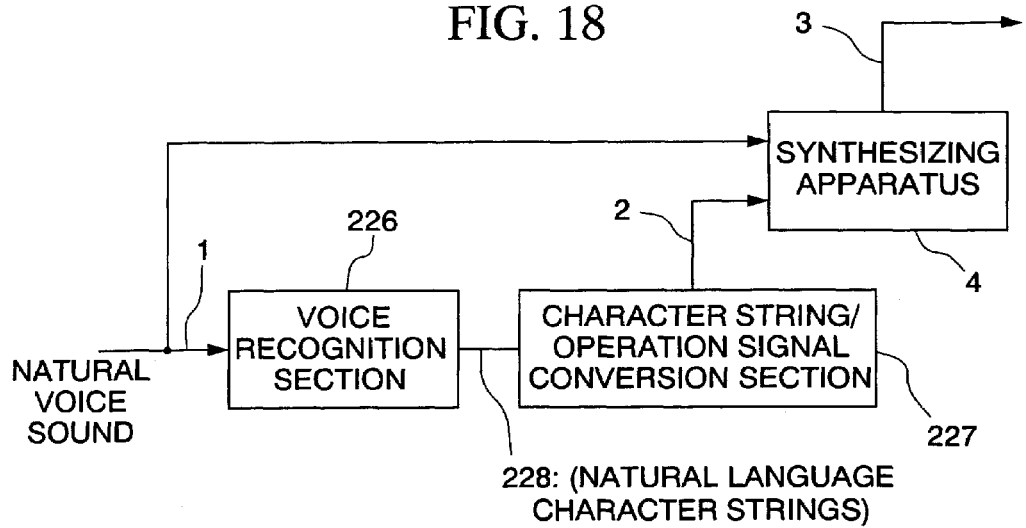
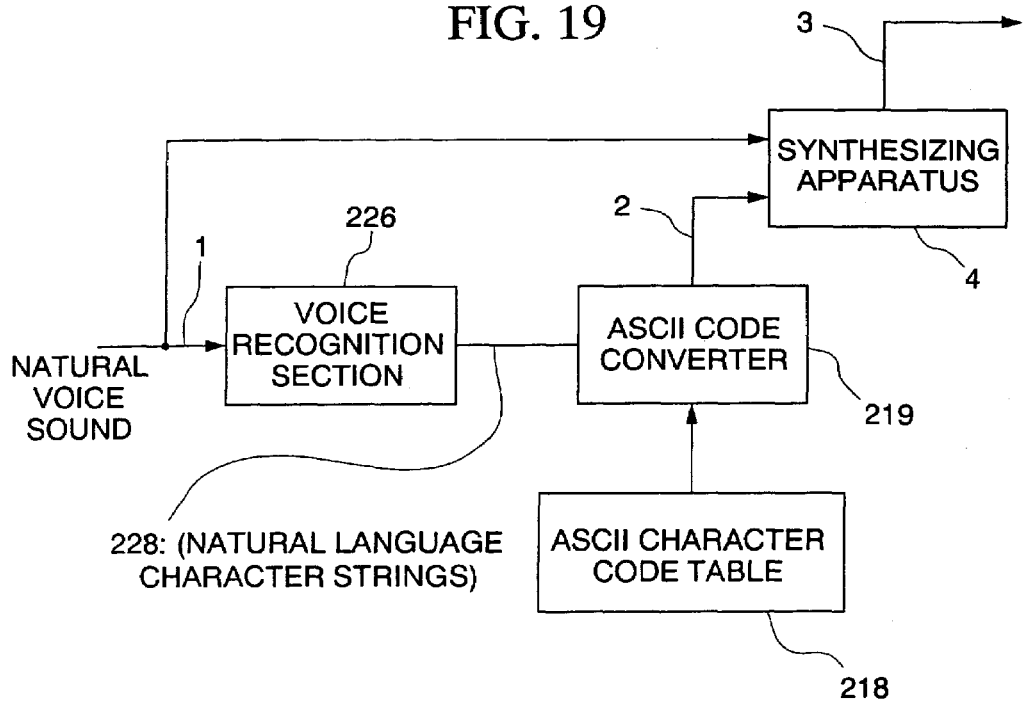

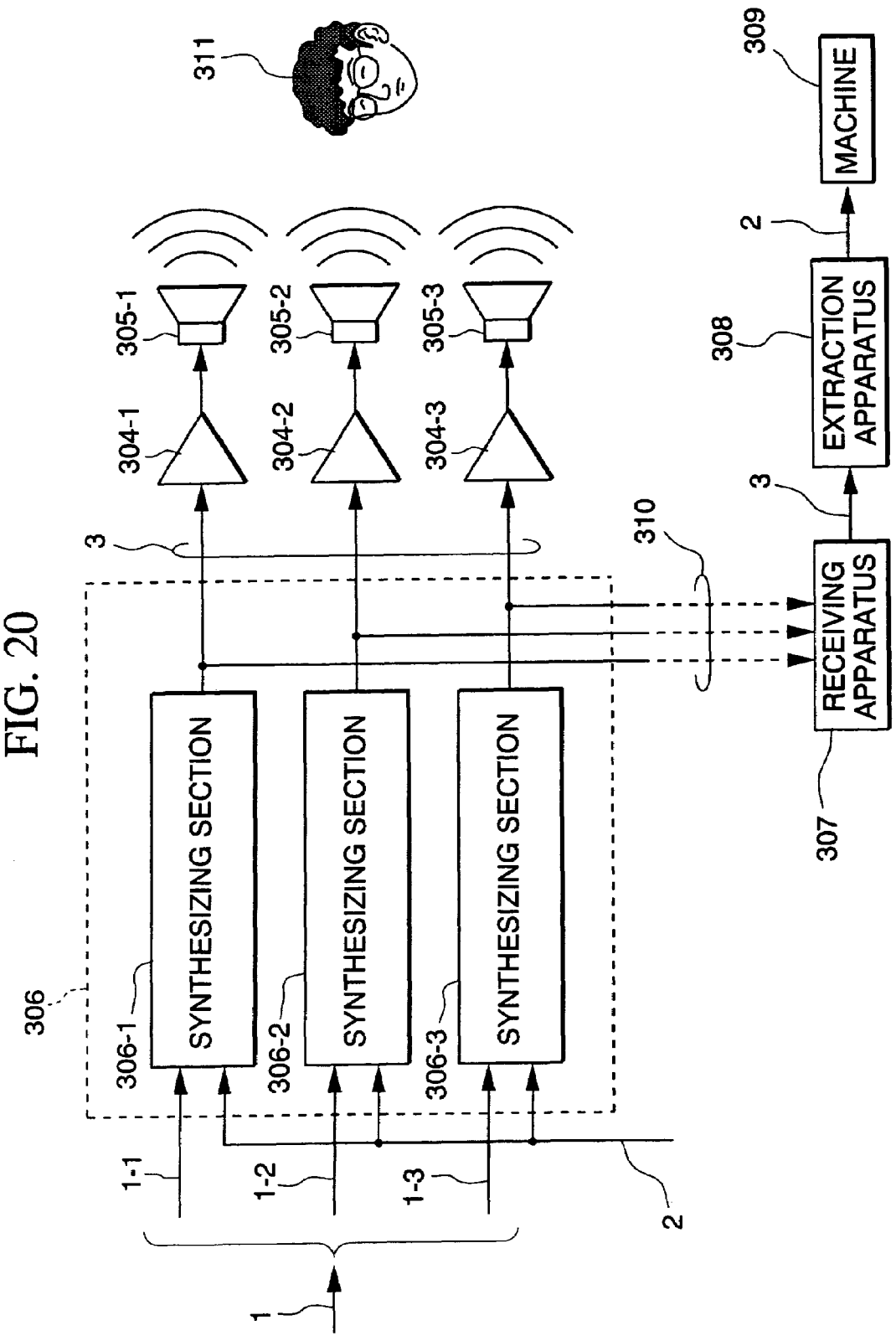

| "0" SENDING | | | | |
|---|---|---|---|---|
| S1 | S2 | S3 | S4 | S5 |
| LPF SIDE | | LPF SIDE | | LPF SIDE |
| "1" SENDING | | | | |
| S1 | S2 | S3 | S4 | S5 |
| | LPF SIDE | | LPF SIDE | |

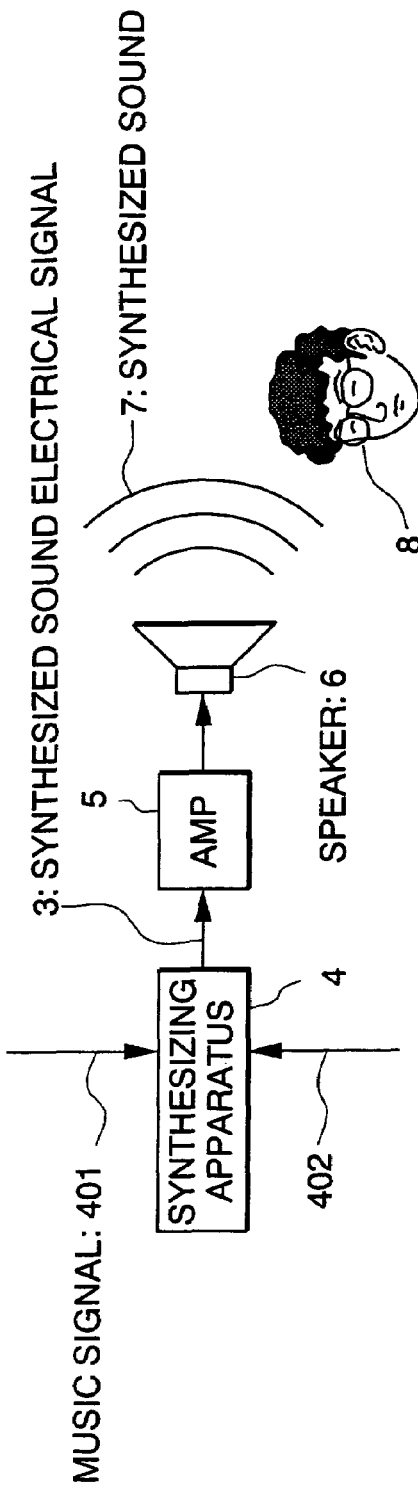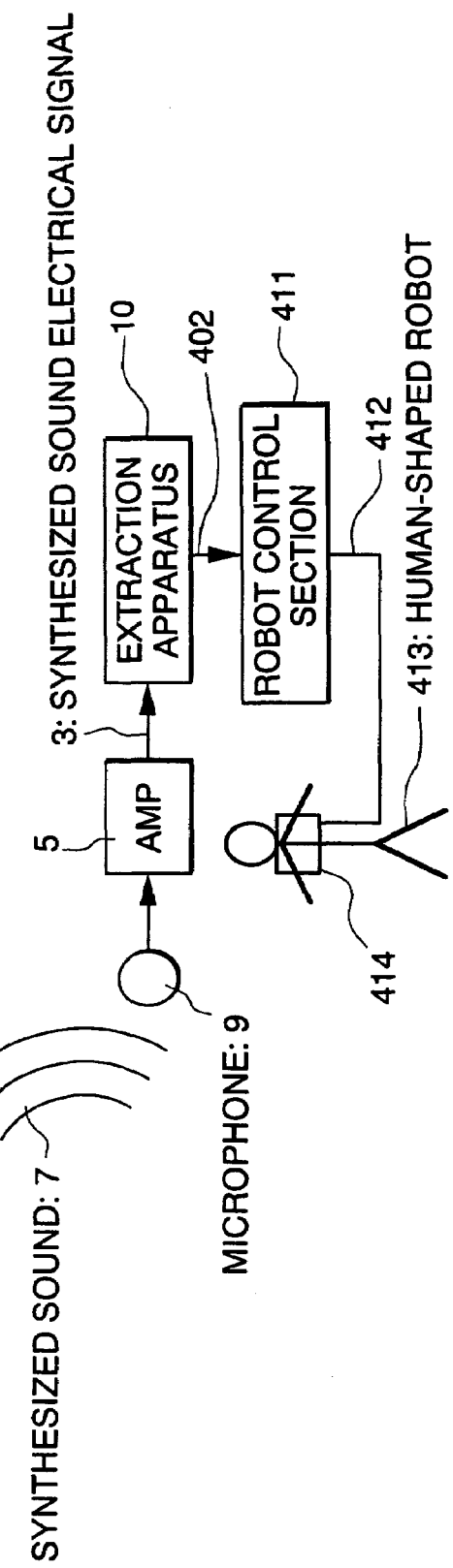

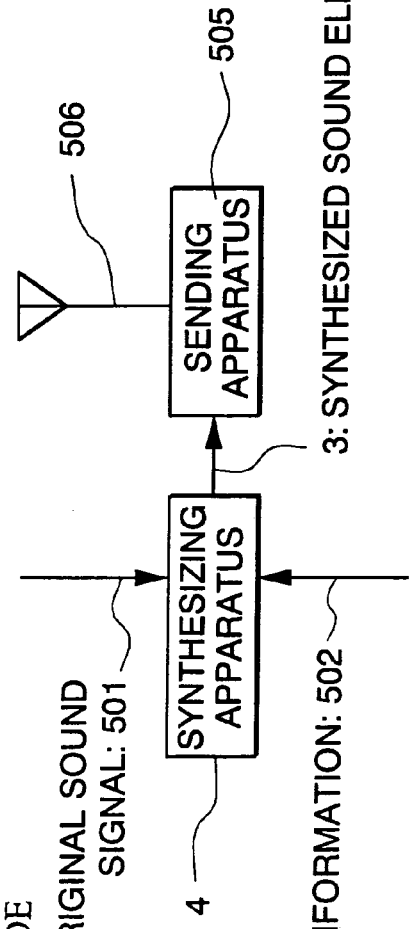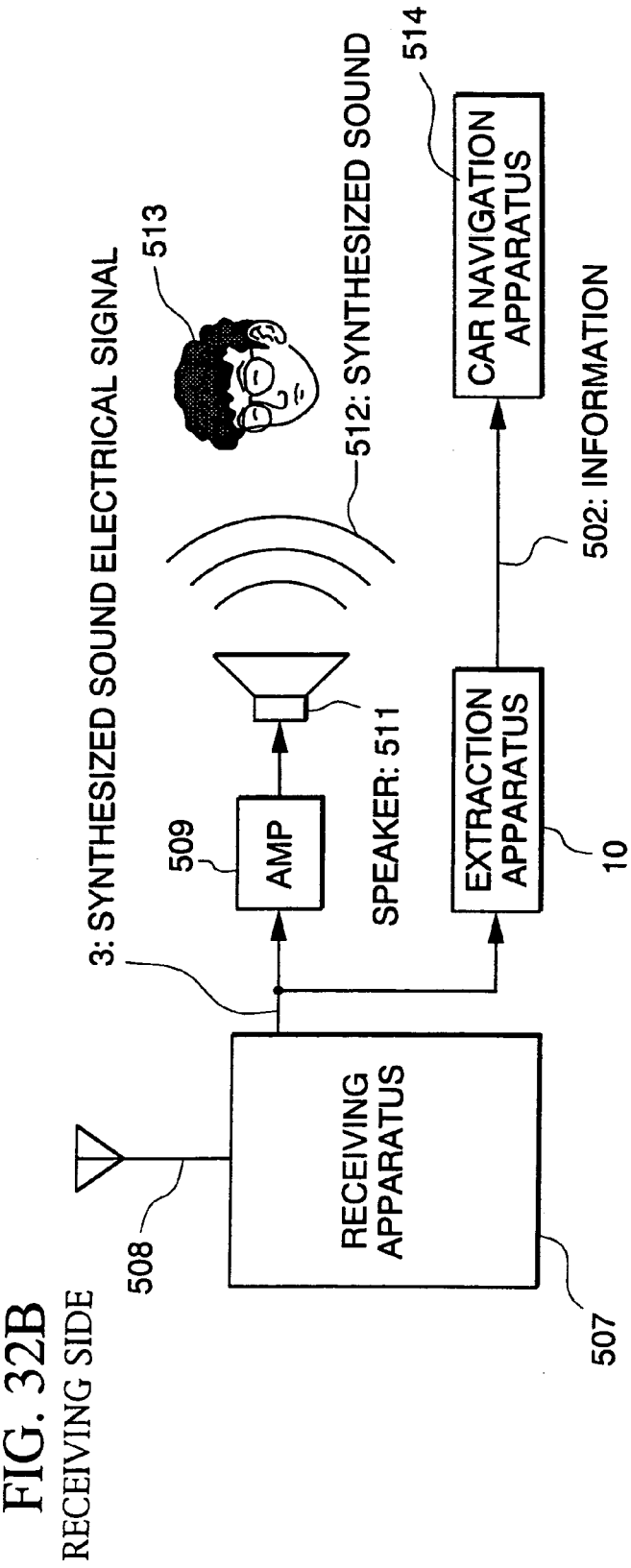
FIG. 32A
SENDING SIDE
FIG. 32B
RECEIVING SIDE

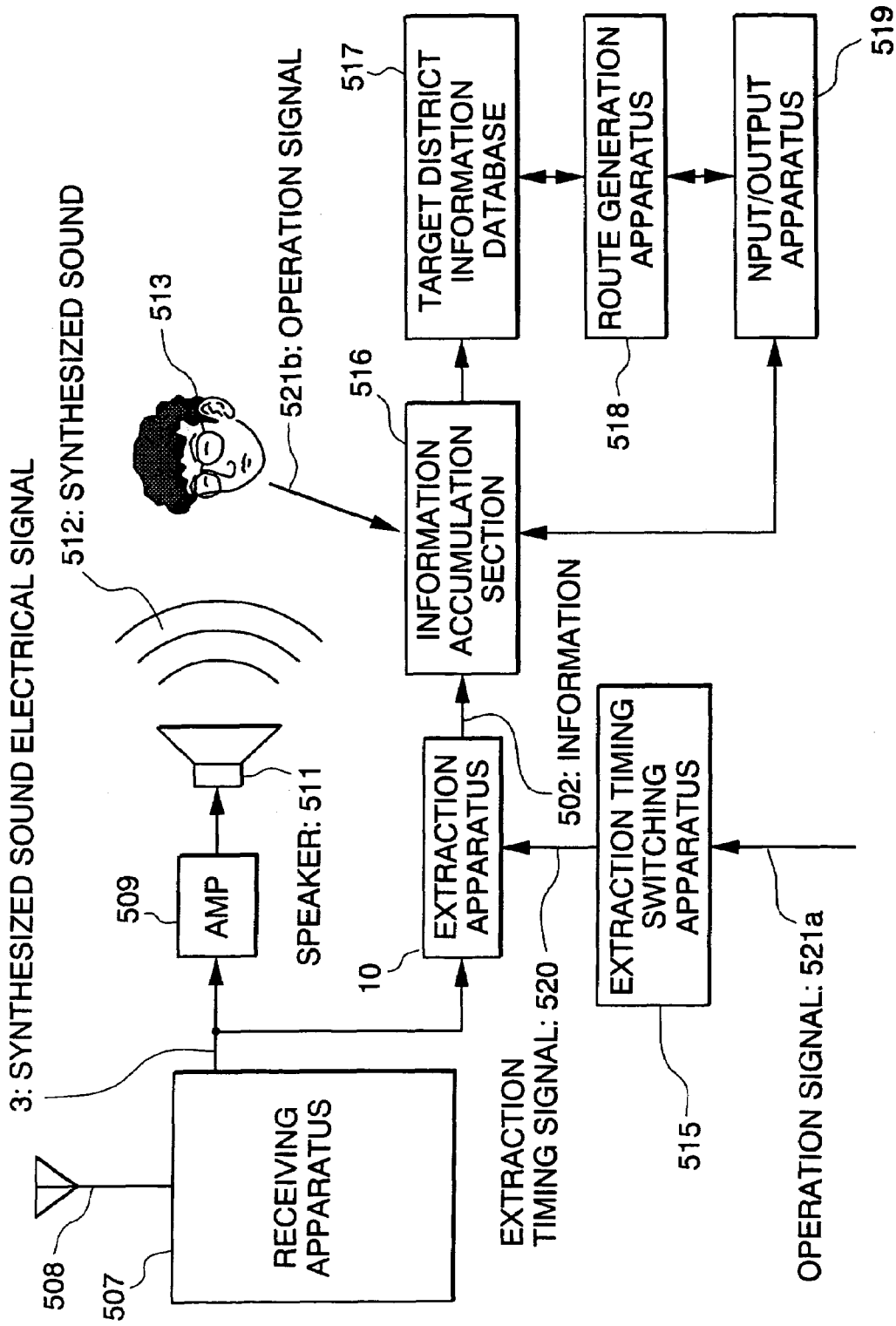

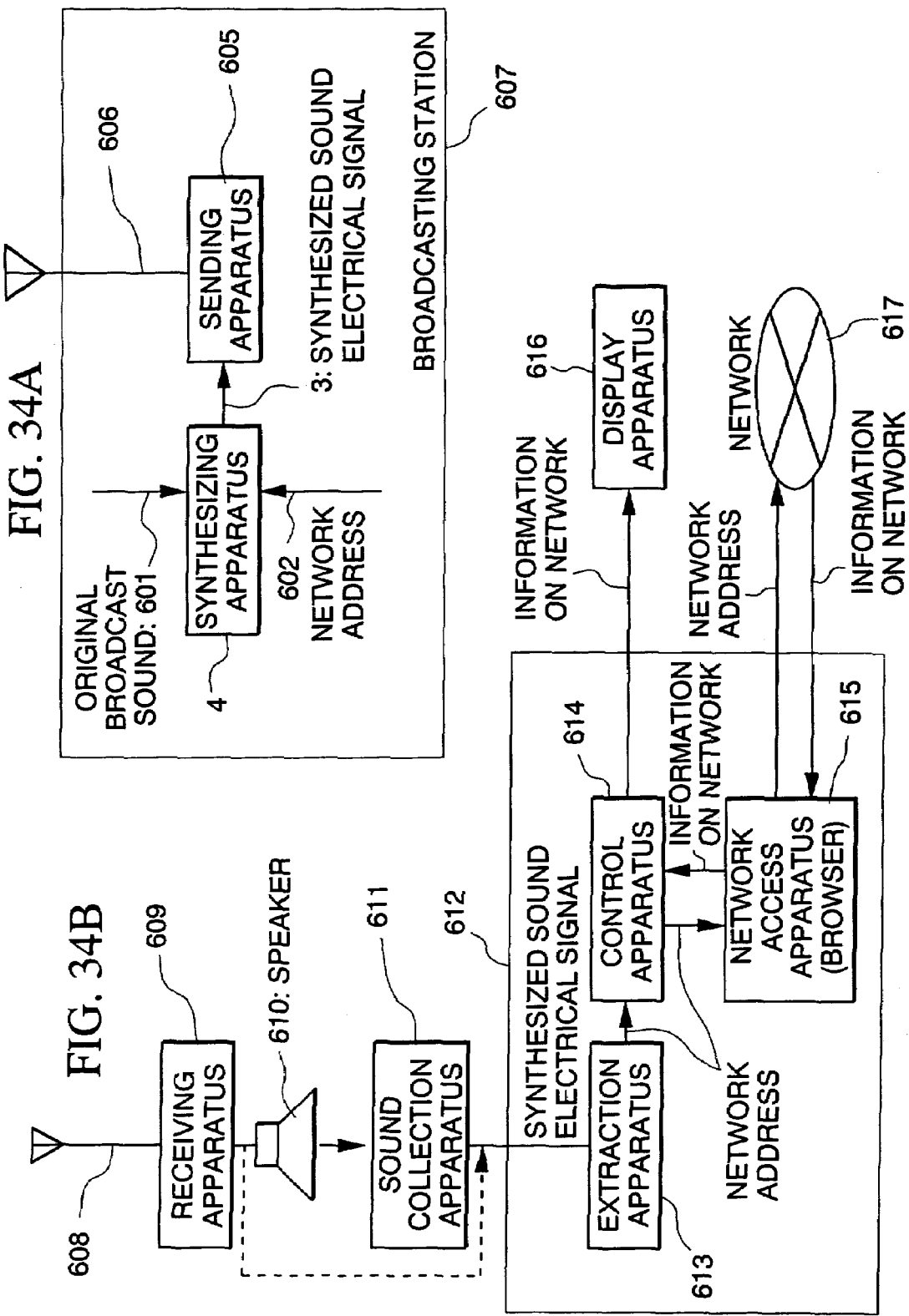

FIG. 38

| SYMBOL | CONTENT |
|---|---|
| A | WAVE RIGHT HAND |
| B | WAVE LEFT HAND |

FIG. 39

| SYMBOL | CONTENT |
|---|---|
| A | I am fine. |
| B | I am not so fine. |

FIG. 43

| SYMBOL | CONTENT |
|---|---|
| A | BOTH HANDS DOWN |
| B | BOW HEAD |

FIG. 44

| SYMBOL | CONTENT |
|---|---|
| 0 | WHICH |
| 1 | HELLO |

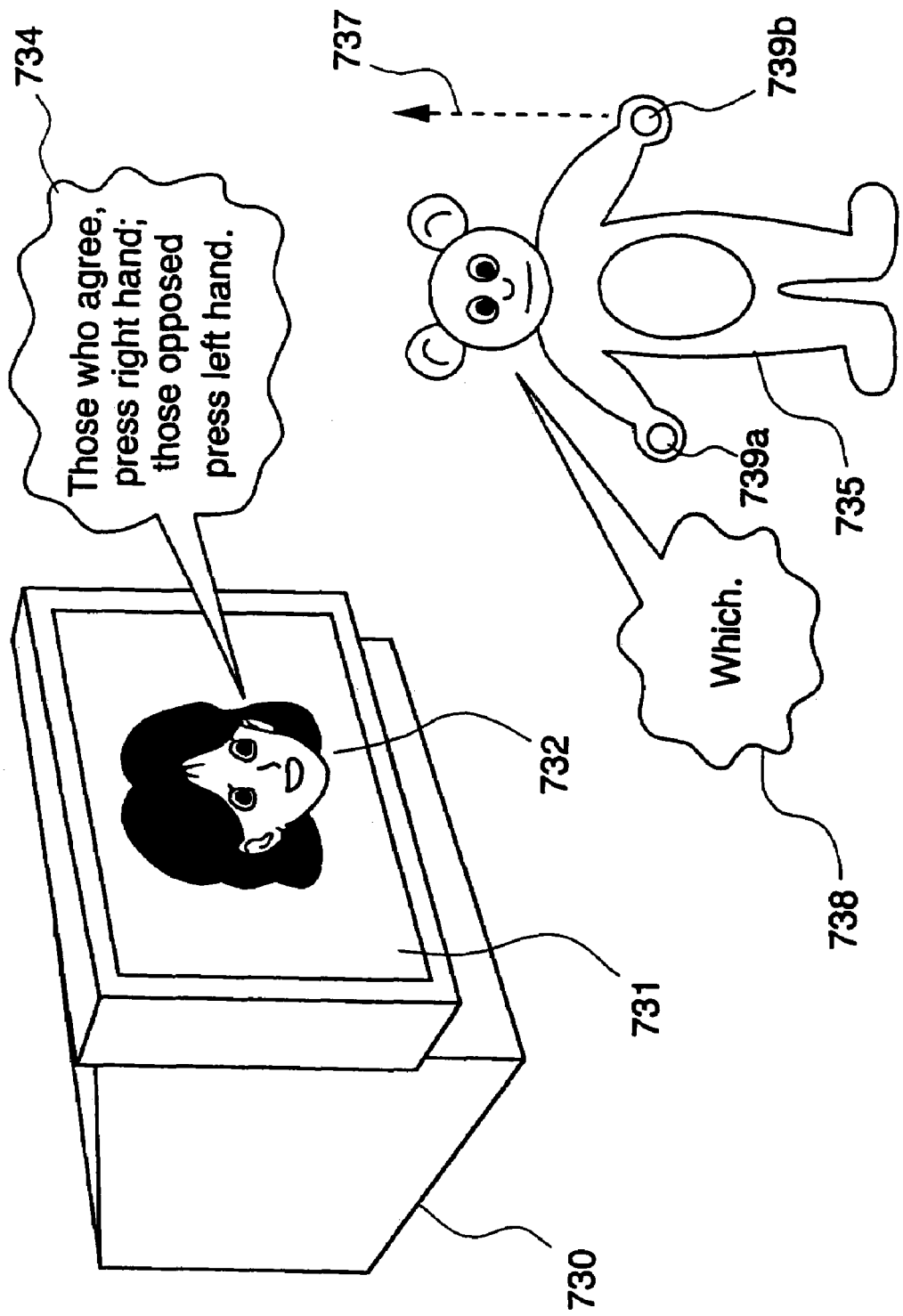

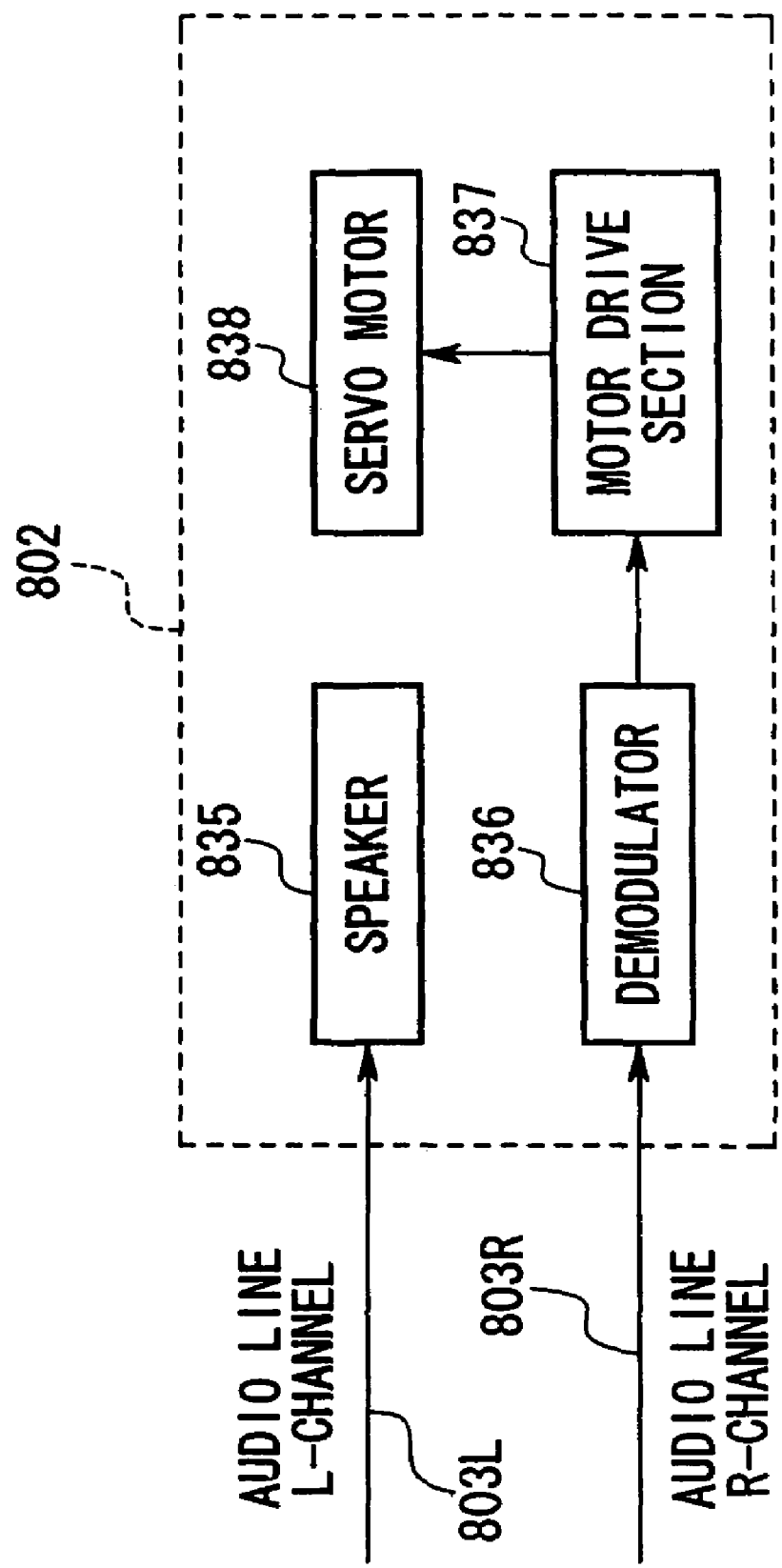

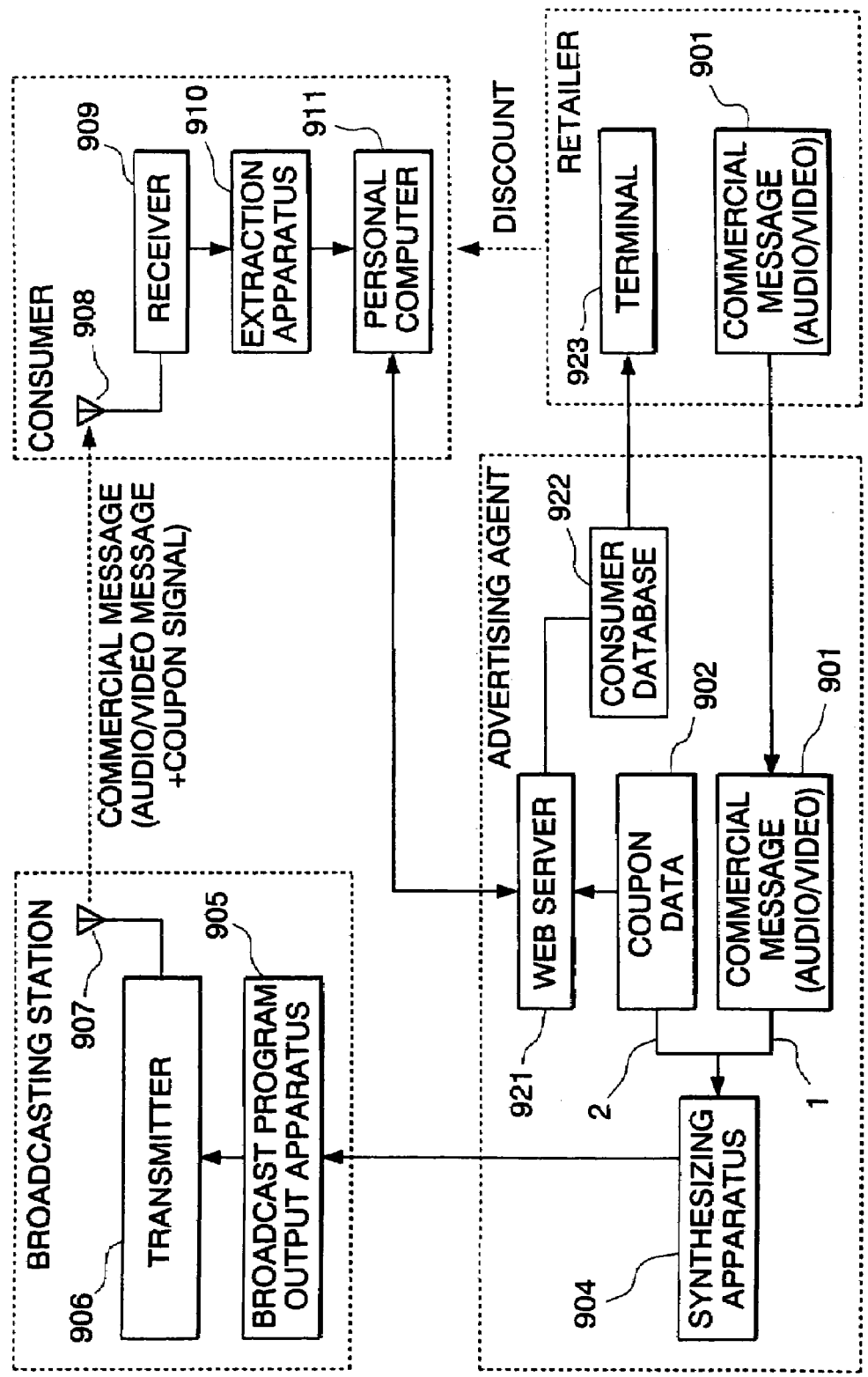

ACOUSTIC SIGNAL TRANSMISSION METHOD AND APPARATUS WITH INSERTION SIGNAL

CROSS REFERENCE TO RELATED APPLICATIONS AND PRIORITY CLAIM

This application is a continuation of U.S. patent application Ser. No. 09/712,945, entitled "Acoustic Signal Transmission with Insertion Signal for Machine Control" filed on Nov. 16, 2000, in the names of the same inventors and assigned to the same assignee. This application is also related to U.S. Pat. No. 6,947,893, entitled "Acoustic Signal Transmission Method and Acoustic Signal Transmission Apparatus," filed on the same date as the present application and in the names of the same inventors and assigned to the same assignee, which is a divisional of U.S. patent application Ser. No. 09/712,945.

BACKGROUND OF THE INVENTION

1. Field of the Invention

The present invention relates to an acoustic transmission method and an apparatus for transmitting signals using sound waves as the transport medium.

This application is based on patent application Nos. Hei 11-329914, Hei 11-356827, Hei 11-363811, Hei 11-366345, Hei 11-366346, 2000-136716, 2000-136717, 2000-248800 filed in Japan, the contents of which are incorporated herein by reference.

2. Description of the Related Art

Conventionally, when transmitting the sound that can be heard by humans or animals (audible sound signals) and associated information signals concurrently to some machine, the audible signal and the associated information signal are sent through separate channels.

For example, audible signal and information signal are sent as electrical signal to modulate the carrier wave, and are sent to the receiver side through electromagnetic waves and other media such as cables, and are used after demodulation by the receiver side. In such methods, it is necessary to provide respective transceivers for the purpose of sending an audible sound signal separately from another signal different than the audible sound signal.

That is, a total of more than two apparatuses are necessary, and complexity in the overall apparatus configuration is unavoidable. Also, apart from this problem, although there are methods of signal transmission based on ultrasonic waves as carrier waves, because ultrasonic sounds cannot be heard by human ears, it is necessary to convert to an audible sound at the receiver side, and the method cannot be used for the above purpose.

As a technology similar to the technologies described above for transmitting sound (audible sound signals) that can be heard by humans or animals simultaneously with associated information signals, is disclosed in a Japanese Unexamined Patent Application, First Publication, No. Hei 8-37511 "Interactive broadcasting system and receiving system", Publication date, 6 Feb. 1996 (Reference 1), for example. This method is based on simply superimposing signals according to the DTMF (Dual Tone Multiple Frequency) format on the audible sound signals.

However, according to this method, sounds that are not needed to be heard and are not of any interest to humans can be heard clearly as background noise. Therefore, it is very disturbing, and possibilities exist of misunderstanding the intended meaning of the original sounds represented by the audible sound signals.

Therefore, such methods cannot be said to be suitable as sound-based information transfer means.

SUMMARY OF THE INVENTION

Therefore, an object of the present invention is to provide means to easily transmit sounds (audible sound signals) that can be heard by humans and animals and to simultaneously transmit associated information signals. Also, the present invention has an object to provide various systems based on the information transmission means.

According to the present invention, the object has been achieved in a method for transmitting acoustic signals comprising: a synthesizing step for synthesizing an audible sound signal and another signal different than the audible sound signal to generate a synthesized sound electrical signal; an acoustic signal outputting step for converting the synthesized sound electrical signal to an acoustic signal and outputting the acoustic sound externally; a transmitting step for transmitting the synthesized sound electrical signal; and an extracting step for extracting said another signal from the synthesized sound electrical signal that has been transmitted.

In other words, in the present invention, the audible sound signal and another signal different than the audible sound signal are synthesized electrically, using a data hiding technique, for example, under a condition that the auditory presence of the signal cannot be detected by human ears, and this is emitted from a sound generation apparatus (speaker for example) to carry out signal output.

In this case, synthesizing means may use existing data hiding technique for embedding ID information and the like in voice sound information. The data hiding technique is reported in "Special Issue, "Electronic Watermark" protects multimedia age, Nikkei Electronics, 24 Feb. 1997, (no. 683), pp. 99-124 (Reference 2), "Article, Data hiding technique to support electronic watermark (part one)", Nikkei Electronics, 24 Feb. 1997, (no. 683), pp. 149-162 (Reference 3), "Article, Data hiding technique to support electronic watermark (part two)", Nikkei Electronics, 10 Mar. 1997 (no. 684), pp. 153-168 (Reference 4).

At the receiving side, the synthesized sound is collected by a microphone, and from a converted electrical signal, signal is extracted. Therefore, persons near the speaker, unaware of the auditory presence of the signal, is able to listen to the voice sound.

Using such a method, it is possible to easily transmit voice sound signals and another signal different than the voice sound signal using a simple apparatus. Especially, when transmitting signals from the sending side by voice sound that can transmit through air, the apparatus on the receiving side is only a voice sound generation means represented typically by a speaker, and the receiving side is a sound collection apparatus represented typically by a microphone, and therefore, radio transceiver or wired transceiver is not necessary so that an advantage is that the structure of the overall system is simple and very economical.

Also, accordingly, once the synthesized sounds are recorded, sound reproduction apparatuses in all kinds of apparatuses, such as personal computer, karaoke player, radio, television, tape deck, video deck, MD player, CD player, DVD player, analogue record player, DAT deck, MP3 player can be utilized directly as a sending apparatus. Further, the recorded synthetic sounds, when they are recorded on a sound recording medium, can be distributed.

Also, recorded synthetic sounds are able to be transmitted directly as direct data through transmission networks such as the Internet, telephone networks and broadcasting networks. Also, synthetic sounds can easily accumulated, modified, processed, analyzed and stored. Also, using one medium called sound, two pieces of information can be sent simultaneously.

Also, according to the present invention, applying such information transmission means, it becomes possible to provide means for transmitting acoustic information, such as music, and control signals to control motions and sound generation of a robot to match the voice sound information simultaneously and easily.

Also, according to the present invention, applying such information transmission means, voice sounds broadcast by radio and the like and such information as traffic information or sightseeing information or commercial information that can be used in car navigation purposes simultaneously. Also, in order to realize this, without having to install FM multiplexing apparatus and the like at the broadcasting station side, information can be embedded directly in the voice signals themselves, so that the system can be constructed very economically.

Also, according to the present invention, utilizing the information transmission means such as the one described above, voice sounds broadcast through a radio and the like and URL information from the site on the Internet can be simultaneously transmitted, and by using the URL, it becomes possible to rapidly access the site. The receiver side, accordingly, does not need to copy the URL or to take notes or to memorize. Also, without altering the facility of conventional radio, information via the Internet can be accumulated in a car navigation apparatus. Also, because the access is made easier, the sponsor can expect to have an increased number of access to its home page. Also, promotion that links commercial broadcasting and home page can be realized.

Also, according to the present invention, utilizing information transmission means such as the one described above, by transmitting voice sounds obtainable from TV receiver to a robot, through TV broadcasting and the like, it enables to control robot operation and sound generation. Also, it enables to provide feedback from the viewer through the robot, interactive television broadcasting can be realized.

Also, according to the present invention, utilizing information transmission means such as the one described above, using only voice transmission means, it enables to send signals to control the robot from personal computers and the like. Accordingly, the robotic system can be simplified and cost lowered. Also, because there is no need for a dedicated line in the computer system for controlling the robot, an advantage is that, while using the robot, other devices such as scanner, terminal adapter, printer can simultaneously be used.

Also, according to the present invention, utilizing information transmission means such as the one described above, it enables to broadcast data relating to coupons for sales promotion along with commercial broadcast, and to extract the coupon data at the receiver side. Then, it enables to accumulate the coupon data in personal computer and the like on the receiver side, sending the coupon data to a web server through the Internet and the like, checking the coupon data received at the web server side and accumulate the coupon data for each receiver. Then, it enables to award special business incentive, such as price discount on commercial goods, to the receiver according to accumulated coupon data. Accordingly, the receiver side can increase the enjoyment of actively listening to the broadcast commercial, while the sponsor can benefit from effective advertising and increased potential sales.

BRIEF DESCRIPTION OF THE DRAWINGS

FIGS. 1A and 1B are diagrams to show a first embodiment of the present invention.

FIG. 12 a diagram to the third embodiment of the present invention.

FIG. 13 is a diagram to show an example of the structure of a synthesizing apparatus in the third embodiment.

FIG. 16 is a diagram to show an example of the correlation of audio signals and operation signals and machine operation in the third embodiment.

FIG. 17 is a diagram to show an example of the correlation of audio signals and operation signals and machine operation in the third embodiment.

FIG. 18 is a diagram to show an example of the structure of a synthesizing section in the third embodiment.

FIG. 19 is a diagram to an example of the structure of a synthesizing section in the third embodiment.

FIG. 20 is a diagram to show the basic structure of a fourth embodiment of the present invention.

FIGS. 26A and 26B are diagrams to show the basic structure of a fourth embodiment of the present invention.

FIGS. 32A and 32B are block diagrams to show the basic structure in Embodiment 6.

FIG. 33 is a block diagram of an example of the structure in the automobile side in the Embodiment 6.

FIGS. 34A and 34B are block diagrams of an example of the structure in a Embodiment 7 of the present invention.

FIG. 38 is a diagram to show an example of the correlation data for the operational command for the robot in Embodiment 7.

FIG. 39 is a diagram to show an example of the correlation data for the conversational command for the robot in Embodiment 7.

FIG. 40 is a diagram to show another example in Embodiment 7.

FIG. 43 is a diagram to show an example of the correlation data for the operational command for the robot in Embodiment 7.

FIG. 44 is a diagram to show an example of the correlation data for the conversational command for the robot in Embodiment 7.

FIG. 59 is a block diagram of the function on the robot side in Embodiment 13.

FIG. 60 is a block diagram of an example of broadcasting commercial messages.

DESCRIPTION OF THE PREFERRED EMBODIMENTS

Figure 2:
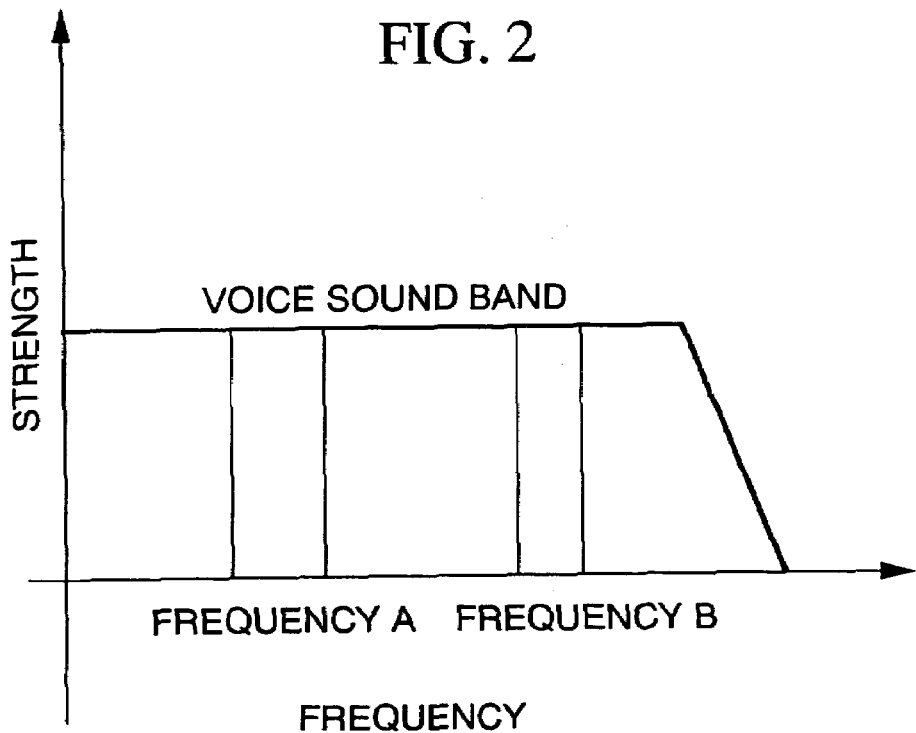
FIG. 2 is a diagram to show a method of utilizing a frequency band in the first embodiment.

The following embodiments do not restrict the interpretation of the claims relating to the present invention, and the combination of all the features explained in the embodiments is not always being indispensable means of solving the problem.

In the following, preferred embodiment of the present invention will be explained in detail with reference to the drawings.

Embodiment 1

First, examples in Embodiment 1 will be explained.

FIGS. 1A and 1B are diagrams to show Embodiment 1 of the present invention, and numeric symbol 1A refers to the sending side and 1B refers to the receiving side. In FIG. 1A, numeric symbol 1 represents audible sound signal, 2 an insertion signal, which is another signal different than the audible sound signal 1, and 3 a synthesized sound electrical signal.

Although the following explanations relate to a case of using a digital signal for signal 2, but even if the signal 2 is an analogue signal, once the signal has been converted to digital information by processing the signal through an A/D converter, it is obvious that it can be handled in the same manner as digital signals.

Also, 4 represents a synthesizing apparatus, 5 an amplifier (in FIG. 1A, it is recited as AMP), 6 a speaker, 7 a synthesized sound, 8 a person. In FIG. 1B, numeric symbol 9 represents a microphone, 10 an extraction apparatus, and other numeric symbols are the same as those in FIG. 1A.

An outline of the flow of the signal in FIGS. 1A, 1B will be explained. First, on the sending side, audible sound signal 1 and signal 2 to be transmitted other than the audible sound signal 1 are electrically synthesized using, for example, a data hiding technique, under a condition such that the auditory presence of signal 2 cannot be detected by the person, and, after passing through the amplifier 5, a synthesized sound 7 is emitted from the speaker 6 into the air space.

A person who is nearby can hear this synthesized sound by own ears. On the other hand, on the receiving side, the emitted sound is collected by the microphone 9, and, after passing through the amplifier 5, is converted to the synthesized sound electrical signal. Then, the signal 2 is extracted from the synthesized sound electrical signal by the extraction apparatus 10.

Figure 3:
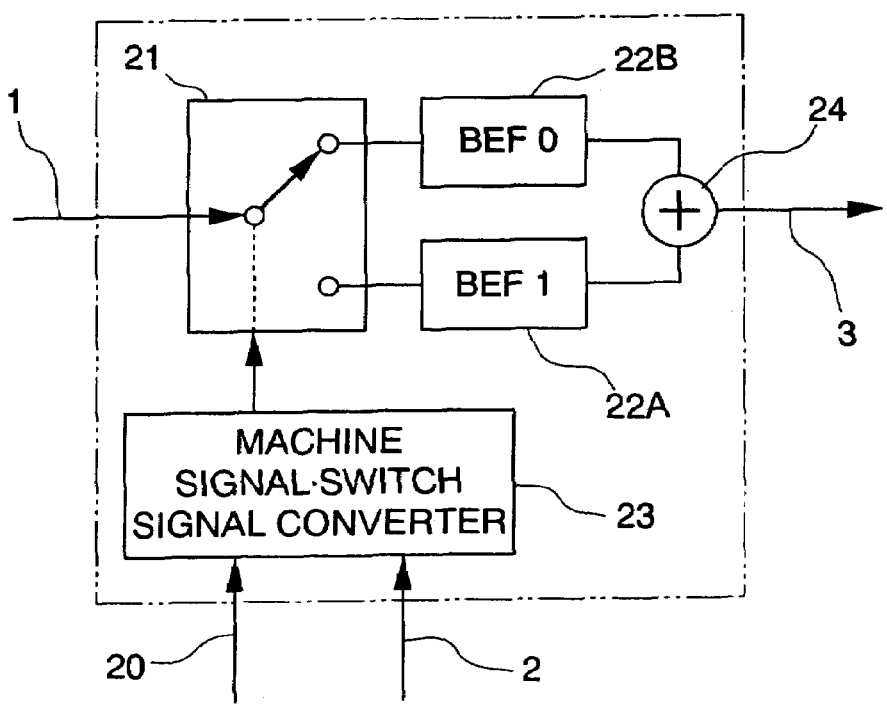
FIG. 3 is a diagram to show an example of a synthesizing apparatus in the first embodiment.

FIG. 2 is a diagram to show a method of utilizing the frequency band (band-elimination method) in Embodiment 1. FIG. 3 is a diagram to show an example of the structure of the synthesizing apparatus in FIG. 1A, and numeric symbols 1~3 are the same as those in FIG. 1A, 20 represents the synchronizing signal, 21 a switching circuit, 22B a band-elimination filter 0, 22A a band-elimination filter 1 (band-elimination filter is abbreviated as BEF in the diagram), 23 a machine signal-switching signal converter, and 24 a synthesizer.

Figure 4A:
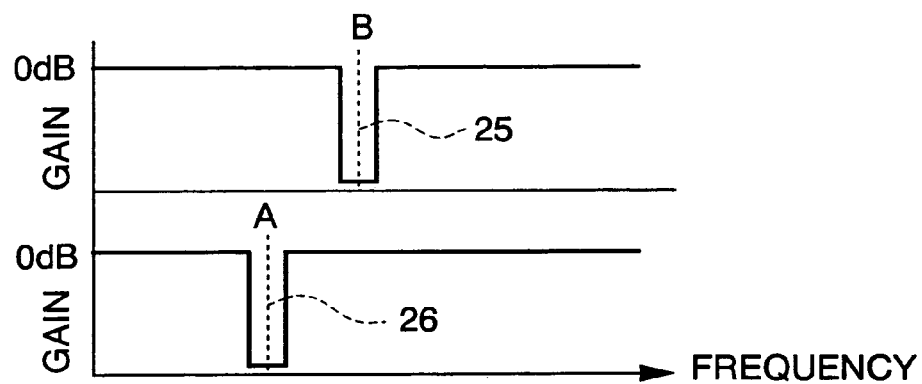
FIGS. 4A and 4B are diagrams to show the operations of the synthesizing apparatus in the first embodiment.
Figure 4B:
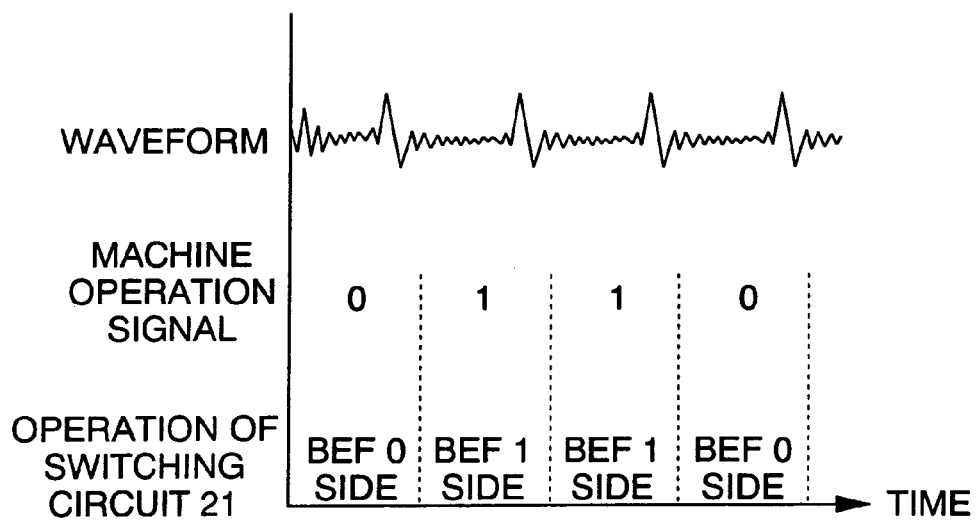

FIGS. 4A, 4B are diagrams to explain the operation of the synthesizing apparatus shown in FIG. 3. FIG. 4A shows the properties of the band-elimination filter, and numeric symbol 25 show the properties of the band-elimination filter 0 and those of the band-elimination filter 1, respectively. Also, FIG. 4B shows the relationship of the waveform of the synthesized sound electrical signal and machine operation signal (signal 2) and the changeover switch 21.

Figure 5:
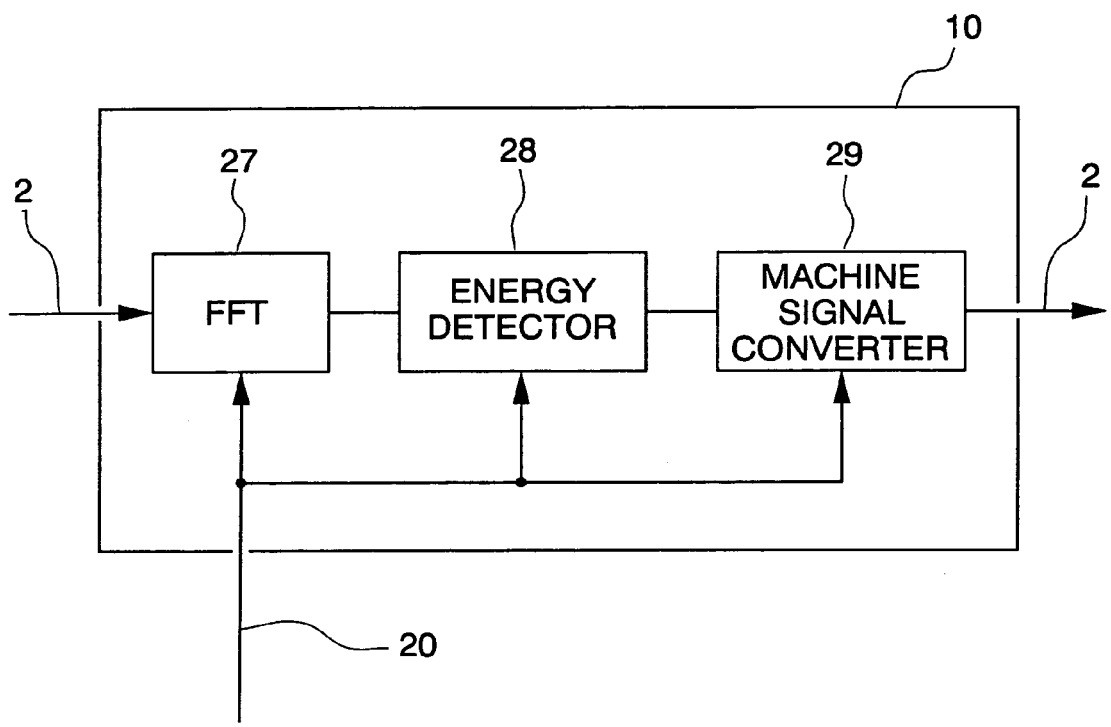
FIG. 5 is a diagram to show an example of the structure of an extraction apparatus in the first embodiment.

FIG. 5 is a diagram to show an example of the structure of the extraction apparatus shown in FIG. 1B, and numeric symbols 2, 3, 10 are the same as those in FIG. 1B, 20 represents a synchronizing signal, 27 a frequency analyzer (abbreviated as FET in the diagram), 28 an energy detector, and 29 a machine signal converter.

Embodiment 1 will be explained in the following with reference to the diagrams. The synthesizer 4, as shown in FIG. 3, is comprised by a band-elimination filters 22A, 22B to eliminate a certain band from signal 1 depending on the value of the binary signal 2, and when sending a code "1", the sound energy is eliminated in a particular central frequency A by the band-elimination filter 22A (BEF1).

Similarly, when sending a code "0", the sound energy is eliminated in a particular central frequency B that is different than the central frequency A by the band-elimination filter 22B (BEF0). Humans are virtually unable to distinguish an audible sound uniquely lacking a specific frequency only from the original sound in their normal auditory state in daily living space.

Suppose that, even when such existence is able to be detected physically, humans are not able to meaningfully recognize its significance. Transmission of signal 2 is carried out as follows.

(Step 1) the machine-signal-switching-signal converter drives the switching circuit 21, in accordance with the polarity of signal 2, while switching the band-elimination filter for signal 1 according to "1" and "0" to generate a sound signal from which a specific superposition has been eliminated from signal 1.

(Step 2) after synthesizing the filtered sound signal in the synthesizing apparatus 24, it is amplified in the amplifier 5 and is emitted into the air space through the speaker 6.

Decoding at the receiver side is carried out by receiving the sound signal emitted into the air space in the microphone 9, and after amplifying in the amplifier 5, signal 2 is extracted in the extraction apparatus 10. In the extraction apparatus 10, the synthesized signal 3 input is analyzed in the frequency analyzer 27, the energy is detected in the energy detector 28, and the missing frequency component is extracted, and this is converted in the machine signal converter 29 into machine signals "1" or "0" so as to output as signal 2.

Decoding at the receiver side can also be realized by another configuration different than the extraction apparatus 10. That is, the decoder is comprised by two band-pass filters, and by making their respective center frequencies equal to those of the band-elimination filters 22A, 22B of the synthesizing apparatus 4, the signal 2 can be decoded on the basis of the magnitude of the output from each band-pass filter.

Specific receiving steps for signal 2 can be summarized as follows.

(Step 1) detect a sound signal propagating through the air space by microphone;

(Step 2) amplify the signal detected by the microphone;

(Step 3) obtain an output signal from a band-pass filter by passing the amplified signal therethrough;

(Step 4) extract signal 2 by carrying out decoding according to comparison of the output signal with an appropriate threshold value.

Embodiment 2

Figure 6:
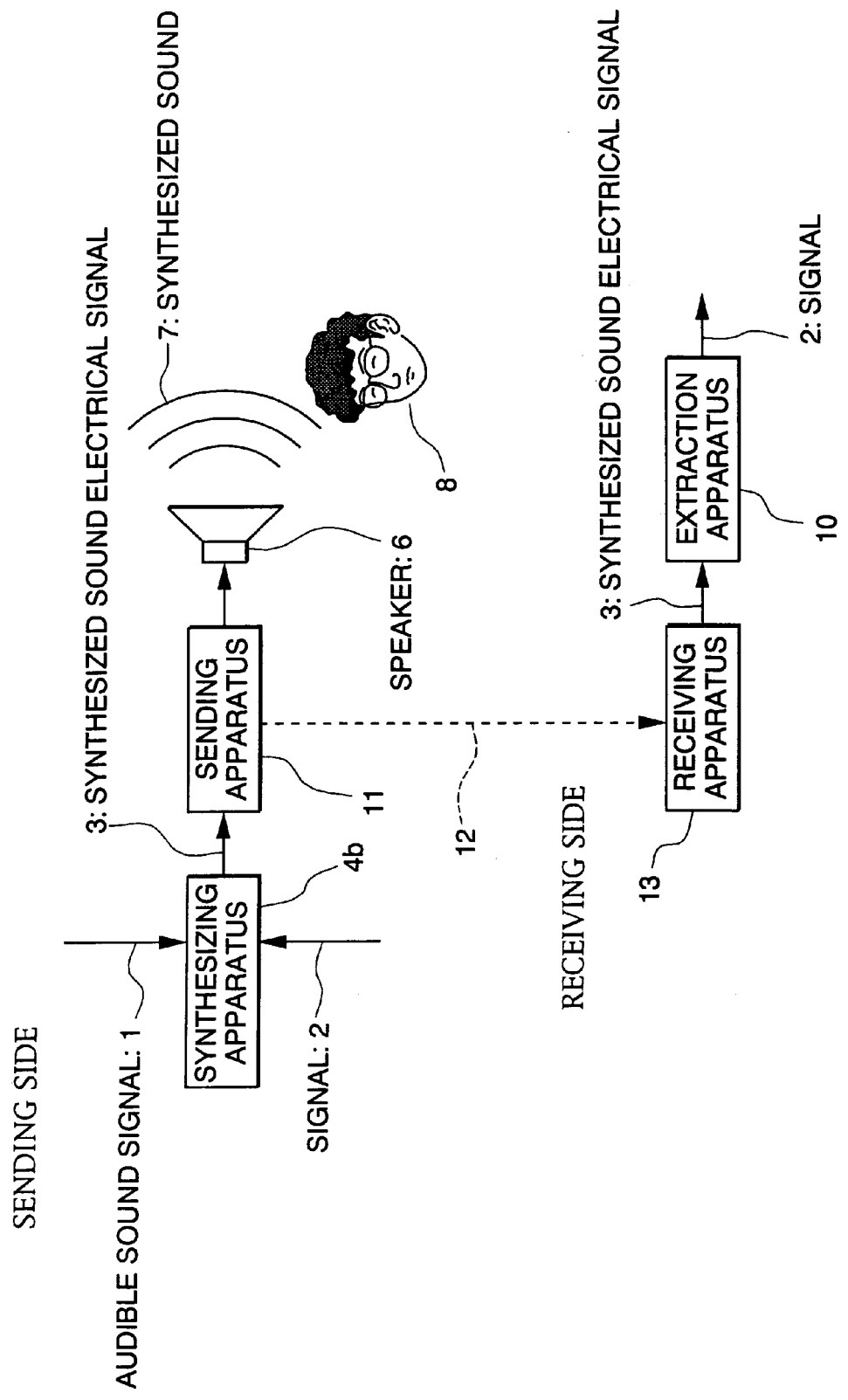
FIG. 6 is a diagram to show a second embodiment of the present invention.

FIG. 6 shows Embodiment 2 of the present invention, which shows both the sending side and the receiving side. In the diagram, numeric symbol 1 represents an audible sound signal; 2 a signal different than the audible sound signal; 3 a synthesized sound electrical signal; 4b a synthesizing apparatus; 6 a speaker; 7 a synthesized sound; 8 a person; 10 an extraction apparatus; 11 a sending apparatus; 12 a signal transmission path; and 13 a receiving apparatus.

An outline of the flow of the signal in FIG. 6 will be explained. A feature of the present embodiment is that, as illustrated in the diagram by a dotted line, there is a means for transmitting (signal transmission path 12) the synthesized sound 7 from the sending side to the receiving side directly without propagating through the air space. In this case, an advantage is that, because acoustic noise in the air space is not mixed in the sending signal, reliability of signal transmission is increased. Also, at the same time, the synthesized sound is emitted into the air space and acts directly on the ear of a person.

Figure 7:
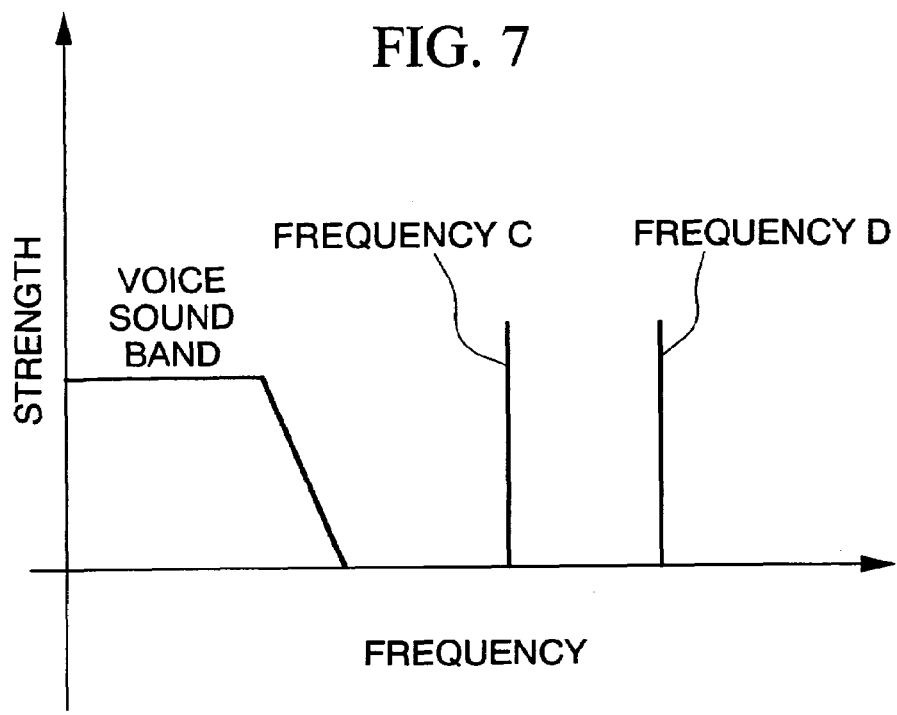
FIG. 7 is a diagram to show a method of utilizing a frequency band in the second embodiment.

FIG. 7 shows a method of frequency-band utilization in Embodiment 2. In this case, transmission method based on sine wave is adopted. The synthesizing apparatus 4b in FIG. 6 is an apparatus to convert a binary signal into an acoustic electrical signal, and is comprised by an oscillator, so that, when sending a "1" code, a high frequency C having a specific frequency is generated, and similarly, when sending a "0" code, a high frequency D having a specific frequency different than the high frequency C is sent.

Humans are virtually unable to distinguish an audible sound uniquely lacking a specific frequency from the original sound in daily living air space in the normal auditory state. Even if such an existence can be detected physically, humans are not able to meaningfully recognize the significance of signal 2.

Figure 8:
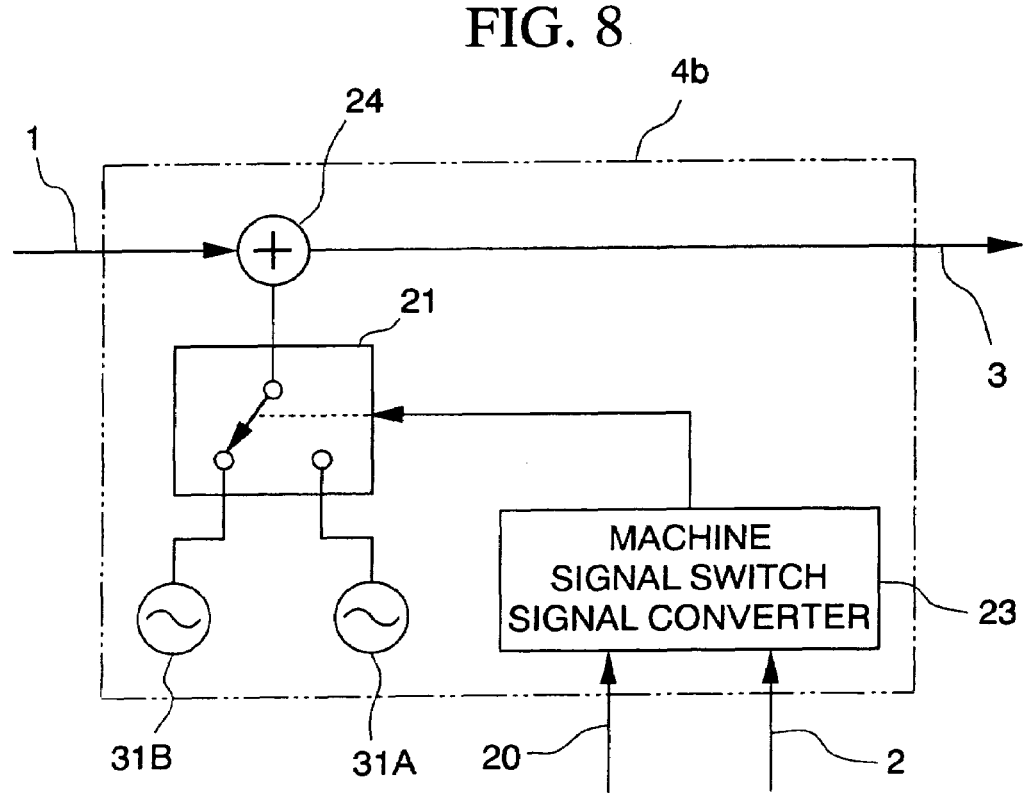
FIG. 8 is a diagram to show the structure of the synthesizing apparatus in the second embodiment.

FIG. 8 is a diagram to show an example of the synthesizing apparatus in FIG. 6, and the numeric symbols 1~3 are the same as those in FIG. 1A, and 4b represents a synthesizing apparatus; 20 a synchronizing signal; 21 a switching circuit; 23 a machine signal-switching signal converter; 24 a multiplexer; 31A an oscillator 0; and 31B an oscillator 1.

Figure 9A:
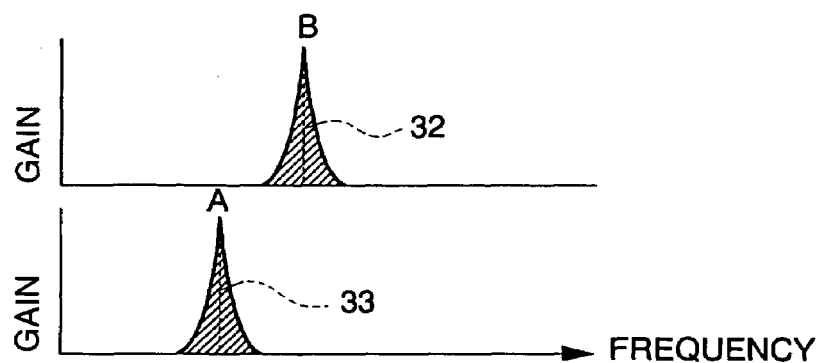
FIGS. 9A and 9B are diagrams to show the operations of the synthesizing apparatus in the second embodiment.
Figure 9B:
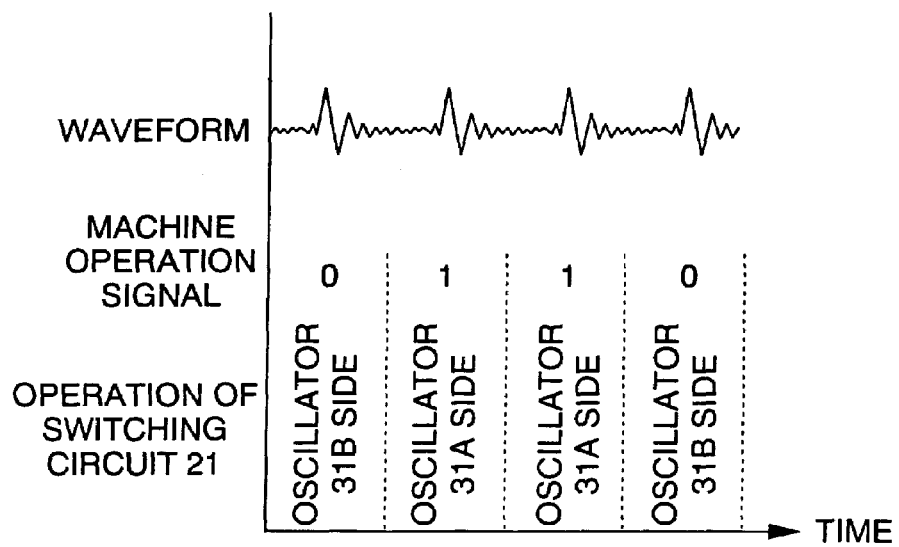

FIGS. 9A, 9B are diagrams to explain the operation of the multiplexer shown in FIG. 6. FIG. 9A shows the frequency properties of the oscillator, and numeric symbol 32 refer to the frequency properties of an oscillator 31A, 33 to those of an oscillator 31B. FIG. 9B shows a relationship of the waveform of the synthesized sound electrical signal and the machine signal (signal 2) in relation to switching by switching circuit 21.

Figure 10:
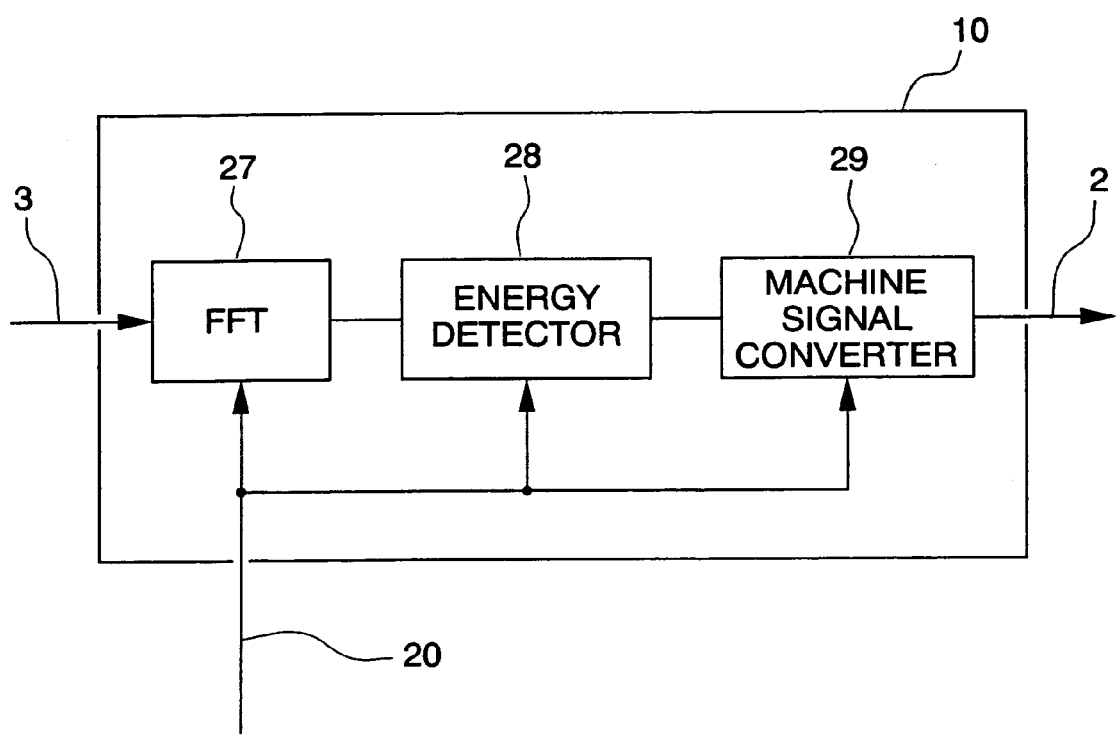
FIG. 10 is a diagram to show an example of the structure of an extraction apparatus in the second embodiment.
Figure 27:
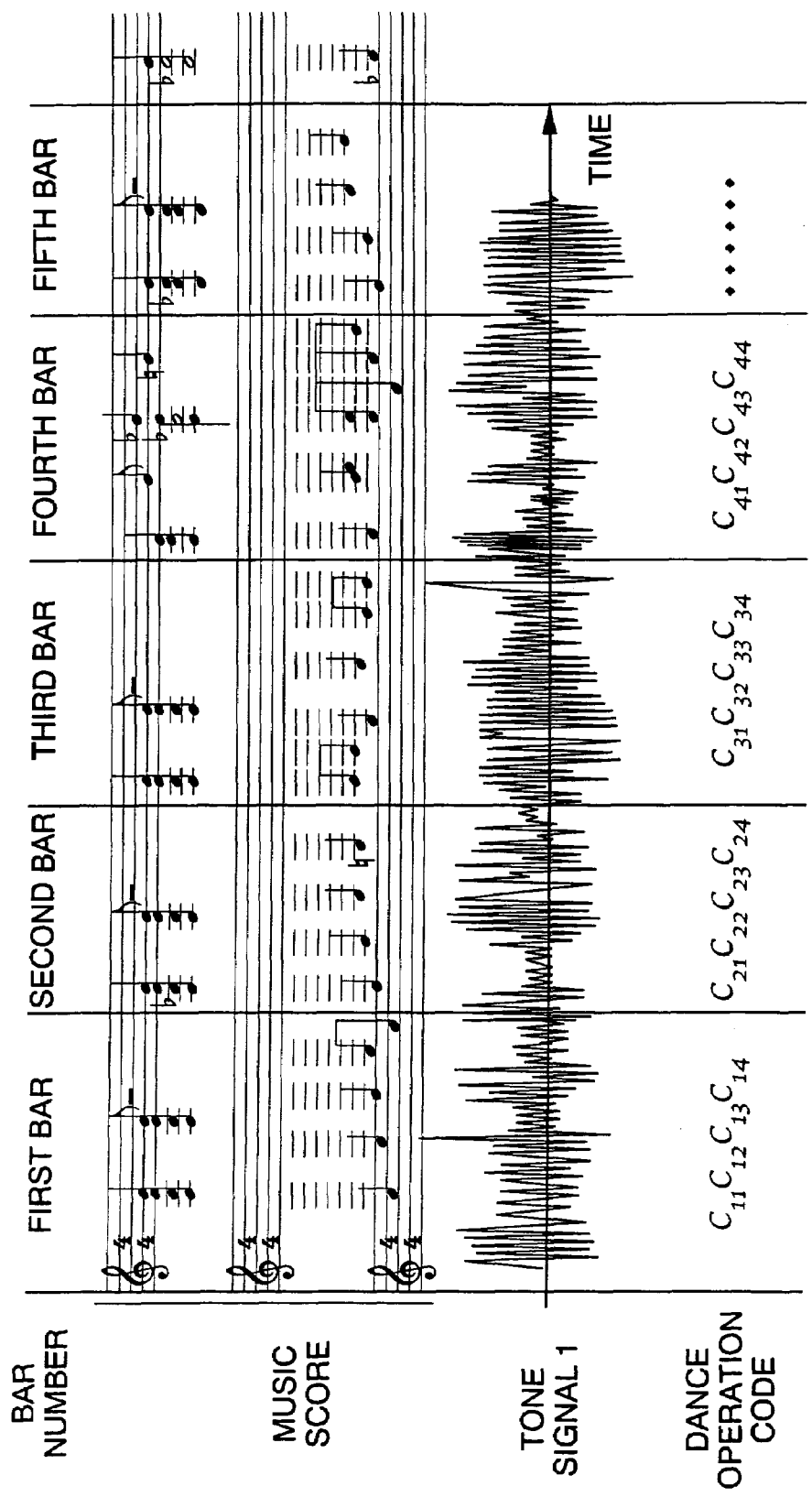
FIG. 27 is a diagram to show an example of the chronological relationship of music signals and dance operation codes in a fifth embodiment.

FIG. 10 is a diagram to show an example of the structure of the extraction apparatus shown in FIG. 6, and numeric symbols 2, 3, 10 are the same as those in FIG. 1B, and 27 represents a frequency analyzer (abbreviated as FFT in the diagram); 28 an energy detector; 29 a machine signal converter. Embodiment 2 will be explained below with reference to these diagrams.

The synthesizing apparatus 4b as shown in FIG. 8 is provided with oscillators 31A, 31B for impressing different frequencies on signal 1, depending on the value of the binary signal 2, so that when sending a "1" code, a high frequency C having a specific frequency is generated, and similarly, when sending a "0" code, a high frequency D having another specific frequency is sent.

Sending of signals is performed according to the following steps.

(Step 1) operate oscillators 31A, 31B for generating sine waves of specific frequencies (high frequency C, D) to correspond with "1" and "2" for signal 2;

(Step 2) the machine signal-switching signal converter 23 operates the switching circuit 21 according to the polarity of signal 2 so as to add the selected specific sine wave and signal 1 in the synthesizer 24;

(Step 3) the signal obtained in step 2 above is amplified in the amplifier (not shown), and the signal is emitted into the air space through the speaker 6 and, concurrently, the sending apparatus sends the signal to the transmission path 12.

In the receiving side, the signal is received by way of the transmission path 12. The extraction apparatus 10 decodes the synthesized sound electrical signal again into a code signal. At this time, the extraction apparatus 10 analyzes the synthesized signal 3 input therein in the frequency analyzer 27, detects its energy in the energy detector 28, and the impressed frequency component is extracted, and this is converted into machine signals "1" and "0" in the machine signal-switching signal converter, and is output as signal 2.

Decoding at the receiver side can also be realized by another configuration different than the extraction apparatus 10. That is, the decoder is comprised by two band-pass filters, and by making their respective center frequencies equal to those of the oscillators 31A, 31B of the synthesizing apparatus 4b, the signal 2 can be decoded on the basis of the magnitude of the frequency components contained in signal 1.

Specific receiving steps for signal 2 can be summarized as follows.

(Step 1) receive an electrically synthesize sound signal propagating through the signal transmission path 12;

(Step 2) detect the specific frequency component in the received electrically synthesize sound signal;

(Step 3) discriminate and output its polarity (binary value) according to the frequency component of the detected signal;

(Step 4) extract signal 2 by carrying out decoding according to comparison of the output signal with an appropriate threshold value.

Accordingly, two examples of the structure of sending side and four examples of the structure of receiving side are illustrated in Embodiments 1 and 2, but the data hiding methods are not limited to these mentioned, and similar acoustic transmission methods may be realized by using various other methods of data hiding algorithm.

In the above explanations, specific examples of audible sound signal 1 include natural language audio sounds, machine synthesized sounds, musical tones, warning sounds, natural sounds in the natural world, animal sounds and noises. Also, signal 2 represents data that are expressed in digital or analogue forms, and specific examples include natural language sounds, music, warning sounds, noises, MIDI (musical instrument digital interface) data, acoustic signals such as MP3, multimedia signals such as text, image and video signals, and sensory signals such as touch, smell and force.

Also, the media for transmitting synthesized sound electrical signals in Embodiment 2 include, specifically, sound waves, ultrasonic waves, electrical waves, and electro-magnetic waves such as infrared, visible and ultra-violet radiations. Also, sending and receiving means may consider using broadcasting such as television and radio, CATV (cable television), police radio, public phones, portable phones, PHS (Personal Handy-phone System), Internet and LAN (Local Area Network).

Embodiment 3

Embodiment 3 will be explained in the following. In Embodiment 3, a voice response machine that can respond to audio control signals is realized by applying the present invention to machine control.

Media for enabling wireless remote control, without connecting a machine to be controlled and a control apparatus directly by means of conductive wires, such as electrical waves, infrared radiation, light and sound waves, have long been known and used. Of these, a representative method using sound waves in the audible frequency band is a based on commands comprised by synthesized sound signals that can be processed readily by machines.

Such methods based on commands by synthesized sound signals that can be easily understood by machines have the advantage that recognition rate is higher than a method based on natural language, but the commands are difficult to be understood directly by humans.

For this reason, in a communication air space in which machines and humans coexist, a method using two information channels has been adopted when mutual understanding of each other's intentions is necessary.

That is, the natural language sounds are sent to humans by way of a speaker, and separately but concurrently, signals to control the machine corresponding to the information are sent to the machine by means such as electrical waves. In this case, it is necessary to have sending and receiving apparatuses for both natural language sounds and control signals by electrical waves and the like, resulting in a problem that the overall structure for the apparatus becomes complex.

Also, this method is basically powerless under situations such as underwater and hospitals where electrical waves cannot be used. However, as explained below, Embodiment 3 of the present invention provides means for readily communicating mutual intentions in the communication air space shared by machines and humans.

Figure 11A:
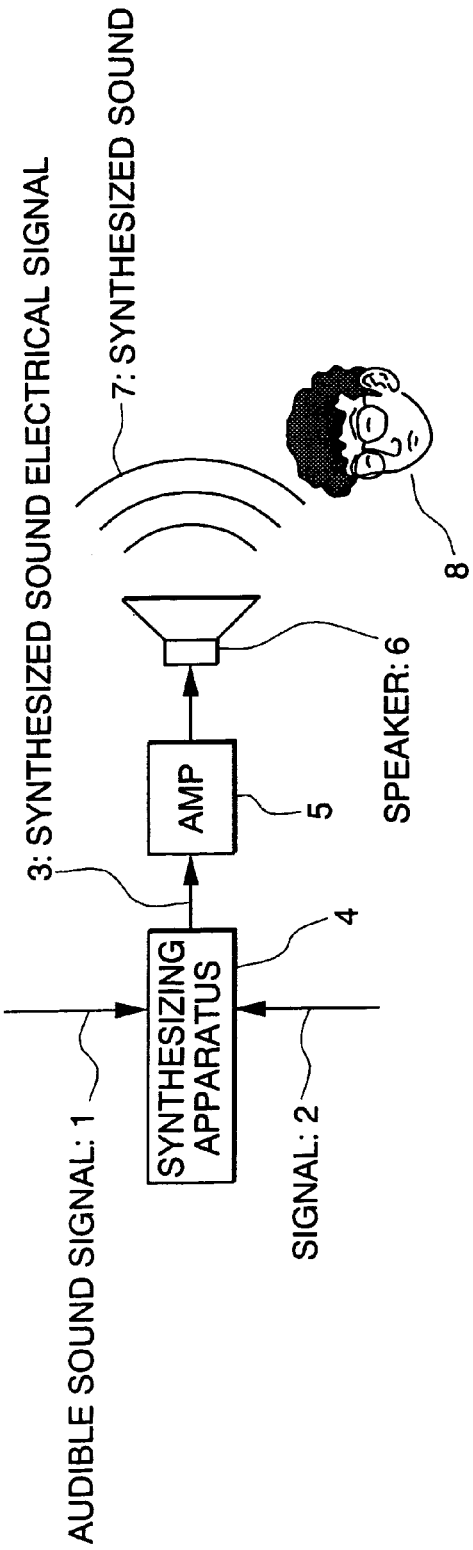
FIGS. 11A and 11B are diagrams to show a third embodiment of the present invention.
Figure 11B:
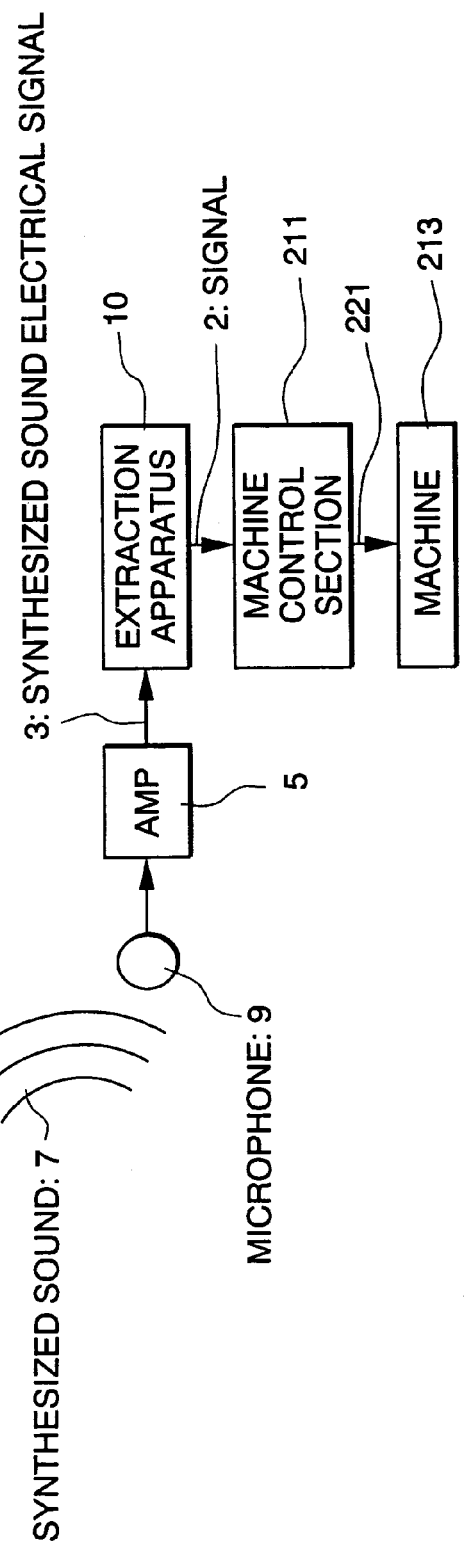

FIG. 11A shows the configuration on the sending side in Embodiment 3, and FIG. 11B shows, similarly, that on the receiving side. Numeric symbols 1-8 in FIG. 11A are the same as those in FIG. 1A. Also, in FIG. 11B, numeric symbol 211 represents a machine control section, 212 a machine operation command signal, 213 a machine, and other numeric symbols are the same as those in 1B.

Features of the signal flow in Embodiment 3 are as follows. The signal 2 extracted in FIG. 11B is input in the machine control section 211, and is converted in the machine control section 211 into a machine operation command signal 212 to actually control the operation of the machine 213. The machine 213 operates in accordance with the contents of the machine operation command signal 212.

The structures for the synthesizing apparatus in FIG. 11A and the extraction apparatus FIG. 11B can be used in Embodiments 1 and 2, for example.

FIG. 12 is a diagram for using a transmission path instead of extracting a signal for machine control based on the synthesized sound 7 that is propagated through the air space. As shown in FIG. 12, the electrical signal output by the synthesizing apparatus 4 is transmitted by way of the transmission path 224, and is input in the amplifier 5 in the receiving side. Other operations are the same as those in FIGS. 11A and 11B.

FIG. 13 is a diagram to show an example of the structure of the synthesizing apparatus shown in FIG. 11A. In this example, character strings in the natural language is used as signal 2, and numeric symbols 1~4 are the same as those in FIG. 11A.

Also, the numeric symbol 214 represents a machine signal/sound correlation section, 215 a voice data read section, 216 a voice data ROM, 217 an A/D conversion section, 218 an ASCII character code table, 219 an ASCII code converter, 221 a ROM addressing signal, 222 PCM (Pulse Code Modulation) voice data, and 223 an ASCII code signal. The voice data ROM 216 stores PCM voice data such as "GO", "STOP", "RIGHT", "LEFT" and others.

In FIG. 13, signal 2 is a character string of a natural language. For example, suppose that a signal meaning "GO" is input as signal 2. The ASCII code converter 219 outputs an ASCII code 223 to correspond with "GO" by referencing the ASCII code character code table 218.

This ASCII code 223 is input in the machine operation signal/voice correlation section 214, and the machine operation signal/voice correlation section 214 outputs a ROM addressing signal 221. The ROM addressing signal 221 is a data showing the leading address (of "GO" in this case) of the corresponding PCM voice data in the ROM voice data 222.

The voice data read section 215 receives this and reads the PCM voice data "GO" from the ROM voice data 216 and outputs the data. The PCM voice data "GO" is converted to analogue data in the D/A conversion section 217, and becomes an audible sound signal 1. The audible sound signal 1 and the ASCII code signal 223 are input in the synthesizing apparatus 4 to be synthesized, and a synthesized sound electrical signal 3 is output.

Figure 14:
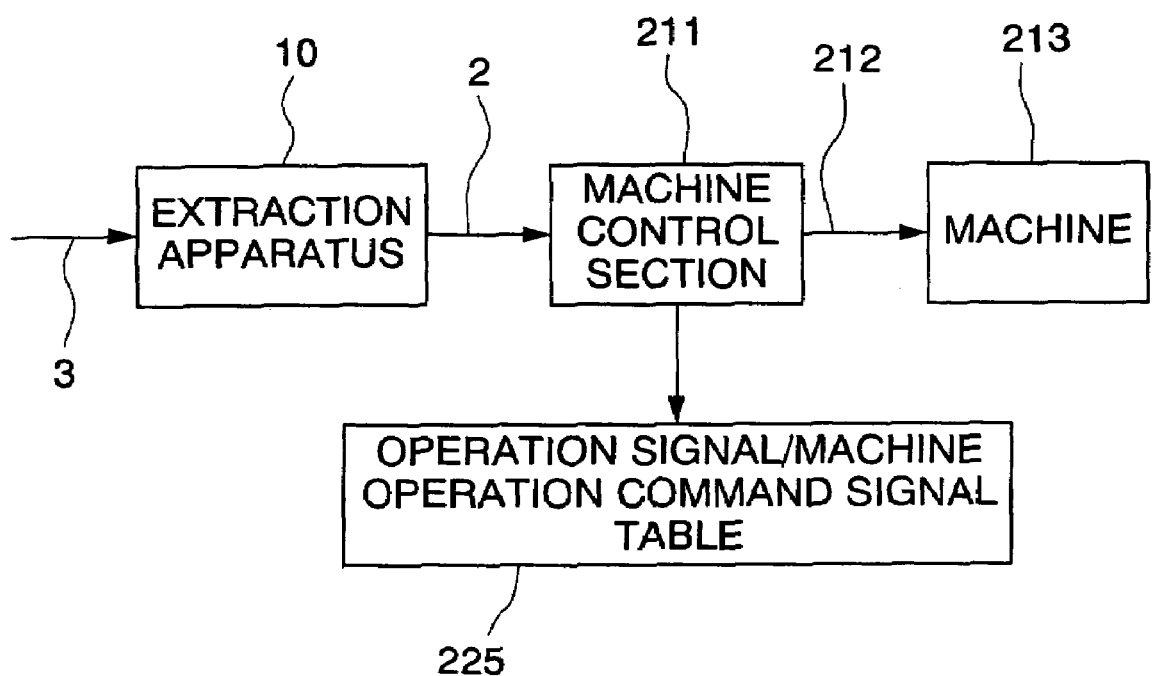
FIG. 14 is a diagram to show an example of the structure of a machine controlling section in the third embodiment.

FIG. 14 is a diagram to show an example of the structure of the machine control section, and the numeric symbols 2, 3, 10 and 211~213 are the same as those in FIG. 11, and 225 represents an operation signal/machine operation command signal table. In FIG. 14, the synthesized sound signal 3 collected by the microphone and amplified is input in the extraction apparatus 10, and signal 2 (operation signal) is extracted by the extraction apparatus 10.

The signal 2 in this case is a signal comprised by a natural language character string corresponding to "GO". This signal is input in the machine control section 211, and the machine control section 211 outputs a machine operation command signal 212 corresponding to the character string "GO" by referencing the operation signal/machine operation command table 225. The machine 213 operates in accordance with the machine operation command signal.

Figure 15:
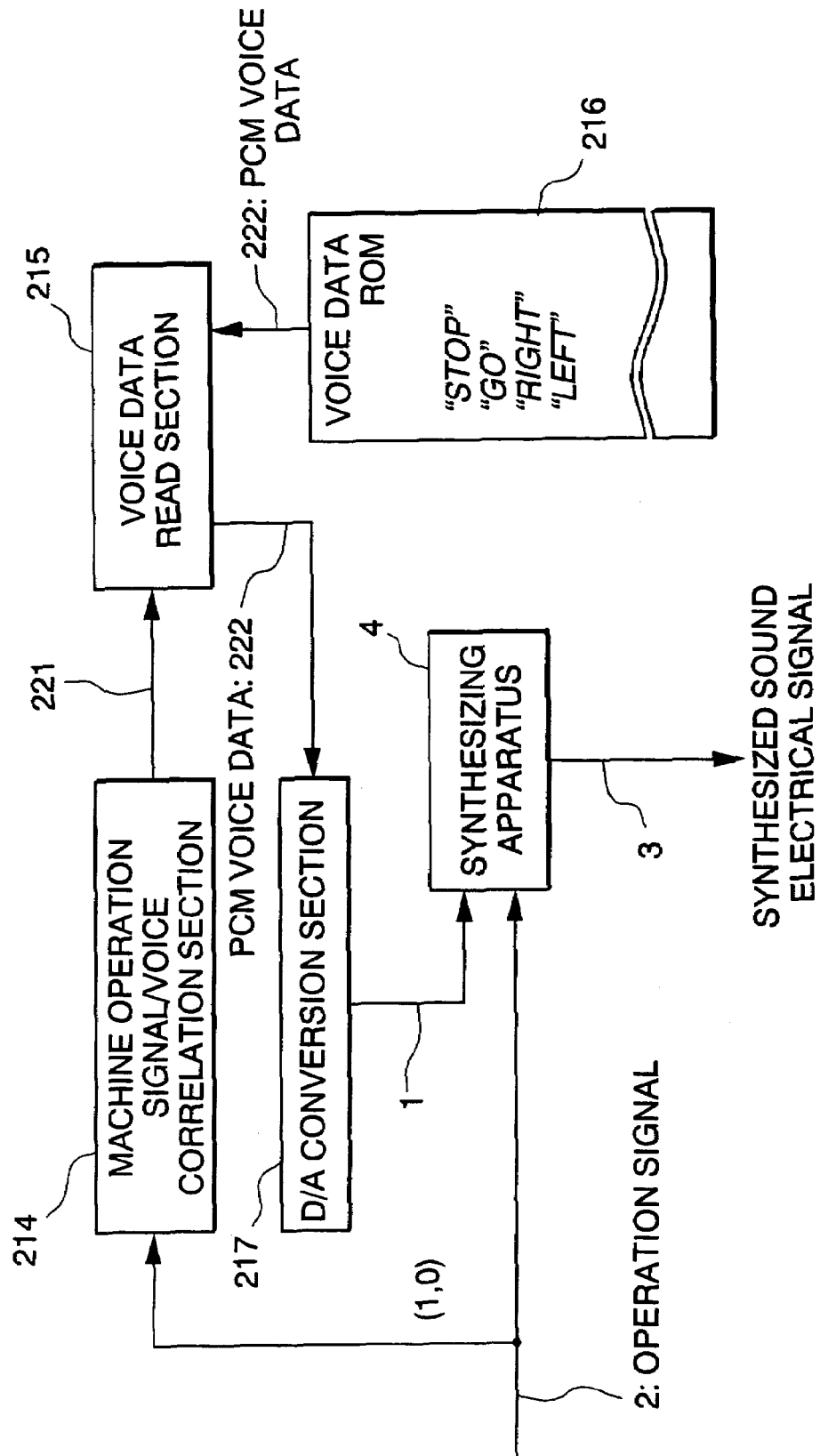
FIG. 15 is a diagram to show an example of the structure of a synthesizing section in the third embodiment.

FIG. 15 is a diagram to show another example the synthesizing apparatus, and shows a case of using a binary signal for signal 2. The numeric symbols in the diagram are the same as those shown in FIG. 13 explained earlier.

In FIG. 15, signal 2 is a binary signal, and is to be used directly as a machine operation signal. In this case, it is assumed, for example, that a machine operation signal to correspond with "COOL" has been input. The machine operation signal 2 is input in the machine operation signal/voice correlation section 214, and the machine operation signal/voice correlation section 214 outputs a ROM addressing signal 221.

The ROM addressing signal 221 is a data showing the leading address (of "COOL" in this case) of the corresponding PCM voice data in the ROM voice data 222. The voice data read section 215 receives this and reads the PCM voice data "COOL" from the ROM voice data 216 and outputs the data.

The PCM voice data "COOL" is converted to analogue data in the D/A conversion section 217, and becomes an audible sound signal 1. The audible sound signal 1 and signal 2 (machine operation signal) are input in the synthesizing apparatus 4 to be synthesized, and a synthesized sound electrical signal 3 is output.

The operation at the receiving side is the same as that explained earlier based on FIG. 14.

As explained above, in Embodiment 3, the voice signal 1 and the corresponding machine operation signal (signal 2) are first synthesized at the sending side into one synthesized sound electrical signal by using the data hiding technique, and is emitted into the air space as a synthetic sound through the speaker by way of the amplifier.

The meaning of the sound signal can be readily understood by a person who is in the vicinity by listening with own ears. In the meantime, at the receiver side, the broadcast sound is collected by the microphone, and is converted to a synthesized sound electrical signal through the amplifier. From this synthesized sound electrical signal, the machine operation signal (signal 2) is extracted by the extraction apparatus.

Next, in the machine controller, the input machine operation control signal 2 is interpreted, and a corresponding machine control value is generated. The machine performs a specific operation according to the command value.

FIG. 16 is a diagram to explain a first example of the correlation of the voice signal and the operation signal and the machine operation, and shows a case of controlling a motion machine, such as a forklift, for example. The diagram in the column for the movement pattern in FIG. 16 shows a top view of the motion machine, and the hatched portion represents a vehicle body and the four wheels attached to the vehicle body.

The correlation of the voice signal and machine operation signal in controlling the motion machine is as shown in the columns in FIG. 16. For example, if it is desired to move the machine forward, "GO" is pronounced as the voice signal 1. And, as the machine operation signal to correspond with this command, a natural language character string "G, O" or, when using binary signals, ("0", "1") may be set.

In this case, the natural language character string can be expressed as in the example of configuration of the synthesizing apparatus shown in FIG. 13, alphabetical ASCII codes (8-bit information) corresponding to the natural language character string. In this way, one character in the ASCII code can be expressed by 8-bits. For example, "GO" becomes a 16-bit code consisting of "01000111" and "01001111".

The synthesized sound is emitted from the speaker and is collected by the microphone at the receiver side. Concurrently, a person in the vicinity hears the machine sound "GO", and can readily understand the fact that a command has been issued from the sending apparatus to the motion machine to move the machine forward. At the receiving side, the following operations are performed.

That is, the operation signal (signal 2) is extracted from the synthesized sound electrical signal received by the extraction apparatus 10. In the case of the above example, either the bit strings "01000111" and "01001111" expressing the character string "GO" or a binary signal ("0", "1") shown in FIG. 16 is extracted. The meaning of the operation signal (signal 2) thus extracted is interpreted by the machine control section.

Then, the operations signal is converted by the machine control section 211 into machine operation command signal to rotate the drive wheels of the motion machine in the forward direction as well as to set (correspond with "GO") the steering wheel in the straight forward direction, and is sent to the motion machine. The result is that the target machine moves forward.

FIG. 17 is a diagram to show a second example to correlate the voice signal with operation signal of the machine operation, and corresponds to a case of controlling an air conditioner. The correlation of the voice signal and the machine operation signal in controlling the motion machine is as shown in the columns in FIG. 17.

In FIG. 17, if it is desired to cool using the air conditioner, for example, "COOL" is pronounced as the voice signal 1. And, as the machine operation signal to correspond with this command, a natural language character string "C, O, O, L" or, when using binary signals, ("1", "0") may be set.

The synthesized sound is emitted from the speaker and is collected by the microphone at the receiver side. Concurrently, a person in the vicinity hears the machine sound "COOL", and can readily understand the fact that a command has been issued from the sending apparatus to the motion machine to start cooling action of the air conditioner. At the receiving side, the following operations are performed.

That is, the operation signal (signal 2) is extracted from the synthesized sound electrical signal received by the extraction apparatus 10. The meaning of the operation signal thus extracted is interpreted by the machine control section. In this example, it is converted to the machine operation command signal to operate the cooling apparatus in the air conditioner, and is sent to the air conditioner. The result is that the air conditioner begins cooling operation.

Here, when the structure shown in FIG. 12 is to be adopted, transmission of the machine operation signal is carried out directly using the transmission path 224 without propagating through the air space between the speaker and the microphone. The transmission path may utilize a signal transmission path for normal analogue and digital signals or an optical link.

FIG. 18 is a diagram to show still another example of the structure of the synthesizing apparatus. In the diagram, numeric symbol 1 represents an audible sound signal, 2 a signal, 3 a synthesized sound electrical signal, 4 a synthesizing apparatus, 226 a voice recognition section, 227 a character string/operation signal conversion section, and 228 a natural language character string.

In the example shown in FIG. 18, the features are that the audible sound signal 1 is a natural voice sound input and that the signal 2 is a signal resulting from voice recognition of the input natural voice sound.

The natural voice input sound is recognized in the voice recognition section 226, and is output as a natural language character string 228. This natural language character string 228 is input in the character string/operation signal conversion section 227 and is converted to the machine operation signal (signal 2). Then, the natural voice sound (audible sound signal 1) and the machine operation signal (signal 2) are synthesized in the synthesizing apparatus 4, and a synthesized sound electrical signal 3 is output.

FIG. 19 is a diagram to show still another example of the synthesizing apparatus. In this diagram, numeric symbol 218 represents an ASCII code table, 219 an ASCII code converter, and other numeric symbols are the same as those in FIG. 18.

In FIG. 19, the natural language character string 228 output from the voice recognition section 226 is input in the ASCII code converter 219. The ASCII code converter 219 converts the natural language character string 228 to an ASCII code by referencing the ASCII code table 218.

The signal comprised by the ASCII code is input as signal 2 in the synthesizing apparatus 4. The synthesizing apparatus 4 synthesizes this signal with the audible sound signal 1 (natural voice sound) to generate a synthesized sound electrical signal 3, which is output. Other structures and operations related to FIGS. 18, 19 are the same as those explained earlier, and explanations are omitted.

Here, in the explanation for Embodiment 3, the example related to the case of converting the natural language character string to the ASCII code, but this is not limited to the ASCII code, and it is obvious that other character codes can also be used.

Embodiment 4

In Embodiment 4, the purpose is to provide information transmission means that can be operated reliably without being affected by noise, even when the external noise is extremely high, so as not to cause errors in the transmitted information to trigger erroneous operation of the machine.

FIG. 20 shows the basic structure used in Embodiment 4.

In FIG. 20, numeric symbol 1 represents an audible sound signal, 1-1~1-3 are channels, 2 a signal, 3 a synthesized sound electrical signal, 304-1~304-3 amplifiers, 305-1~305-3 speakers, 306 is a synthesizing apparatus, 306-1~306-3 synthesizing sections for respective channels, 307 a receiving apparatus, 308 an extraction apparatus, 309 a machine, 310 a transmission path, and 311 a person.

In FIG. 20, each audible sound signal in each of the channels 1-1~1-3 is synthesized with signal 2 in the respective synthesizing sections 306-1~306-3 of the synthesizing apparatus 306 to produce respective synthesized sound electrical signals 3. The synthesized sound electrical signal 3 is amplified in the amplifiers 304-1~304-3 and is output from the speakers 305-1~305-3 as acoustic sound. The person 311 is able to hear the sound.

Further, the synthesized sound electrical signal 3 is sent to the signal transmission path 310. The receiving apparatus 307 receives the synthesized sound electrical signal 3 and extracts signal 2 therefrom, and operates the machine 309 according to the signal 2.

In present embodiment, as described earlier, the synthesized sound electrical signal 3 is amplified in the amplifiers 304-1~304-3 and is output from the speakers 305-1~305-3 as an acoustic sound, but pre-amplification audible sound signals in respective channels may be amplified and output from the speakers.

However, as in present embodiment, by outputting after amplifying the synthesized sound electrical signal 3 in the amplifiers 304-1~304-3, the acoustic output of the synthesized sound electrical signal may be received in a microphone and the like, and it is possible to extract signal 2 from the output of the microphone, and therefore, the range of applicability is increased.

Figure 21:
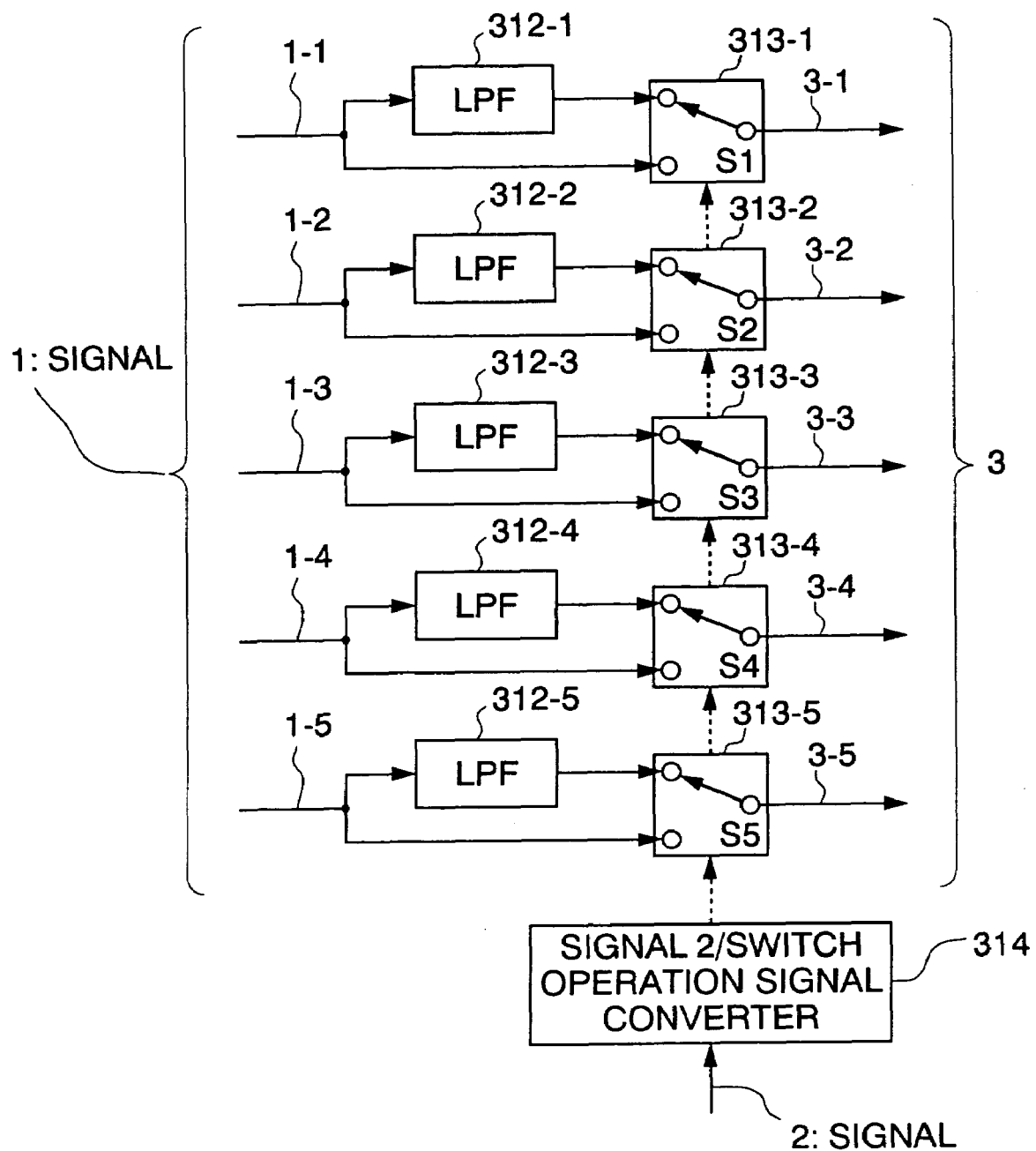
FIG. 21 is a diagram to an example of the structure of a synthesizing section in the fourth embodiment.

FIG. 21 is a diagram to show a first structure of the synthesizing apparatus. In the diagram, 1-1~1-5 represent channels, 3 represents a synthesized sound electrical signal, 3-1~3-5 synthesized sound electrical signals in respective channels, 312-1~312-5 low-pass filters (abbreviated as LPF in the diagram), 313-1~313-5 changeover switches (abbreviated as S1~S5 in the diagram), and 314 a signal 2/switch operation signal converter.

The signal 2/switch operation signal converter 314 in FIG. 21, upon receiving a signal 2, converts this signal 2 to a switch operation signal, and this is given to the changeover switches 313-1~313-5 (S1~S5). The changeover switches 313-1~313-5 receiving the switch operation signal perform switching operations according to pre-determined settings.

Figures 22A, 22B:
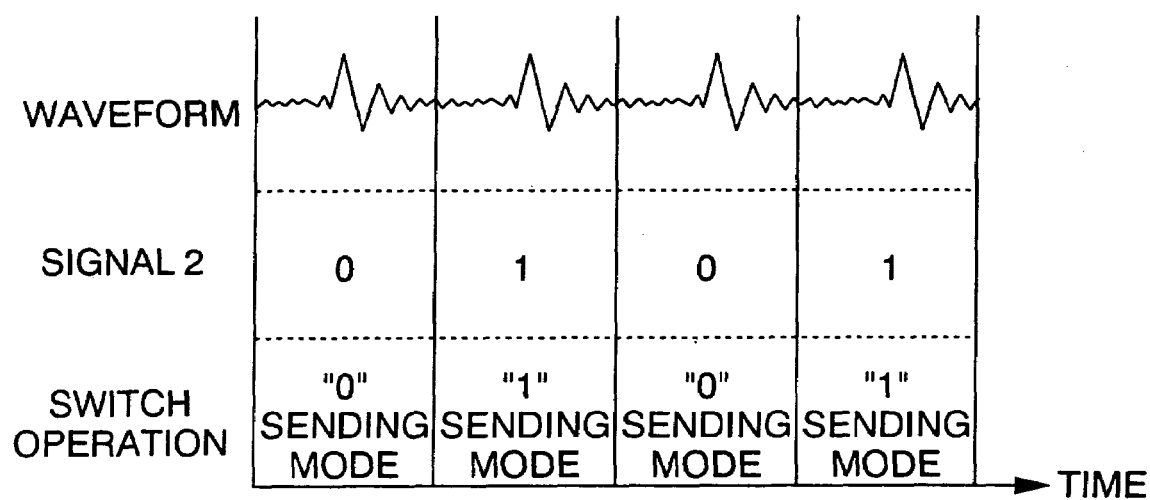
FIGS. 22A and 22B are diagrams to show examples of the relationship of the input signal and switching operation in the fourth embodiment.

FIGS. 22A, 22B show a relationship of signal 2 to the operations of the changeover switches S1~S5. In this example, as shown in FIG. 22A, when sending "0" using the synthesized sound electrical signal, the changeover switches S1, S3, S5 are connected to the lowpass filter side, and when sending "1" using the synthesized sound electrical signal, the changeover swatches S2, S4 are connected to the lowpass filter side. FIG. 22B shows the relationship of the signal 2 in this condition to the operation of the changeover switches.

Figure 23:
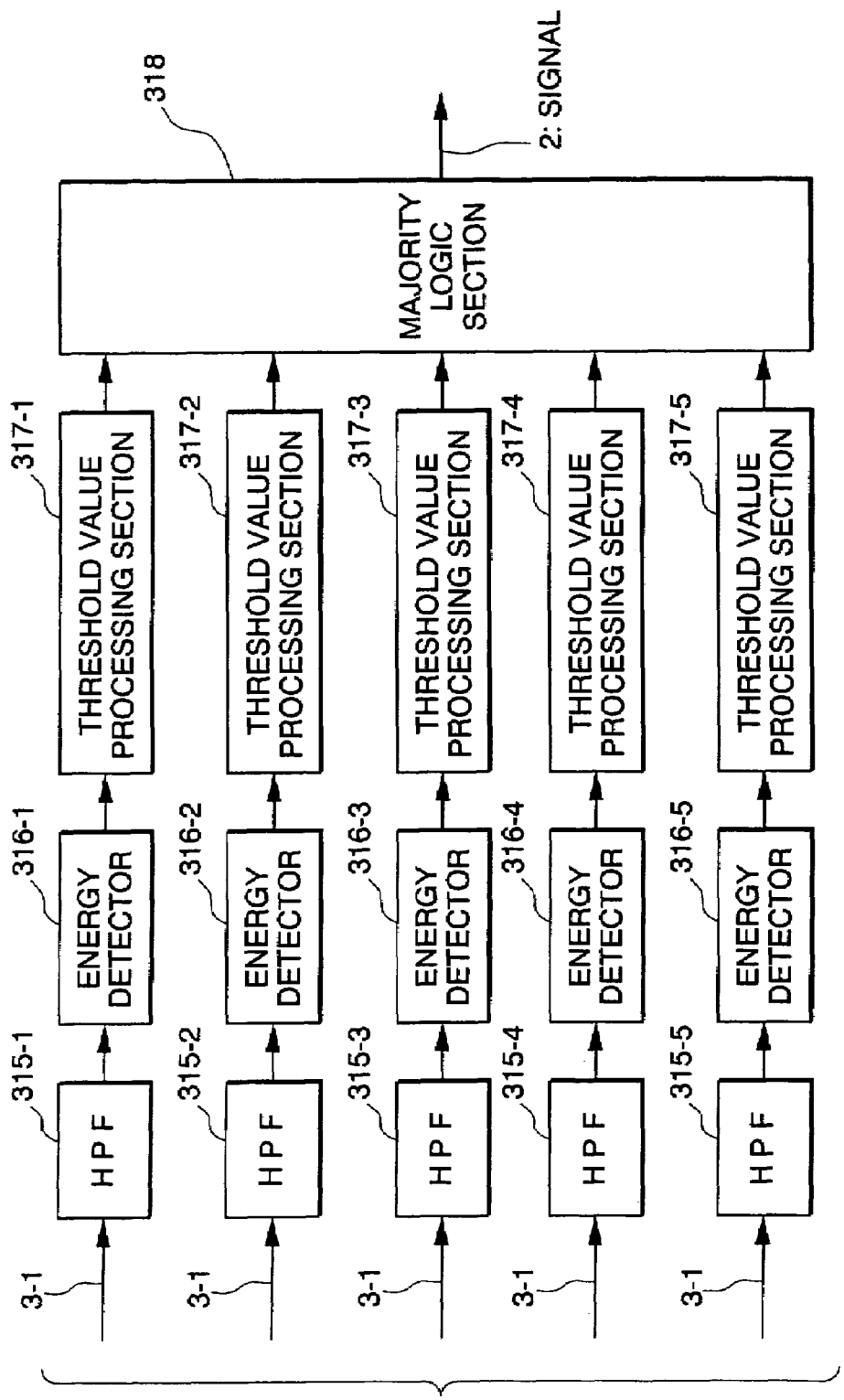
FIG. 23 is a diagram to show an example of the structure of an extraction section in the fourth embodiment.

FIG. 23 is a diagram to show an example of the structure of the synthesizing apparatus. In FIG. 23, numeric symbol 3 represents a synthesized sound electrical signal, 3-1~3-5 represent synthesized sound electrical signals in each channel, 315-1~315-5 highpass filters (abbreviated as HPF in the diagram), 316-1~316-5 energy detectors, 317-1~317-5 threshold processing section, and 318 a majority logic section. As explained earlier, on the synthesizing apparatus side shown in FIG. 21, depending on the value "0" or "1" of signal 2, control is exercised whether to output an audible sound signal by passing it through the lowpass filter or to output as it is. Thus, by passing the synthesized sound electrical signal through the highpass filter and analyzing the frequencies, it is possible to discriminate whether the synthesized sound electrical signal has been put through the lowpass filter on the synthesizing apparatus side or has been output as it is.

In other words, when a frequency component higher than a specific frequency is contained in a signal, this signal has been output from the synthesizing apparatus side as it is without putting it through the lowpass filter. And, because it has been decided whether to pass or not pass through the lowpass filter for individual channels, depending on whether the value of signal 2 is "0" or "1", it is possible to discriminate whether signal 2 is "0" or "1" from the above discrimination result.

Here, the cutoff frequencies of the highpass filters 315-1~315-5 may be set at approximately the same values as those of the lowpass filters 312-1~312-5 on the synthesizing apparatus side.

The operation will be further explained with reference to FIG. 23. The synthesized sound electrical signals 3-1~3-5 in individual channels are put through respective highpass filters 315-1~315-5 and are input in the energy detectors 316-1~316-5.

In the energy detectors 316-1~316-5, frequency components are analyzed and the results are determined in the threshold processing section 317-1~317-5. The output from the threshold processing sections 317-1~317-5 are input in the majority logic section 318, and the majority logic section 318 performs majority decision for each output of the threshold processing sections 317-1~317-5, and after determining whether signal 2 is "0" or "1", the results are output.

In present embodiment, because the majority discrimination is performed on the signals embedded in a plurality of channels, the results are less prone to be affected by the noise, so that signal 2 can be transmitted more reliably, and their polarities can be determined more accurately.

Figure 24:
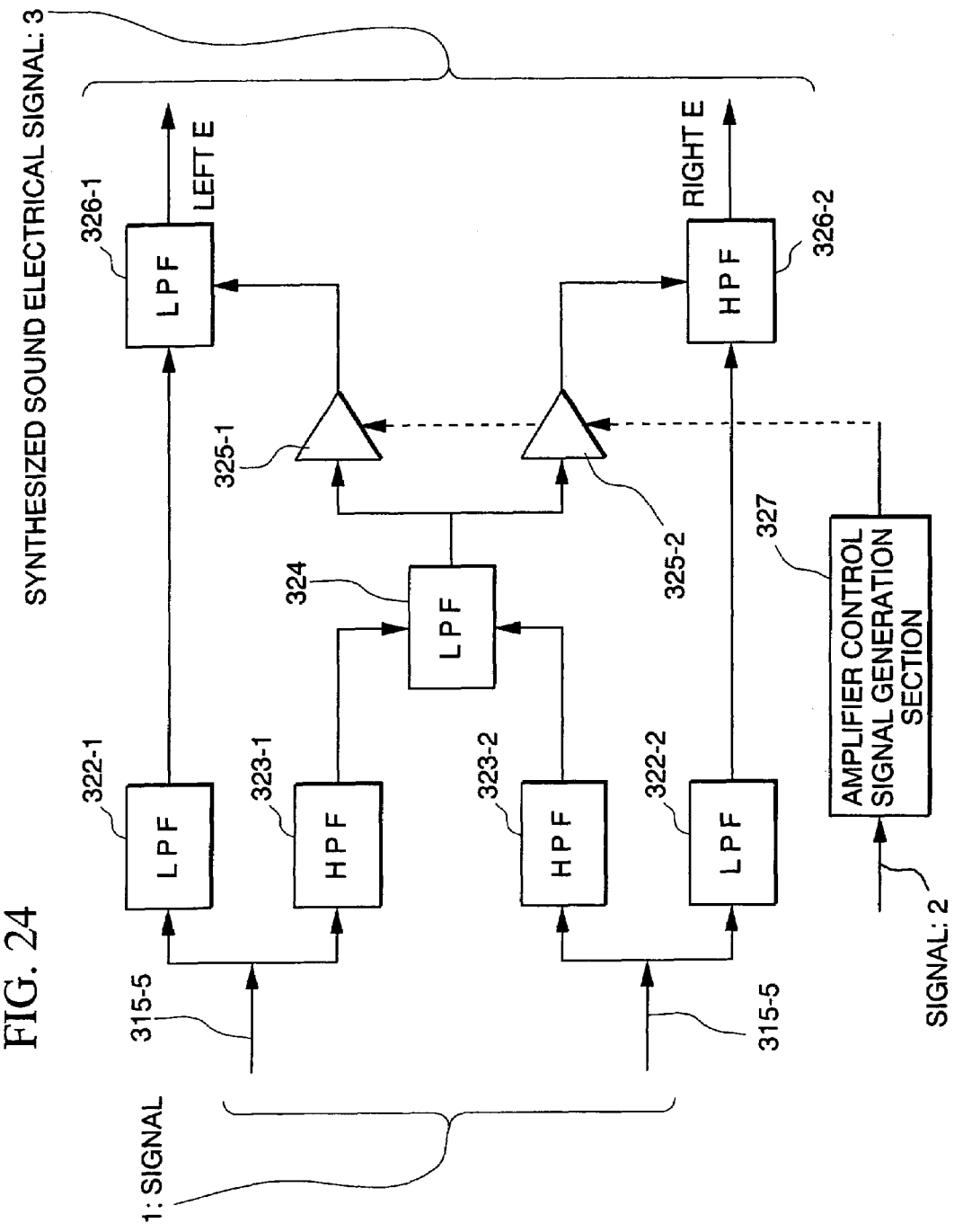
FIG. 24 is a diagram to show a second example of the structure of the synthesizing apparatus in the fourth embodiment.

FIG. 24 is a diagram to show a second example of the synthesizing apparatus. In FIG. 24, numeric symbols 321-1, 321-2 represent audible sound signals, 3 represents a synthesized sound electrical signal, 322-1, 322-2 lowpass filters (abbreviated as LPF in the diagram), 323-1, 323-2 highpass filters (abbreviated as HPF in the diagram), 324, 326-1, 326-2 are mixers (abbreviated as MIX in the diagram), and 327 an amplifier control signal generation section.

In the example shown in FIG. 24, the audible sound signals 321-1, 321-2, respectively, represent a left channel signal and a right channel signal of a stereo sound. In this diagram, the left channel signal 321-1 that passed through the highpass filter 223-1 and the right channel signal 321-2 that passed through the highpass filter 323-2 are synthesized in the mixer 324, and are further input in the amplifiers 325-1, 325-2.

The output from the amplifiers 325-1 is synthesized by the mixer 326-1 with the left channel signal 321-1 that passed through the lowpass filter 322-1, and becomes a left E signal.

On the other hand, the output from the amplifiers 325-2 is synthesized by the mixer 326-2 with the right channel signal 321-2 that passed through the lowpass filter 322-2, and becomes a right E signal. Then, a synthesized sound electrical signal 3 is formed by the left E signal and the right E signal.

The amplifier control signal generation section 327, depending on the value "0" or "1" of signal 2, controls the gain of the amplifiers 325-1, 325-2. For example, when signal 2 is "0", the gain on the amplifier 325-1 side is controlled so as to be 20 dB lower than normal. On the other hand, when signal 2 is "1", the gain on the amplifier 325-2 side is controlled so as to 20 dB lower than normal.

Figure 25:
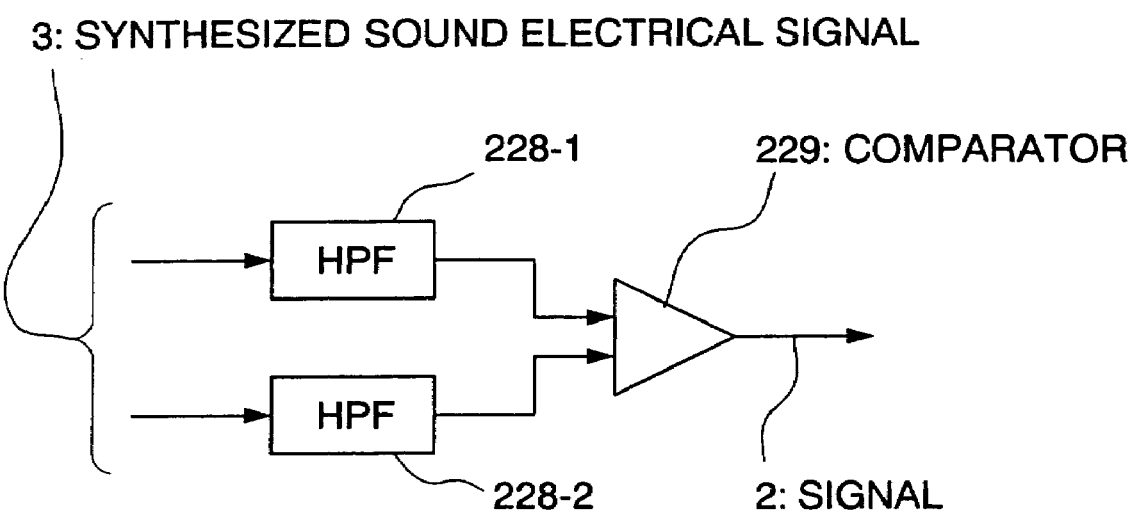
FIG. 25 is a diagram to show a second example of the structure of the extraction apparatus in the fourth embodiment.

FIG. 25 is a diagram to show a second example of the structure of the synthesizing apparatus, and this synthesizing apparatus extracts signal 2 from the synthesized sound electrical signal output from the synthesizing apparatus shown in FIG. 24. In FIG. 25, numeric symbol 228-1, 228-2 represent highpass filters, 229 represents a comparator. The cutoff frequencies of the highpass filters 228-1~228-2 may be set at approximately the same values as those of the highpass filters 223-1, 223-2 on the synthesizing apparatus side.

The output from the highpass filters 228-1, 228-2 are compared in the comparator 229, and are determined as "0" or "1" based on the magnitude, and are output as signal 2.

As described earlier, in the synthesizing apparatus side, it is controlled so that, when signal 2 is "0", the gain of the amplifier 225-1 is lower than normal by 20 dB, and when signal 2 is "1", the gain of the amplifier 225-2 is lower than normal by 20 dB.

Therefore, if the output from the highpass filter 228-1 in FIG. 25 is higher than the output from the highpass filter 228-2, then signal 2 is "1", and conversely, if the output from the highpass filter 228-2 is higher than the output of the highpass filter 228-1, then, signal 2 is "0". The output signal 2 (either "0" or "1") is given to the control section of the machine as a command signal, and is converted in the control section to a machine operation control signal to operate the machine.

As explained above, in present embodiment, the sending side embeds signals in a plurality of independent channels, and the receiving side extracts embedded signals by comparing the signals in the plurality of channels, and therefore, binary signals can be transmitted at a higher stability and precision.

Embodiment 5

In Embodiment 5, the present invention is applied to a method of controlling the operation of a robot.

For example, there have been toys robots that can dance to music. Specific examples include a toy robot called "dancing flower" which has an artificial flower or a doll that responds to a music and displays swing motion.

This toy is constructed so that music and the like is collected by a microphone housed inside the artificial flower or doll, and is converted to electrical signals so that the artificial flower or the doll are made to sway by driving an actuator inside the dancing flower in accordance with the amplitude of the signals. For this reason, such robotic toys can only perform repetitive simple motion according to the sound pressure levels without relating to melody or rhythm of the music.

To elevate the dancing motion of a robot to an artistic level, it is necessary to control its motion in such a way to be congruent with the musical texture represented by melody and rhythm of the music, that is, to choreograph the dancing motion.

In present embodiment, as described below, by embedding motion signals in the dance music for the robot, detailed movements of the robot can be controlled using a simple control structure without the need for information transmission means for customized motion signal.

FIGS. 26A, 26B show the fundamental structure of the present invention. FIG. 26A shows the sending side and FIG. 26B shows the receiving side.

In FIG. 26A, numeric symbol 401 represents a tone signal and 402 represents a dance operation signal, and other numeric symbols are the same as those shown in FIG. 1A. Also, in FIG. 26B, numeric symbol 411 represents a robot control section, 412 an actuator command signal, 413 a human-shaped robot, 414 an operational mechanism of the robot, and other numeric symbols are the same as those shown in FIG. 1B.

In the structural diagram of the receiving side shown in FIG. 26B, although the microphone 9, amplifier 5, extraction apparatus 10 and robot control section 411 are drawn separately from the human-shaped robot 13, it is obvious that such constituting sections on the receiving side may be housed inside the body of the human-shaped robot 13, or they may be housed inside a platform (not shown) that the human-shaped robot 13 is mounted.

Next, the overall flow of the signal will be explained. The sending side in FIG. 26A is constructed by replacing the audible sound signal 1 in FIG. 1A with the musical signal 40 and signal 2 in FIG. 1A with the dance operation signal 2. Therefore, to the stage of extracting the dance operation signal 402 using the synthesizing apparatus 10 in FIG. 26B, it is the same as those in FIGS. 1A and 1B.

Next, the dance operation signal 402 is input in the robot control section 411 to generate internally an actuator command signal 412 (or command value) for the robot, and the human-shaped robot 413 operates in accordance with the command signal or the command value. Person in the vicinity can observe the manner of robot motion with the peripheral vision while listening to the dance music to enjoy the dance performance of the robot.

Next, a method of correlating the music with the movement will be explained. This is achieved by defining the relative chronological relationship of the tone signal 401 to the dance operation signal 402. As an example, a case to be explained relates to the human-shaped robot shown in FIG. 26B performing a dance operation routine using a music expressed by the musical score shown in FIG. 27 to produce a dance routine by combining four dance operation patterns shown in FIG. 28.

Because the rhythm of this music is four beats, four dance steps are to be defined per one bar. Designating the dance operation code corresponding to the j-th beat of the i-th bar by Cij, the flow of the dance operation code of this music, that is, the code sequence can be expressed as, starting from the first bar: $C_{11} C_{12} C_{13} C_{14} C_{21} C_{22} C_{23} C_{24} \ldots$.

Figure 28:
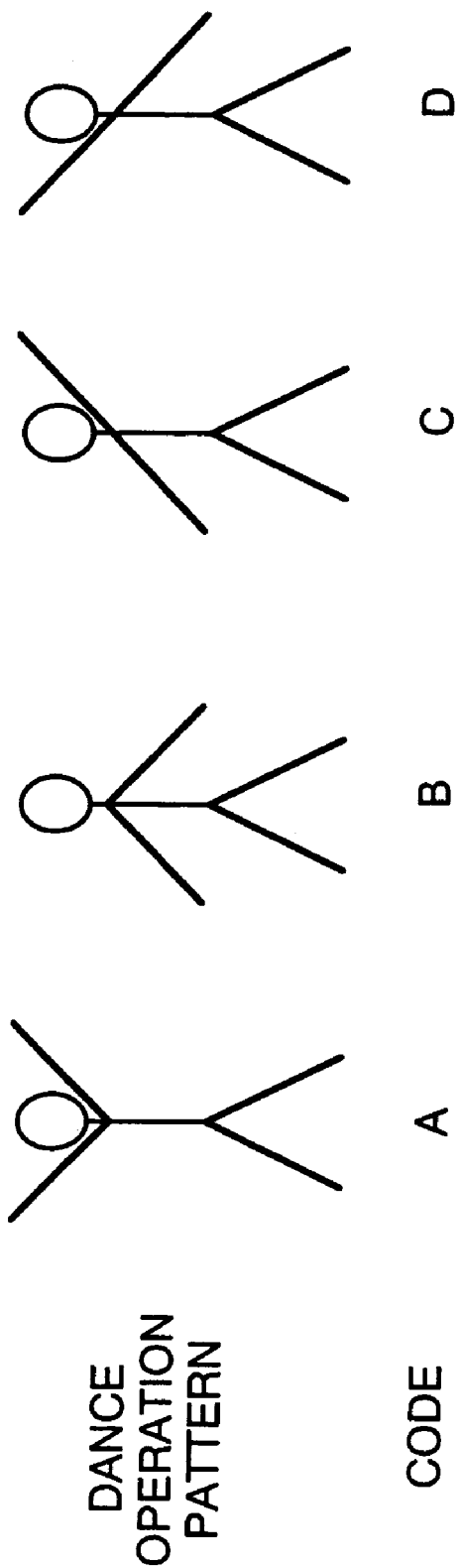
FIG. 28 is a diagram to show the attitude of a dance operation of a robot and the corresponding dance operation codes.

Next, the dance stance of the robot, that is, as an example of the dancing pattern, four stances A, B, C, D shown in FIG. 28 may be considered. That is, A is a stance with both arms up, B is a stance with both arms down, C is a stance with the right hand up and the left hand down, and D is a stance with the left hand up and the right hand down.

In the following, to simplify the explanation, an example of the motion during the second bar will be explained. For example, if it is desired to dance in the order of D, C, B, A, the dance operation codes should be arranged as follows.

$$C_{21}=D, C_{22}=D, C_{23}=B, C_{24}=A \tag{1}$$

This dance operation code, as the dance operation code 402, is synthesized with the tone signal 401 in the synthesizing apparatus 4. For this purpose, any of the synthesizing methods explained in the forgoing embodiments can be used.

At the receiving side, dance operation codes that are the same as equation (1) are extracted by the extraction apparatus 10, and the robot control section 411 receives these codes successively, and sends actuator command values to correspond to the code to the human-shaped-robot 413.

Here, when the tempo of the music is relatively fast, due to delay in robot control operation or in the transmission delay, it may appear sometimes that the robot motion lags the music. In such a case, the composite sounds should be generated so that the overall code sequence of the dance operation is increased to match the tempo of the music. By so doing, at the receiver side, at a certain point in time of music flow, the intended operational pattern code corresponding to that certain point in time has already been transmitted to the control section of the robot, so that the dance routine may be totally synchronized to the music without causing the problem of time delay.

Figure 29:
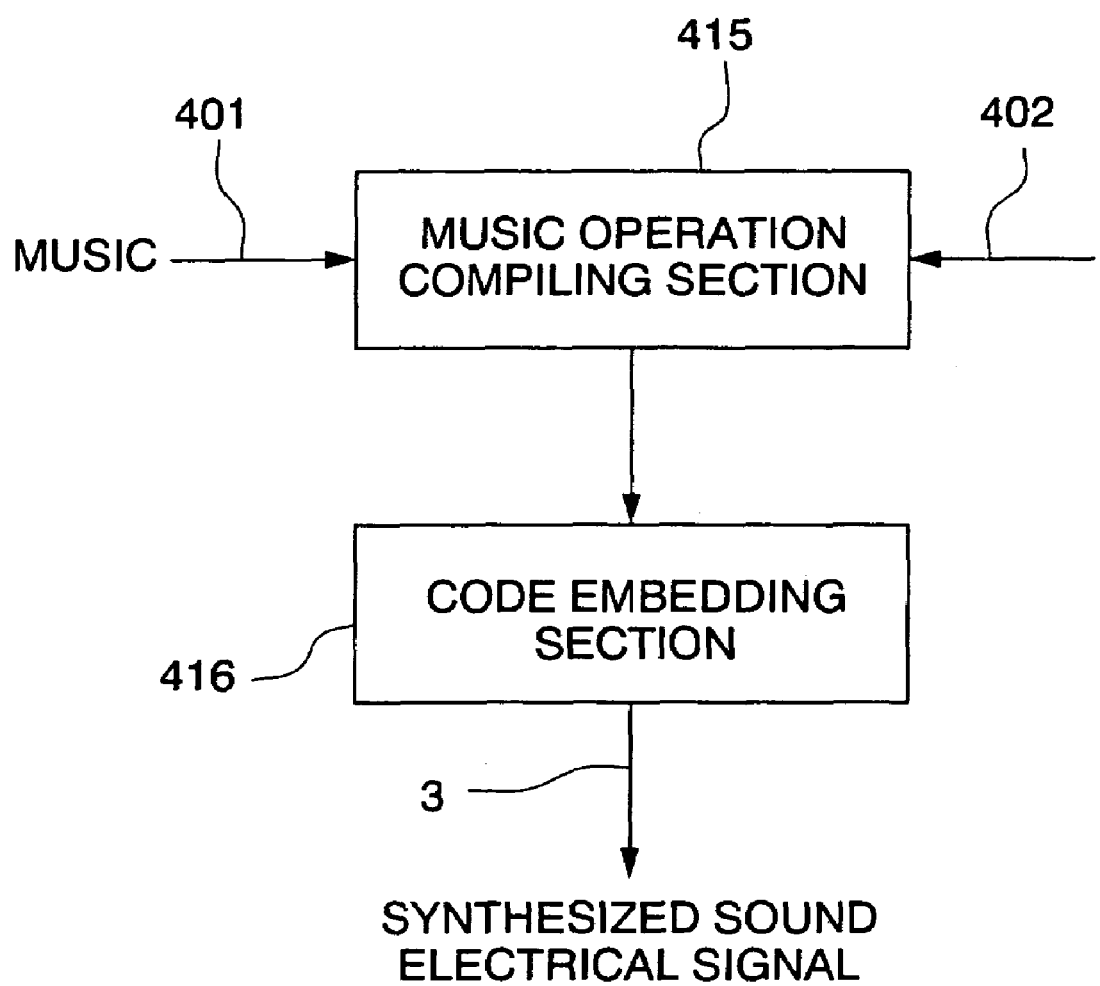
FIG. 29 is a diagram to show an example of the structure of an extraction section in the fifth embodiment.

FIG. 29 is a diagram to show an example of the structure of the synthesizing apparatus 4. In FIG. 29, numeric symbol 401 represents a tone signal (in this case, music), 402 a dance operation signal (in this case, dance operation code), 3 a synthesized sound; 415 a musical operation compiling section, and 416 a code embedding section.

In FIG. 29, music 1 and dance operation code 2 are compiled in the music operation compiling section 415, and are synthesized in the code embedding section 416, and are output as a synthesized sound electrical signal 3. In the following, the operation of the synthesizing apparatus will be explained using a case of 4/4 beat.

Designating N as the total bar number, mi(t) as an i-th bar tone signal, Pij(t) as an i-th bar j-th beat tone signal, and representing the time-series by symbols [;], [{ }], the original tone signal waveform Morg can be expressed as follows:

$$Morg(t)=\{m_1(t); m_2(t); \ldots, m_N(t)\} \tag{2}$$

where $m_i(t)=\{Pi_1(t); Pi_2(t); Pi_3(t); Pi_4(t)\}$.

And, the vector of the dance operation signal can be expressed as follows:

$$Cdance=(C_1, C_1, \ldots, C_N) \tag{3}$$

where $C_i=(C_{11}, C_{12}, C_{13}, C_{14})$

Further, the tone signal waveform Mhyper synthesized on the basis of the tone signal waveform Morg and the vectors Cdance of the dance operation signal can be expressed as in equation (4) below:

$$Mhyper(t)=\{m_{hyper(1)}(t); \ldots; m_{hyper(N)}(t)\} \tag{4}$$

The synthesized signal waveform of Cij to Pij is expressed using "ћ" as equation (5):

$$Pij \text{ℵ} Cij$$

The term $[m_{hyper(1)}(t)]$ in equation (4) can be expressed as equation (6):

$$m_{hyper(1)}(t)=\{P_{11}C_{11}; P_{12}C_{12}; P_{13}C_{13}; P_{14}C_{14}\} \tag{6}$$

The generation method of equation (5) is realized by the code embedding section 416 shown in FIG. 29. This generation method uses items explained in the foregoing example.

Figure 30:
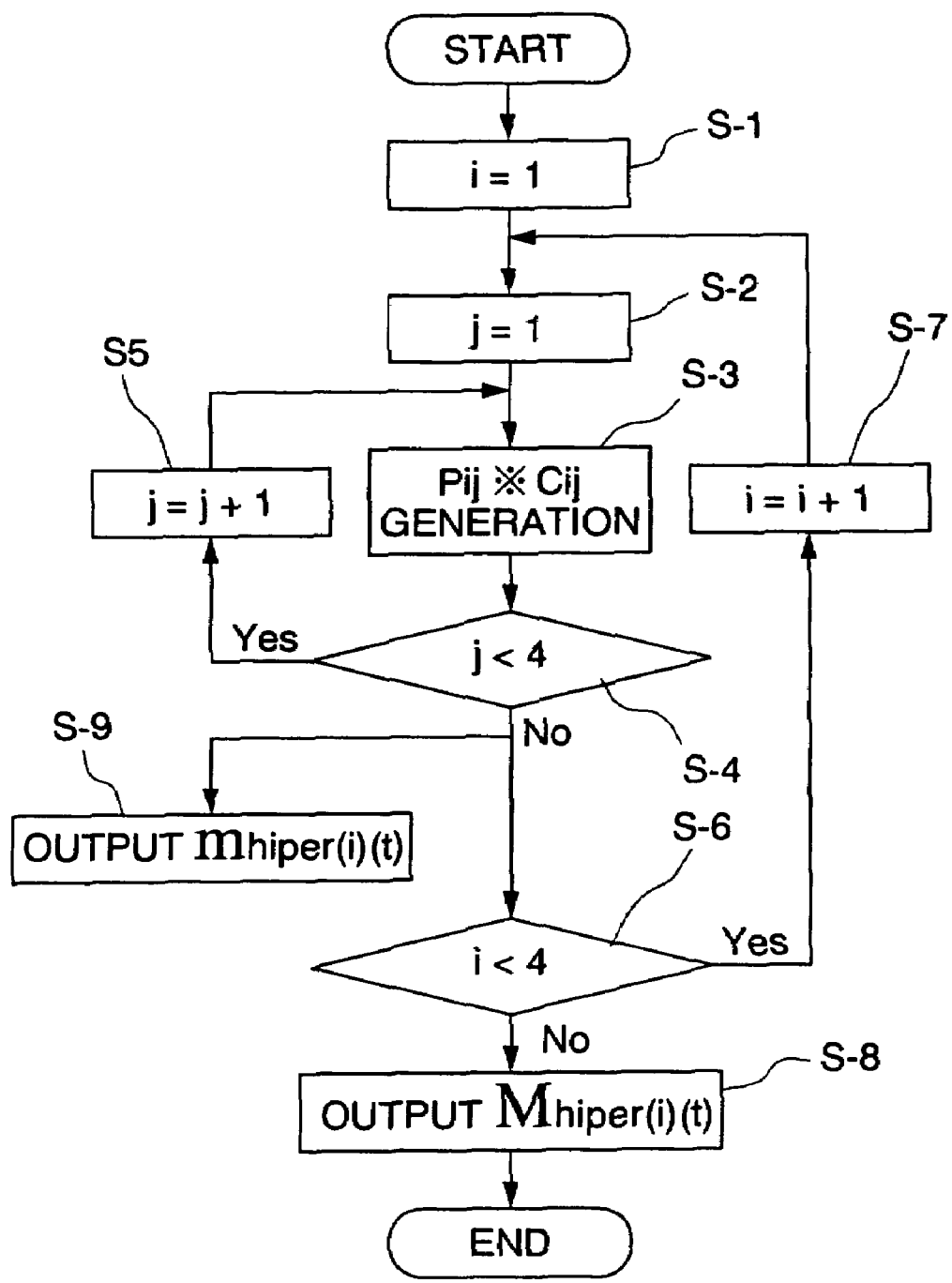
FIG. 30 is a flowchart to show the processing steps in the synthesizing apparatus in the fifth embodiment.

The processing steps for obtaining the tone signal waveform Mhyper(t) shown in equation (4) from the Morg(t) shown in equation (2) and the dance operation signal waveform Cdance shown in equation (3) are as shown in the flowchart in FIG. 30. The designations (S-1)~(S-9) in the diagram represent processing steps, and the steps S-1~S-9 are referenced in the following.

(step S-1), first, i is set to the initial value 1.
(step S-2), next, j is set to the initial value 1.
(step S-3), a synthesized signal waveform of Cij to Pij is generated.
(step S-4), then, it is examined whether j has reached 4.
(step S-5), if j is less than 4, "1" is added to j and return to (step S-3).
(step S-6), next, it is examined whether i has reached N.
(step S-7), if i is less than N "1" is added to i and return to (step S-2).
(step S-8), Mhyper(t) is output, and the process is finished.

Or, in step S-8, instead of outputting collected Mhyper(t), it is possible to output $m_{hyper(t)}$ for every bar, and by so doing, signal embedding and signal sending can be performed in real time.

Figure 31:
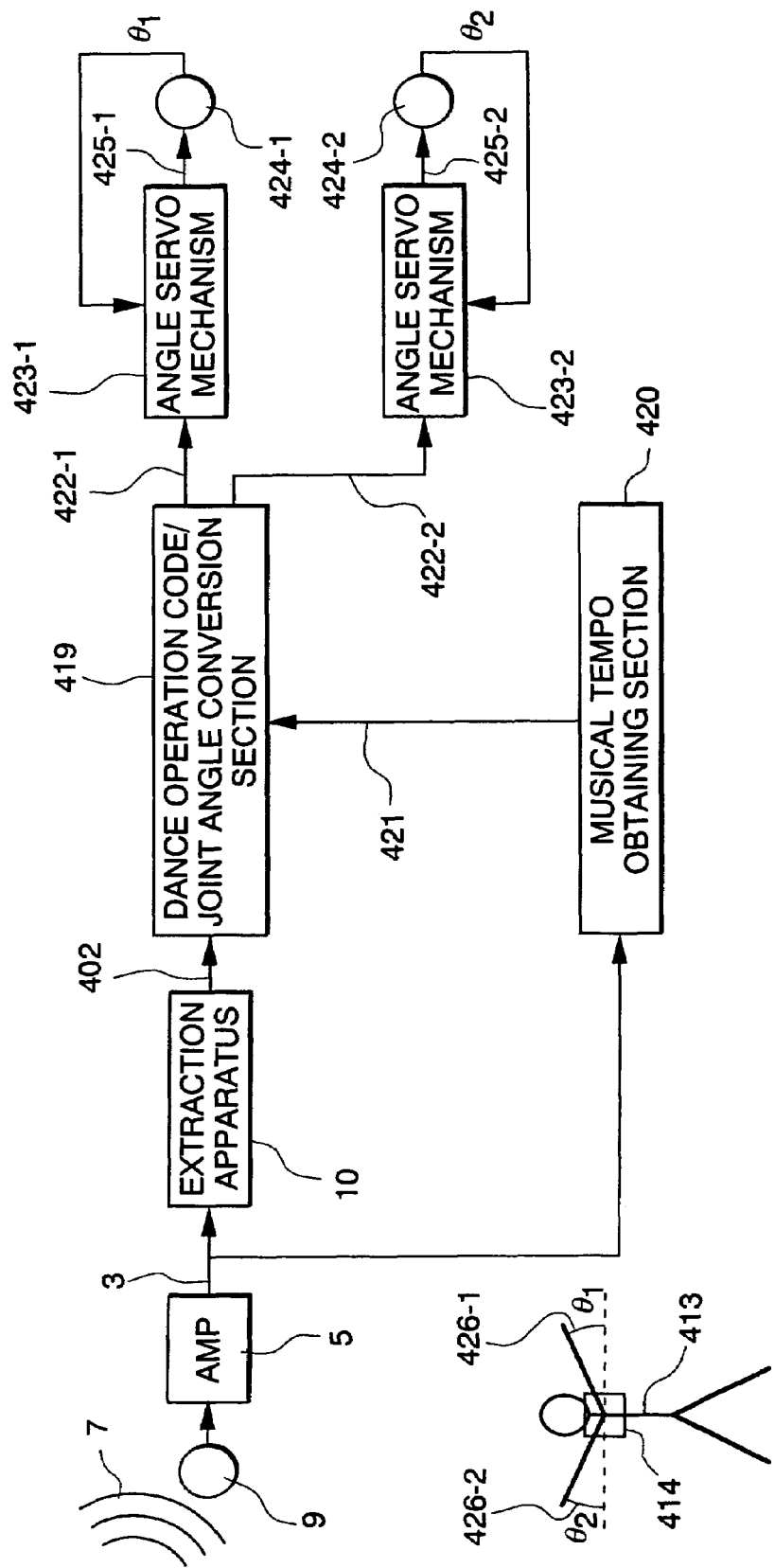
FIG. 31 is a diagram to show an example of the structure on the receiver side.

FIG. 31 is a diagram to show an example of the structure at the receiving side in the present embodiment. The flow of signals along the numeric symbols 7, 9, 5, 3, 10, 402 in FIG. 31 is the same as that explained in FIG. 26B.

Also, in FIG. 31, 419 represents a dance operation code/joint angle conversion section, 402 a music tempo obtaining section, 422-1 a θ1 target value signal, 422-2 a θ2 target value signal, 423-1 a rotation angle servo mechanism for motor 1, 423-2 a rotation angle servo mechanism for motor 2, 424-1 a motor 1, 424-2 a motor 2; 425-1 and 425-2 motor drive current, 413 a human-shaped robot, 414 an operation section for the robot, 426-1 a right arm angle (θ1) of the human-shaped robot 413, 426-2 a left arm angle (θ2) of the human-shaped robot 413.

In FIG. 31, the synthesized sound from the sending side is collected by the microphone 9, amplified in the amplifier 5, and its output, which is the synthesized sound electrical signal 3, is input in the extraction apparatus 10. And, the synthesized sound electrical signal 3 is also input in the musical tempo obtaining section 420. The extraction apparatus 10 extracts a dance operation code 402 from the synthesized sound electrical signal 3 and outputs the dance operation code 402.

The musical tempo obtaining section 420 generates a music tempo signal 421 from the synthesized sound electrical signal 3 and outputs the music tempo signal 421. The dance operation code/joint angle conversion section 419 generates a θ1 target value signal 422-1 and a θ2 target value signal 422-2, and outputs the signals synchronously with the music tempo signal 421.

The angle θ1 is the right arm angle 426-1 of the human-shaped robot 413, and the angle θ2 is the left arm angle 426-2 of the human-shaped robot 413. The rotation angle servo mechanism 423-1 of motor 1 receives the target value signal 422-1 of angle θ1 and controls rotation angle of motor 1 (424-1). The rotation angle servo mechanism 423-2 for motor 2 receives the target value signal 422-2 of angle θ2 and controls rotation angle for motor 2 (424-2).

The operation section 414 is a mechanical operational section comprised mainly by the rotation angle servo mechanism 423-1 for motor 1, the rotation angle servo mechanism 423-2 for motor 2, motor 1 (424-1) and motor 2 (424-2).

Summarizing, the present embodiment related to a case of sending a synthesized sound from the sending side and receiving in the microphone on the receiving side, and extracting the operation signal for the human-shaped robot from the synthesized sound electrical signal, but it is obvious that the synthesized sound electrical signal may be sent from the sending side to the receiving side through a wired transmission path, and the receiving side then extracts the operation signal from the synthesized sound electrical signal to operate the human-shaped robot.

Embodiment 6

In Embodiment 6, road information and other information necessary for driving are provided to a navigation apparatus installed in an automobile.

Drivers of automobiles would like to obtain, while driving, various fresh external information such as traffic information, weather forecast, sightseeing information and commercial information reliably, safely, simply and quickly at low cost. In the past, information for drivers has been provided through normal radio and television broadcasting. Also, in recent years in Japan, information providing services based on so-called "visible radio" through FM multiplexed text broadcasting, VICS information and car navigation system and others have also been realized.

Of such information obtaining means described above, radio broadcasting enables information to be received readily inside the vehicle using a low cost facility so that it will continue to be used in the future. However, the driver is able only to listen to the content of radio broadcasting, and because the driver is not able to take notes during driving, it is difficult to retain records of important information.

Therefore, present embodiment provides an economical means for providing voice information to car drivers through radio broadcast waves and data other than voice data concurrently.

FIGS. 32A, 32B are block diagrams of an example of the basic structure of the present embodiment, and FIG. 32A shows the sending side and FIG. 32B shows the receiving side.

In FIG. 32A, numeric symbol 501 represents original sending sound (audible sound signal), 502 represents information for car navigation and the like different than original sending sound 501, 3 a synthesized sound electrical signal, 4 a synthesizing apparatus, 505 a sending apparatus, and 506 a sending antennae.

In FIG. 32B, numeric symbol 507 represents a receiving apparatus, 508 a receiving antennae, 509 an amplifier (abbreviated as AMP in the diagram), 10 an extraction apparatus, 511 a speaker, 512 a synthesized sound, 513 a person (driver), and 514 a car navigation apparatus, and other numeric symbols are the same as those in FIG. 32A.

An outline of the flow of the signal in FIGS. 32A, 32B will be explained. First, on the sending side, the original sending sound 501 and the information 502 to be transmitted are electrically synthesized using data hiding technique, for example, under a condition such that the auditory presence of information 502 cannot be sensed by the person, and a radio signal modulated by the synthesized sound electrical signal 3 is emitted from the sending apparatus 505 through the antennae 650 into the air space. At the receiving side (automobile), the emitted wave is captured by the receiving antennae 508, demodulated in the receiving apparatus 507 to extract the synthesized sound electrical signal 3. This synthesized sound electrical signal 3 is amplified in the amplifier 509 and is output from the speaker 511 as a voice sound (synthesized sound) 512. The driver 513 is able to obtain voice information according to the synthesized sound 512.

On the other hand, the synthesized sound electrical signal 3, which is the detected wave by the receiving apparatus 507, is input in the extraction apparatus 10, and information 502 is extracted from the synthesized sound electrical signal 3 by the extraction apparatus 10. The extracted information 502 is input in the car navigation apparatus 514 to perform desired operations such as display and the like such as displaying information on the display section of the car navigation apparatus 514 or providing information to the control program of the car navigation apparatus.

Generation of the synthesized sound electrical signal 3 in the synthesizing apparatus 4 is performed using the same method explained in the embodiments. Also, the hardware structures of the synthesizing apparatus 4 and extraction apparatus 10 may be the same as those explained in the embodiments above.

FIG. 33 is a block diagram to show an example of the structure of the apparatus in the receiving side (automobile side). In FIG. 33, numeric symbol 507 represents a receiving apparatus, 508 a receiving antennae, 509 an amplifier (abbreviated as AMP in the diagram), 10 an extraction apparatus, 511 a speaker, 512 a synthesized sound, and 513 a person (driver).

Also, 515 represents an extraction timing switching apparatus, 516 an information storage apparatus, 517 a target district information database, 518 a route generation apparatus, 519 an input/output apparatus, 520 an extraction timing signal, and 521a and 521b represent operation signals input by the driver.

Overall flow of the signal will be explained with reference to FIG. 33.

The person (driver) 513 is driving while listening to radio broadcasting through a car radio in the vehicle. When information of interest is broadcast, by performing certain operations, an operation signal 521a is generated to inform the extraction timing switching apparatus 515. In response, the extraction timing switching apparatus 515 generates an extraction timing signal 520.

Then, the extraction apparatus 10 starts the process of extracting information 502, and information 502 is automatically stored in the information storing apparatus 516. Then, later on, when the driver desires, by generating an operation signal 521b given by the driver's instruction, information stored in the information storing apparatus 516 is registered in the target district information database 517. The information thus registered in the target district information database 517 is able to be used as target district information by the car navigation apparatus.

The input/output apparatus 519 displays map data recorded on a medium such as CD (compact disc) and DVD (digital versatile disc) on a display apparatus (not shown), and, the route generation apparatus 518 generates pathways from the current location to the target destination location, and displays it on the display apparatus by superimposing on the map.

In the following, some specific examples of providing commercial information using the present apparatus will be explained. In this example, as the original broadcast sound 501, a commercial message for a restaurant is heard. The commercial message conveys the following voice of an announcer along with the background music.

[This is ABC restaurant located in Tokyo, Musashino city, Midoricho, telephone number is 0422-59-0000, Internet address is www.abc.co.jp]. Information 502 related to the original broadcast sound 501 includes the name of the restaurant, its longitude and latitude, telephone number, and URL (uniform resource locator), which are arranged in the text data sequence, for example, ABC restaurant, E135N30, 0422-59-0000, www.abc.co.jp". Such information 2 is superimposed on the original broadcast sound 1 using the data hiding technique.

Broadcasting station broadcasts such a synthetic sound as normal sound. In the meantime, the driver is listening to this broadcasting, and when the driver decides that it is of interest, reception button (not shown) is turned on and an operation signal 521a is generated. Also, an extraction timing signal 520 is generated by this operation. When the extraction apparatus 10 recognizes the operation signal 520, the information 502 is extracted as text data.

The extracted information 502 is stored in the information storing apparatus 516, and the driver can use this automatically registered restaurant information at any desired time. For example, the driver can phone the restaurant for reservation, and may set this restaurant as the destination in the car navigation apparatus.

The route generation apparatus 518 in the car navigation apparatus generates route information on the basis of the longitude-latitude information contained in signal 2 that was extracted earlier and the current longitude-latitude information, and guides the driver to the site by displaying the route on the map.

Also, in the above embodiment, the timing for extraction operation for information 2 is when the driver listening to the broadcast decides that it is of interest and generates an operation signal 521a by operating a button, however, it is permissible not to adopt this approach, and, the structure may be arranged, for example, so that when radio broadcasting containing the information 2 begins, extraction of information 2 and storing action in the information storing apparatus 516 may be automatically started, and if it is found later that it is of no interest the driver can delete the registration.

Also, in the explanation provided for the above embodiment, although a beneficial effect is obtained by inputting the information embedded in the voice signal broadcast in the car navigation apparatus of an automobile, resulting in increasing the utility of the car navigation apparatus, utilization method of the present invention is not limited to such an approach, and it is obvious that there are many other methods of utilization such as transmitting emergency information as information 2, or blinking the display lamp, or displaying words on the display apparatus.

Also, in the explanation provided for the above embodiment, the synthesized sound electrical signal is transmitted by broadcasting, but it is clear that, instead of broadcasting to target a large number of listeners simultaneously, the invention can be applied to transceivers to communicate on a one-on-one basis.

Further, it is obvious that similar system may be applied not only for automotive devices but also to general household information devices. That is, by embedding various information necessary for operation of household electrical appliances in the sound source contained in television and radio broadcasting received by households, users are able to conveniently obtain information at low cost, enabling to operate household electrical appliance conveniently.

Embodiment 7

Next, Embodiment 7 of the present invention will be explained. Present embodiment enables to fuse broadcasting received in households and communication through the Internet.

Presently, virtually every household has a radio receiver that can receive middle frequency broadcasting or short-wave broadcasting or FM broadcasting. Also, in recent years, increasing number of households have appropriate environment to enable connection to the Internet.

Also, radio receiver is provided not only in households but also in automobiles in most cases to enable to listen to broadcasting. Also, there has been a rapid increase in the number of cars that are equipped with television receiver and car navigation system.

Also, opportunity is increasing for using portable personal computer inside the automobile.

Due to such recent widespread use of the Internet, program contents of conventional radio and TV, information related to programs and information to supplement the programs are often published through the Internet web page, and the listeners/viewers are now able to listen/view broadcast programs with reference to such web pages. With this trend, URL of homepage is often broadcast during broadcasting. Also, URL notification is also given routinely by commercial broadcasts.

However, when URL is publicized during programs and advertisements during radio and TV broadcasting, the listener/viewer interested in such information needs to take notes of such URL, and refer to the note to operate a keyboard to input the URL in PC, resulting in a cumbersome process.

Also, it may also be considered to transmit text information such as URL through text multiplexing broadcasting, or so-called "visible radio", but this method presents a problem that it requires broadcast station to newly install expensive facilities and the receiver side must also have dedicated receiver.

Further, information providing services attached to car navigation systems include Internet connection service, information portal service offered by car navigation system companies and providing information services based on conversation with operators; however, because contacts are made through public communication means, such as portable phones, in all cases, there are problems of cumbersome process and the need for service fees.

The present embodiment enables to transmit voice sounds to users (receiving side) through broadcast waves as well as data other than the voice sounds, for example, to send URL data to be extracted at the receiving side, and, using a PC, rapidly access homepage of this URL on the Internet.

FIGS. 34A, 34B are block diagrams of the structure of the present embodiment, and FIG. 34A shows the sending side and FIG. 34B shows the receiving side.

In FIG. 34A, numeric symbol 601 represents an original broadcasting sound (audible sound signal), 602 a network address expressed in binary format different than the original broadcast sound 601, 3 a synthesized sound electrical signal, 4 a synthesizing apparatus, 605 a sending apparatus, 606 a sending antennae, and 607 a broadcasting station. Also, in FIG. 34B, numeric symbol 608 represents a receiving antennae, 609 a receiving apparatus, 610 a speaker, 611 a sound collection apparatus (microphone), 612 a PC, 613 an extraction apparatus, 614 a control apparatus, 615 a NW access apparatus (browser), 616 a display apparatus, and 617 a network.

Overall flow of the signal in FIGS. 34A, 34B will be explained. First, at the sending side (broadcasting station), using a data hiding technique for example, the broadcasting sound 601 and the network address 602 to be transmitted are synthesized electrically under conditions that a person is not able to detect the auditory presence of the network address 602, and the synthesized sound is input in the sending apparatus 605 as the synthesized sound electrical signal 3. In the sending apparatus 605, radio carrier wave is modulated with the synthesized sound electrical signal 3 and it is emitted from the sending antennae 606 as the sending electrical wave into the air space.

At the receiving side, this sending electrical wave is captured by the receiving antennae 608, is demodulated in the receiving apparatus 609, and the synthesized sound electrical signal 3 is reproduced. Then, the synthesized sound electrical signal is input in the speaker 610, and converted to an acoustic signal, which is output. The person is not aware that the acoustic output contains network address 602 and listens to the sound as the original broadcast sound 1.

The acoustic output is collected by the sound collection apparatus 611, is converted to the synthesized sound electrical signal and is input in a personal computer 612. The personal computer 612, using the extraction apparatus 613, successively extracts binary signals from the synthesized sound electrical signal, and reproduces the network address 602.

This network address 602 is forwarded to the network access apparatus (browser) 615 through the control apparatus 614, and the network access apparatus 615 accesses the network 617 and obtains information from the location corresponding to the network address 602 (homepage and the like). Then, the network access apparatus 615 displays the obtained information on a display apparatus 616 through the control apparatus 614.

Figure 35:
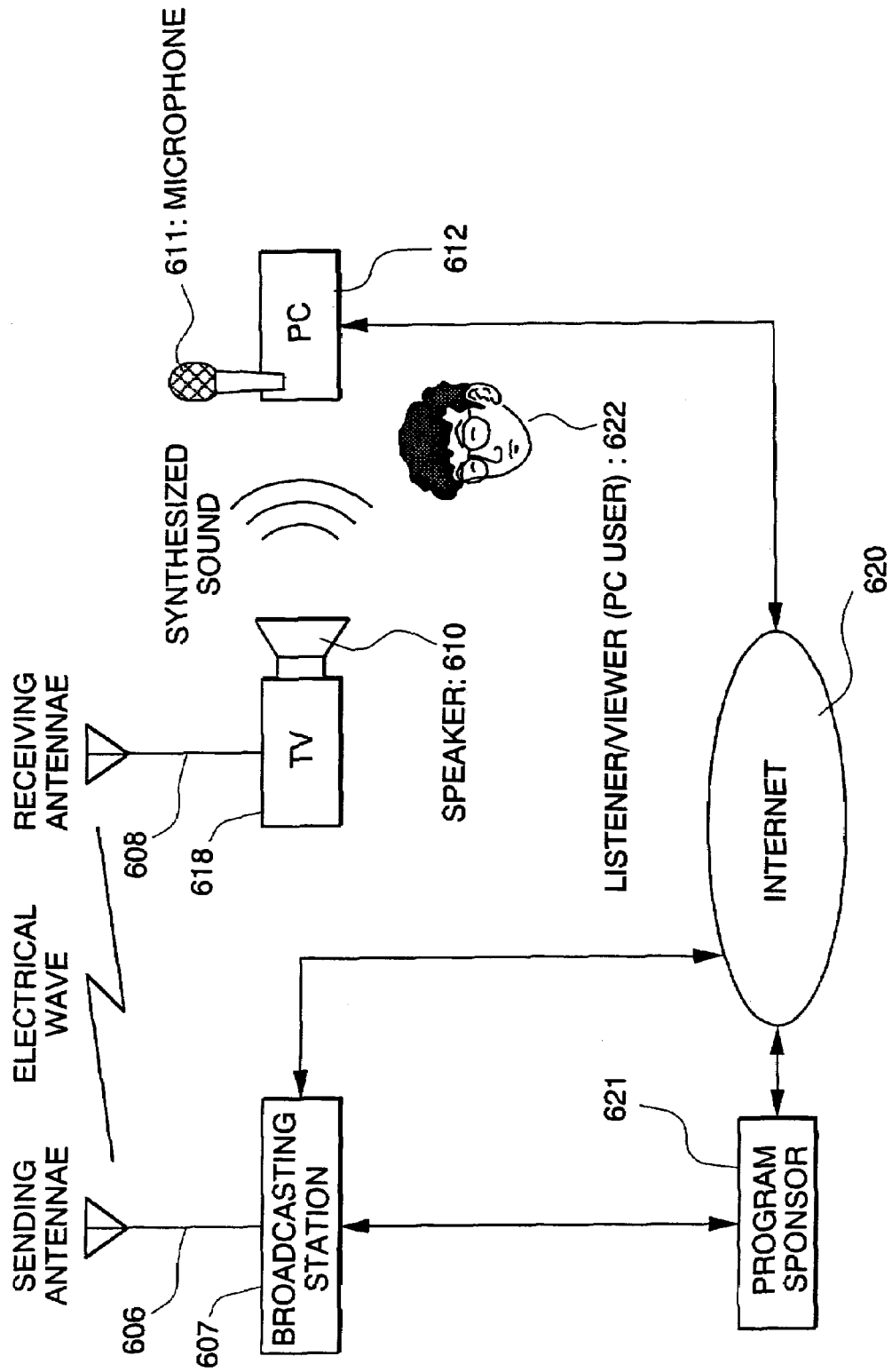
FIG. 35 is a block diagram of another example of the embodiment in Embodiment 7.

FIG. 35 is a block diagram to show another example of the structure of the embodiment. In FIG. 35, 618 represents a TV receiver, 620 the Internet, 621 a program sponsor, and 622 a viewer (PC user), and other numeric symbols are the same as those shown in FIGS. 34A, 34B.

In FIG. 35, at the broadcasting station 607, responding to request of the program sponsor 621, within the voice sounds of the TV program being broadcast or within the commercial message, the address of the homepage of the program sponsor established on the Internet using the sound-watermark technology.

As a specific example, a case of an XYZ company promoting an xyz product will be explained. The XYZ Company provides original commercial sounds for the xyz product to the broadcasting station. Within the commercial message, the homepage address of the XYZ Company, for example, www.xyz.co.jp is embedded as a binary string, using the sound-watermark technology.

The broadcasting station 607 broadcasts this synthesized sound in a manner similar to the images and normal commercial message. The viewer 622 viewing TV while operating the PC 612 listens to this commercial message and if the xyz product is of interest, when the viewer presses a certain key on the keyboard of the personal computer 612, the synthesized sound flowing from TV is converted to the synthesized sound electrical signal through the microphone, and is input in the extraction apparatus of the personal computer.

Then, the homepage address, www.xyz.co.jp, of the XYZ Company is extracted from the synthesized sound as a binary string. At this time, the extracted binary strings are successively accumulated, and each byte is decoded as a numeral or a word, and the network address (for example, the homepage address www.xyz.co.jp) is reproduced, and the page corresponding to this address is displayed by the browser on the display apparatus 616.

Based on the homepage address, automatically or manually, the personal computer 612 accesses the homepage address on the Internet. Then, the user can order the product xyz through the EC (electronic commerce) site of the homepage. The user's ears hear the synthesized sound as normal sound, so that, to those users who are not interested in the service, the commercial message sounds normal.

The frequency utilization band in present embodiment is the same as that explained using FIG. 2. Also, the structure of the synthesizing apparatus may be the same as that explained in FIG. 4. Also, the principle of operation of the synthesizing apparatus is the same as that explained using FIGS. 4A, 4B. Also, the structure of the extraction apparatus may be the same as that explained using FIG. 5. Also, the operational procedures of the synthesizing apparatus and extraction apparatus is the same as those explained in Embodiment 1.

It can be easily surmised from the explanations provided above relating to Embodiment 7 that the operation of the main steps related to the present invention can be realized by microprocessors in the personal computer executing relevant programs. Especially, the receiver side in the embodiment is based on personal computers so that their main operations can be readily realized by a program executed by the computer.

For such application programs, at the sending side, original broadcast sound (601) and a binary network address (602) different than the original sound are synthesized electrically to generate a synthesized sound electrical signal for modulation, and the modulated radio signal is received by the receiving apparatus, analyzed to demodulate the synthesized sound electrical signal, and generate an acoustic signal through the speaker, and this is collected by the sound collection apparatus to convert into the synthesized sound electrical signal, which becomes an input signal.

In this program, a step of successively extracting the binary signals hidden in the synthesized sound electrical signal, a step of reproducing a network address based on the binary signals, a step of obtaining information by accessing the homepage on the Internet using the network address, and a step of outputting the obtained information are described as an executable program, and this program is stored in an executable form in the memory section of the personal computer. Then, this program is booted as necessary to perform the above steps.

Such a program is pre-recorded in a computer-readable recording medium.

Embodiment 8

Embodiment 8 provides an additional function by fusion of the control method for a robot present in Embodiment 5 and broadcasting or communication.

In other words, the purpose of the embodiment is not only to transmit voice directly to the robot, but also to operate the robot or to generate voices from the robot by using the aspects of TV broadcasting to transmit signals through the voice output of a TV receiver. Further, an interactive system is to be realized between the viewer of TV and the broadcasting station to feedback through the robot to transmit the viewer's intentions to the station side.

Figure 36:
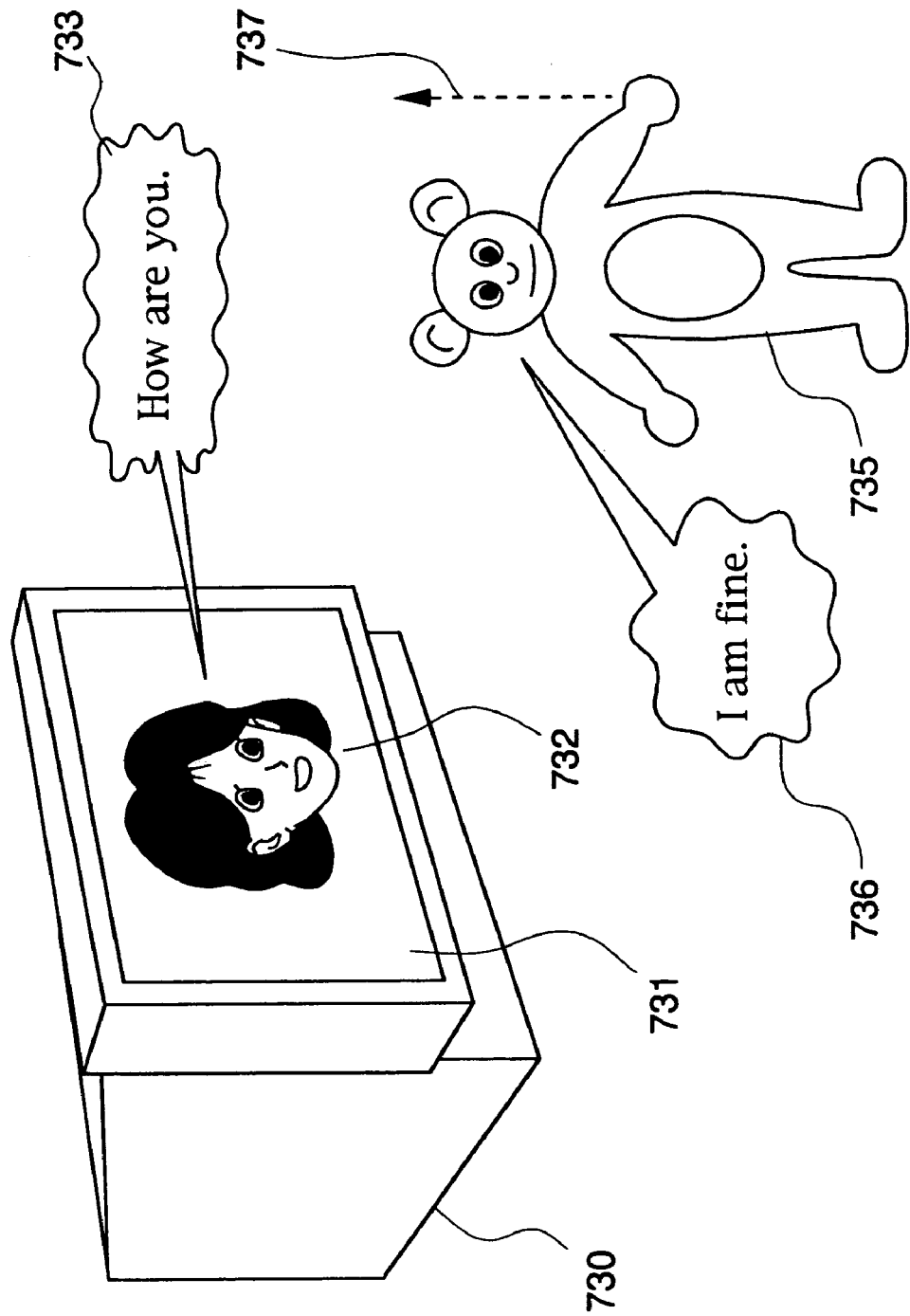
FIG. 36 is a diagram to show an example in Embodiment 7.

FIG. 36 is a diagram to show an outline of the present embodiment, which shows an example of transmitting synthesized sound through TV broadcasting. In FIG. 36, numeric symbol 730 represents a TV receiver, 731 a TV screen, 732 a face of an actor on the TV screen, 733 a voice sound output from the TV receiver, 735 a robot, 736 a voice output from the robot, 737 an operation of the robot.

Figure 37:
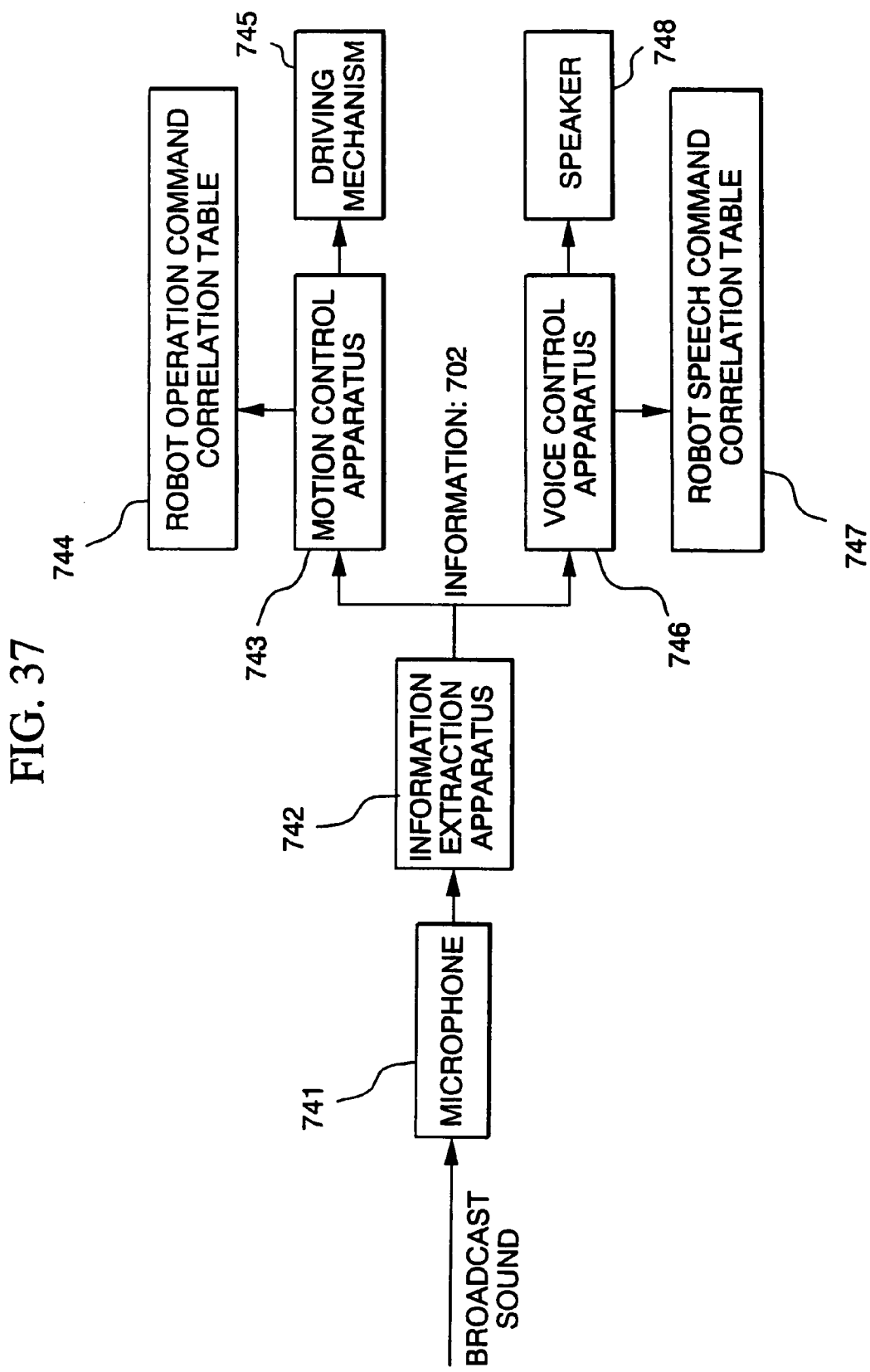
FIG. 37 is a block diagram of a functional structure of a robot in Embodiment 7.

FIG. 37 is a block diagram of the functions of the robot shown in FIG. 36, and in FIG. 37, numeric symbol 741 represents a microphone, 742 an information extraction apparatus, 743 a motion control apparatus, 744 a robot operation command correlation table, 745 a driving mechanism, 746 a voice control apparatus, 747 a robot speech command correlation table, and 748 a speaker.

In the following, the present embodiment will be explained in detail using FIGS. 36, 37. The voice sound 733 output from the TV receiver is the voice of the actor appearing on the TV show, and it is "How are you" in a natural language. The voice sound 733 output from the TV receiver is, in fact, a synthesized sound, and within the natural language "How are you", a control signal for the robot is embedded in the actor's original voice (audible sound signal).

And, information regarding words and motion that appearing to respond to the voice sound 733 of the actor's words output from the TV receiver is embedded as the control signal in the audible sound signal to be transmit to the robot. In this example, the embedded control signals are word information to convey "I am fine" and motion information to "wave the right hand".

FIG. 38 shows an example of the data for the robot operation command correlation table 744. And, FIG. 39 shows an example of the data for the robot speech command correlation table 747. In other words, operations and speeches to correspond to such commands are pre-stored as a table in the robot. Here, "A" and "B" in FIG. 38 are command codes for the robot, and operations to correspond to each command are defined in the table. Similarly, "0" and "1" in FIG. 39 are also command codes for the robot, and speeches to correspond to the command codes are defined in the table.

When it is desired to make the robot to vocalize "I am fine" and perform a motion to "wave the right hand", commands corresponding to "A" and "0" are embedded at the broadcasting station side in the voice sound "How are you" of the actor, and are broadcast. The receiving side receives this in the TV receiver 730, and outputs the voice sound of the actor "How are you".

The robot 735 receives this voice output in the microphone 741, which is output as the synthesized sound electrical signal. The information extraction apparatus 742 extracts a binary signal embedded in the synthesized sound electrical signal, and forwards it to the motion control apparatus 743 and the voice control apparatus 746.

In the motion control apparatus 743, if "A" or "B" symbol is detected in the binary code, it searches in the robot operation command correlation table 744 according to the symbol to find the content of the operation (in this case, "wave the right hand"), and a signal corresponding to this operation is handed to the drive mechanism 745. The drive mechanism 745 carries out the operation of "wave the right hand" according to the signal.

Also, in the voice control apparatus 746, if "0" or "1" symbol is detected from the extracted binary signal, it searches in the robot speech command correlation table 747 to find the content of the voice to be pronounced, and synthesizes the relevant voice and outputs voice signal from the speaker.

As another example, if it is desired to make the robot wave the left hand along with the speech of "I am fine", the control signal should be set to "B" and "0".

In the above explanation, the robot speech command correlation table (747) is pre-registered in the robot and used, however, separate from this, without using such a correlation table, embedding the speed texts as part of the robot control signal may be considered. In the above example, ("A", "I am fine") may be used as the robot control signal. In this case, the robot extracts a text named "I am fine", and vocalize "I am fine" by voice synthesis.

FIG. 40 shows an example of realizing interactive TV broadcasting using the robot in the present embodiment. In FIG. 40, numeric symbols 730, 731, 732, 735, 737 as the same as those in FIG. 36. Also, 734 represents voice output from the TV receiver, 738 a voice output from the robot, 739*a* and 739*b* are touch sensors.

Figure 41:
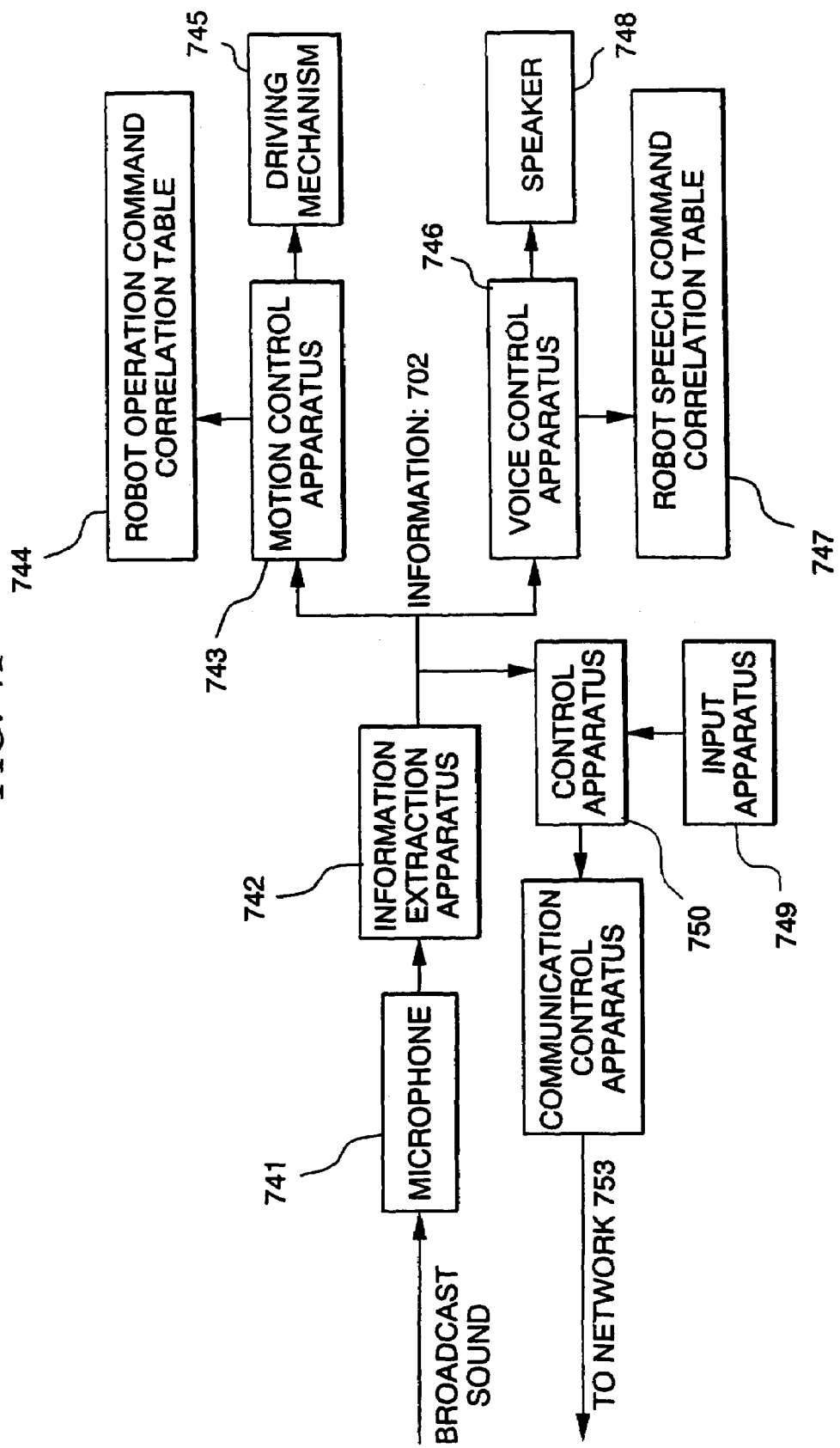
FIG. 41 is a block diagram to show a functional structure of a robot in Embodiment 7.

FIG. 41 is a block diagram to show the functional structure of the robot. In FIG. 41, numeric symbols 741~748 are the same as those in FIG. 37, and 749 represents an input apparatus, 750 a control apparatus, and 751 a communication control apparatus.

Figure 42:
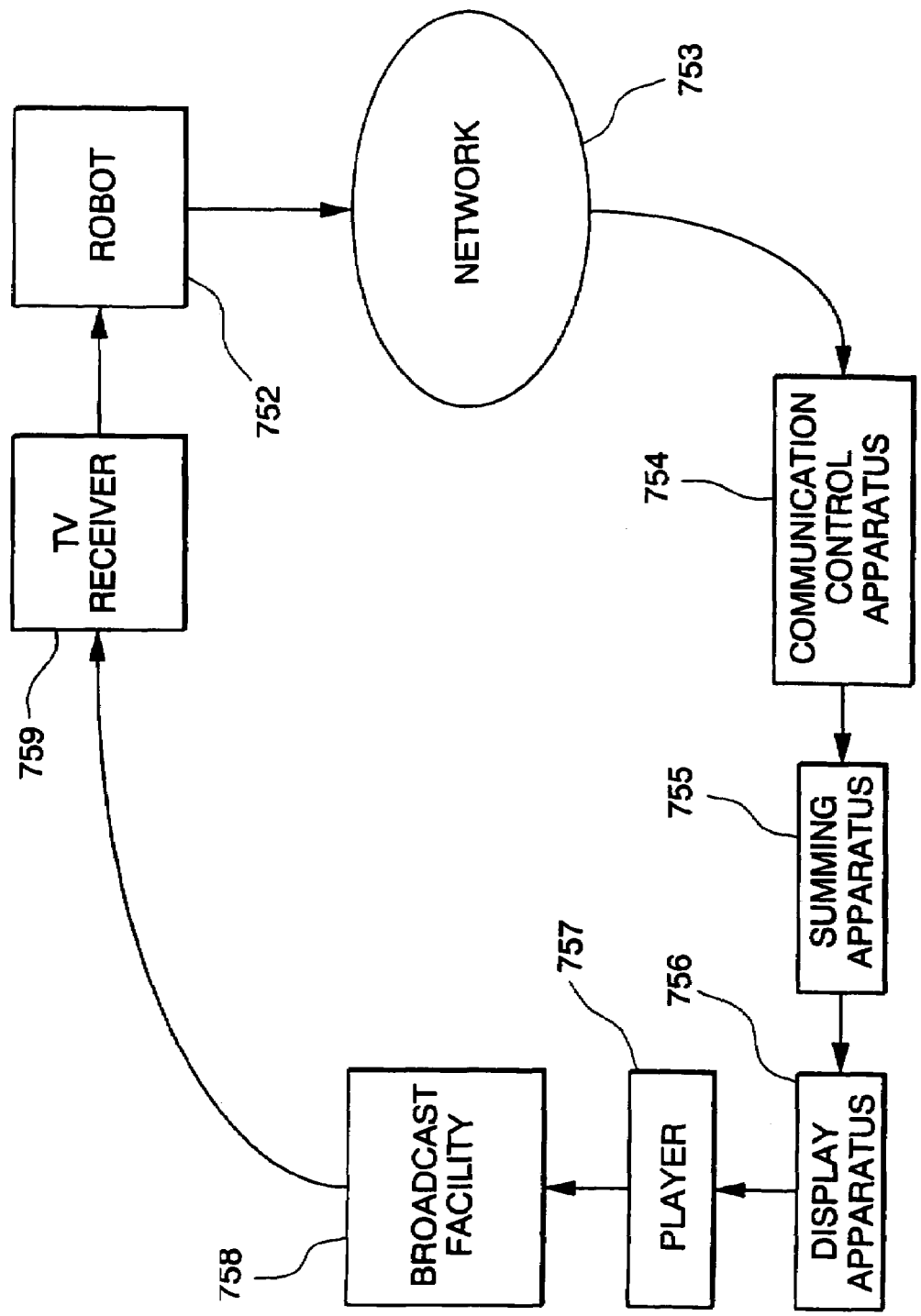
FIG. 42 is a block diagram to show an integrated system of communication and broadcasting in Embodiment 7.

FIG. 42 is a block diagram to show the relationship of broadcasting to network to realize a communication-broadcasting convergence system, and numeric symbol 752 represents a robot, 753 a network, 754 a communication control apparatus, 755 a summing apparatus, 756 a display apparatus, 757 a player, 758 a broadcasting facility, and 759 a TV receiver.

In the following, the present example will be explained with reference to FIGS. 40~42. In this example, the voice sound broadcast on the TV is the voice of the actor appearing on the TV, and represents a natural language that means "Those in favor, press the right hand, those opposing, press the left hand". A control signal corresponding to the words of the actor is embedded as the information 702 in the voice sound, and this information 702 is transmitted to the robot to produce desired motion and words. In this case, information 702 contains the word "which" and the operation information related to waving both hands.

FIG. 43 shows data for a robot operation command correlation table 744. Also, FIG. 44 shows data for a robot speech command correlation table 747. The data in the correlation tables are pre-loaded in the robot. As shown in FIG. 40, to let the robot pronounce the word "which" and to wave both hands, information 702 should be set to ("A", "0").

As another example, if it is desired to let the robot to say "how are you" and to perform a welcome, information 702 should be set to ("B", "1").

In the example shown above, data in the robot speech command correlation table (747) is pre-registered in the robot, but, separate from such a method, speech texts may be embedded directly as information 702. When embedding speech texts, information 702 may be made such that ("A", "DOCCHI"). In this case, the robot is made to extract a text "DOCCHI" and to pronounce "which" by voice synthesis.

After which, the robot is readied to accept commands in the touch sensor 39a or 39b provided in each hand. These touch sensors correspond to the input apparatus 749 in the case of the function block diagram in FIG. 41. The viewer, according to the contents of programming, presses left hand touch sensor 39a or right hand touch sensor 39b.

The input from the input apparatus 749 in FIG. 41 is correlated to a part of the information output from the information extraction apparatus 742 and is sent to the network 753 by way of the communication control apparatus 751.

Here, information to discriminate such as network address (telephone number and the like), information to identify the broadcasting station, information to identify programs, and information to identify the words of the players are contained in a part of the information output from the information extraction apparatus 742. That is, it is the information to correlate the viewer input command to the exact portion of the broadcast program.

As shown in FIG. 42, information input and sent from a large number of users is collected in the collection apparatus 757 by way of the network 753, and the results are displayed on the display apparatus 756. The players 757 in the TV program and the person in charge view the numbers presented on the display apparatus 756 to carry out communication with the users.

Embodiment 9

Next, Embodiment 9 will be explained with reference to FIGS. 45~51. Embodiment 9 relates to the case of controlling a robot through a personal computer.

Figure 45:
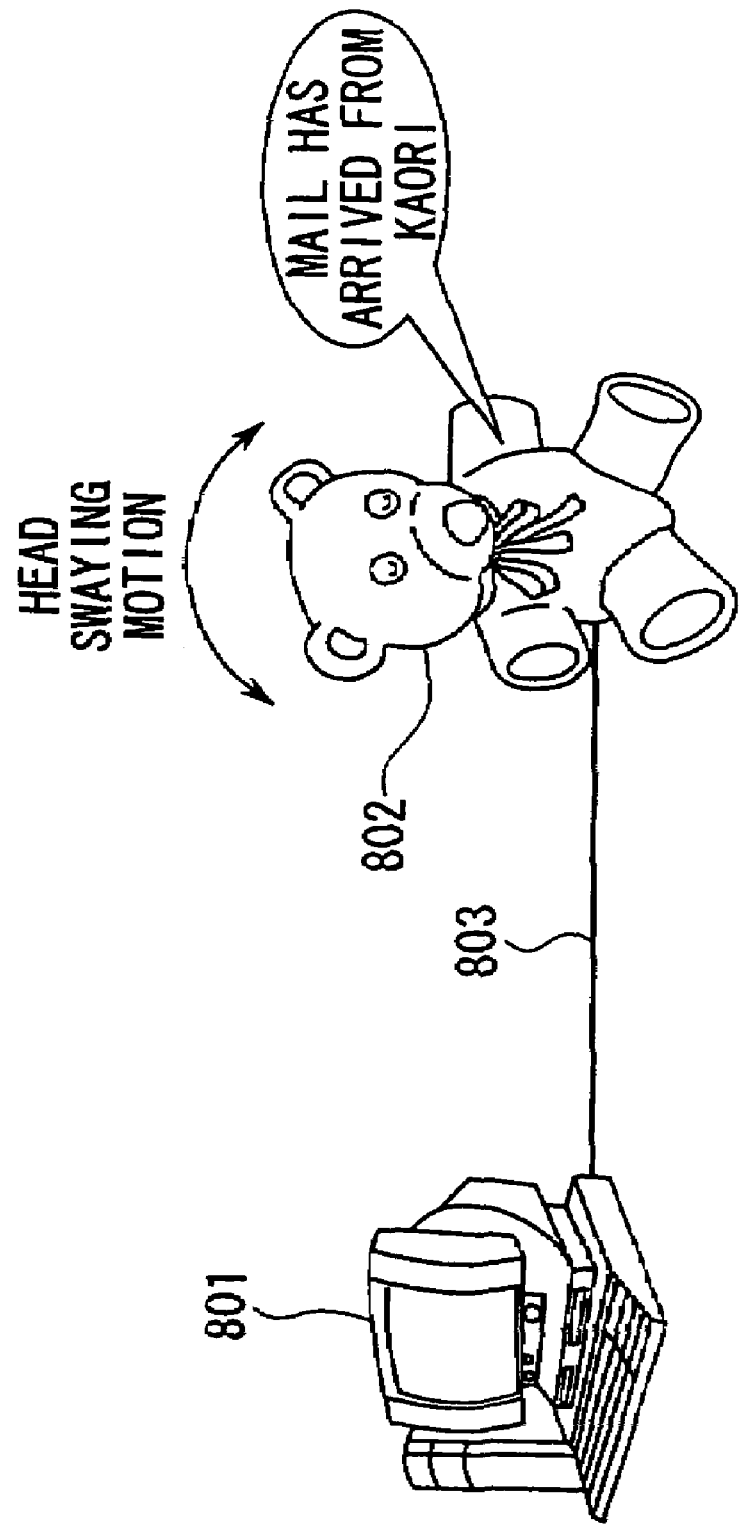
FIG. 45 is a diagram of the overall structure of the robot in Embodiment 9 of the present invention.

FIG. 45 is a diagram to show the overall structure of the robotic system, in which a personal computer (robot control signal generation apparatus) 801 and a robot shaped as an animal such as a bear 802 are connected by an audio line (electrical signal input means) 803. The robot 802 is configured such that the robot can nod using an internal servo motor (servo motor 826 in FIG. 47), and can emit sounds into the air space from an internal speaker (speaker 822 in FIG. 47). In this robotic system, the synthesized sound-electrical signal and operation information are transmitted from personal computer 801 to robot 802 through the audio line 803.

Figure 46:
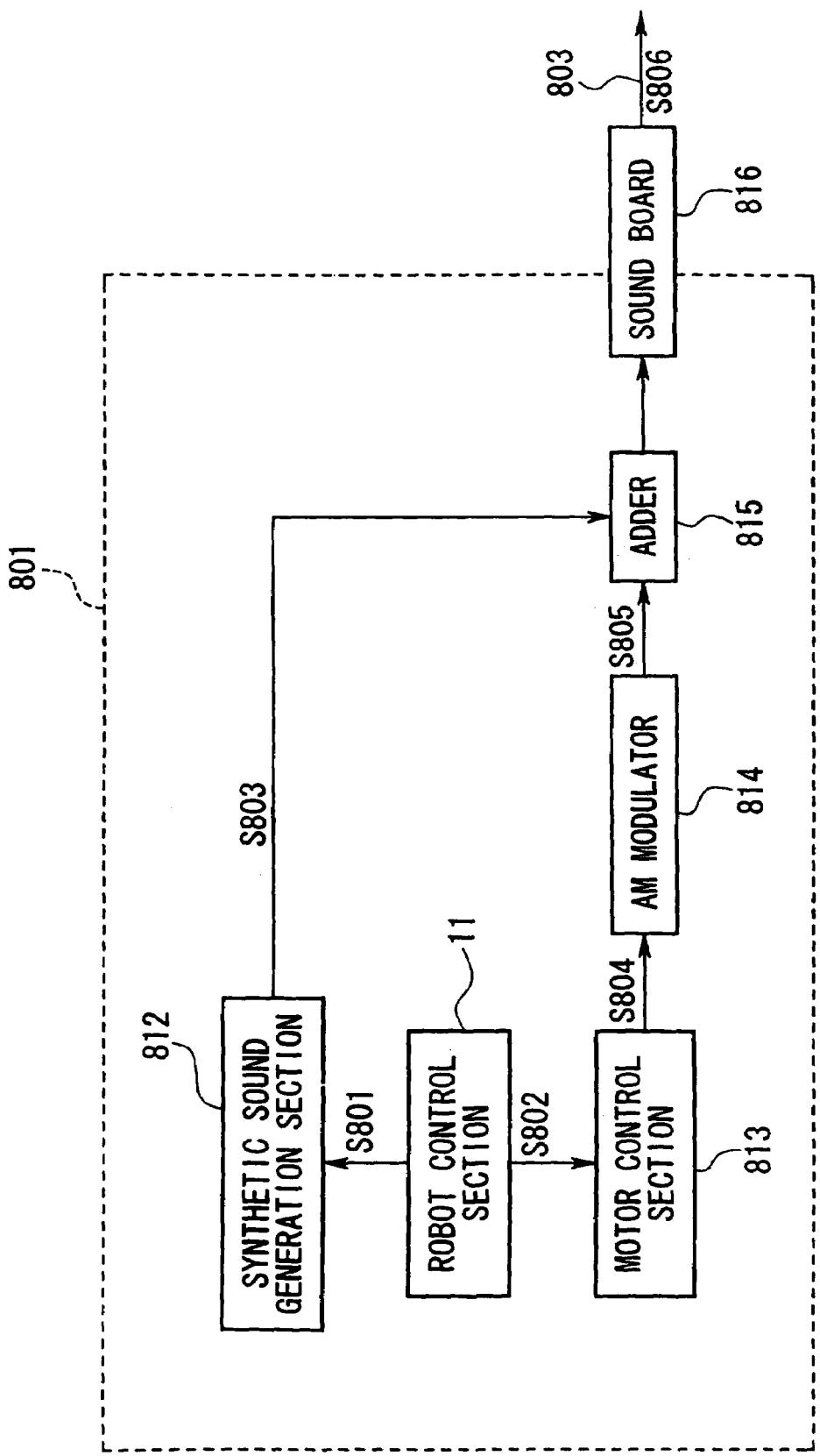
FIG. 46 is a block diagram of the functions in a personal computer side of a robot in Embodiment 9.

FIG. 46 is a function block diagram on the sending side, that is, the personal computer 801 side. The personal computer 801 is comprised by a robot control section (robot operation signal generation means) 811, a synthetic sound generation section (audible sound signal generation means) 812, a motor control section 813, an AM modulator 814, an adder (electrical signal generation means) 815, and a sound board (electrical signal generation means) 816.

Figure 47:
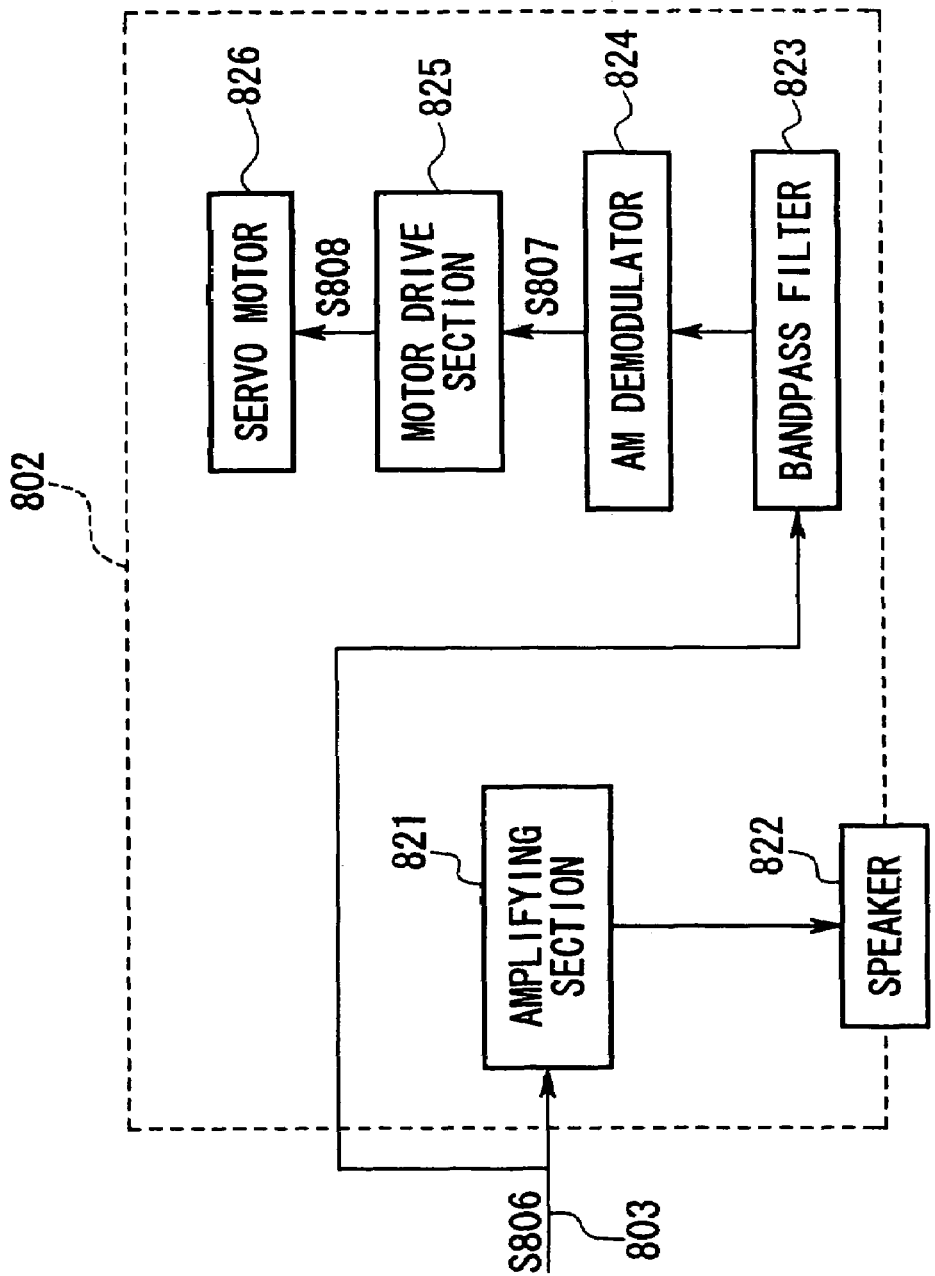
FIG. 47 is a block diagram of the functions in the robot side of the robotic system in Embodiment 9.

FIG. 47 is a function block diagram on the receiving side, that is, the robot 802 side. The robot 802 is comprised by an amplifying section 821, a speaker (emitting means) 822, a bandpass filter (separation extraction means) 823, an AM demodulator 824, a motor drive section 825, and a servo motor (driving means) 826.

The flow of signal will be explained with reference to FIGS. 46 and 47. First, in the personal computer 801, which is the sending side, the robot control section 811 generates text information S801 and, from the generated text information S801, a motor rotation angle command value S802 for the servo motor 826, as a robot operation signal, is generated. As an example, it is also possible for the robot control section 811 to be constructed so that text information S801 and motor rotation angle command value for the servo motor 816 are generated from HTML (hypertext markup language) files, and electronic mail texts by performing morphological analysis and the like.

Technology for generating text information S801 and motor rotation angle command value S802 using the morphological analysis technique will be explained briefly.

First, morphological analysis is a technique for separating text files such as electronic mail into individual words (i.e., a morpheme) in order to provide a tag for each word, in order to analyze the contents of the text according to the morphological analysis and to obtain tag information related to emotions. An actual case of morphological analysis will be explained using the following sentence.

<Input mail text example> "Excuse me, this is Misae. This is an invitation to a home party at Sachan's house. This time, let's make it a pot-luck party."

From these sentences, words to suggest a tag (abbreviated as cue-word) are extracted and emotion tag information is obtained. In the case of the above sentences, from words "excuse me" an emotion tag [greetings] is obtained, and from words "home party" an emotion tag [enjoyment] is obtained, and from the last words "pot-luck" an emotion tag [invitation] is obtained.

Then, the cue-words for emotion tag information are stored in the speech database as voice sound files, that have been modulated with tonal parameters (pitch frequency, power, resonance) to provide linguistic tonality, so that when the input mail text is output, it is possible to output it as a speech pattern with some emotional content.

Here, cue-words to be associated with emotion tag information may be considered to include the following. Cue-words for an emotion tag [happiness] may include "success" and "congratulations" and the like, cue-words for an emotion tag [anger] may include "complaints", "anger" and the like, cue-words for an emotion tag [sadness] may include "failure", "pain" and the like, cue-words for an emotion tag [pleasure] may include "laughter", "enjoyment" and the like, cue-words for an emotion tag [apology] may include "sorry", "forgive me" and the like, cue-words for an emotion tag [surprise] may include 'eh?', "whoa" and the like, cue-words for an emotion tag [emphasis] may include "!", "urgent" and the like.

Then, in the present embodiment, to operate the robot in accordance with the emotion tag obtained by the morphological analysis, by correlating to the emotion tag information, command values (motor number, location, speed, time) for the robot joint drive motor (servo motor 826 in the present embodiment) are arranged chronologically beforehand, and the results are stored in the gesture database. By so doing, operation signals for the robot are generated in reference to the jester database according to the emotion tag information obtained by using the morphological analysis.

Figure 48:
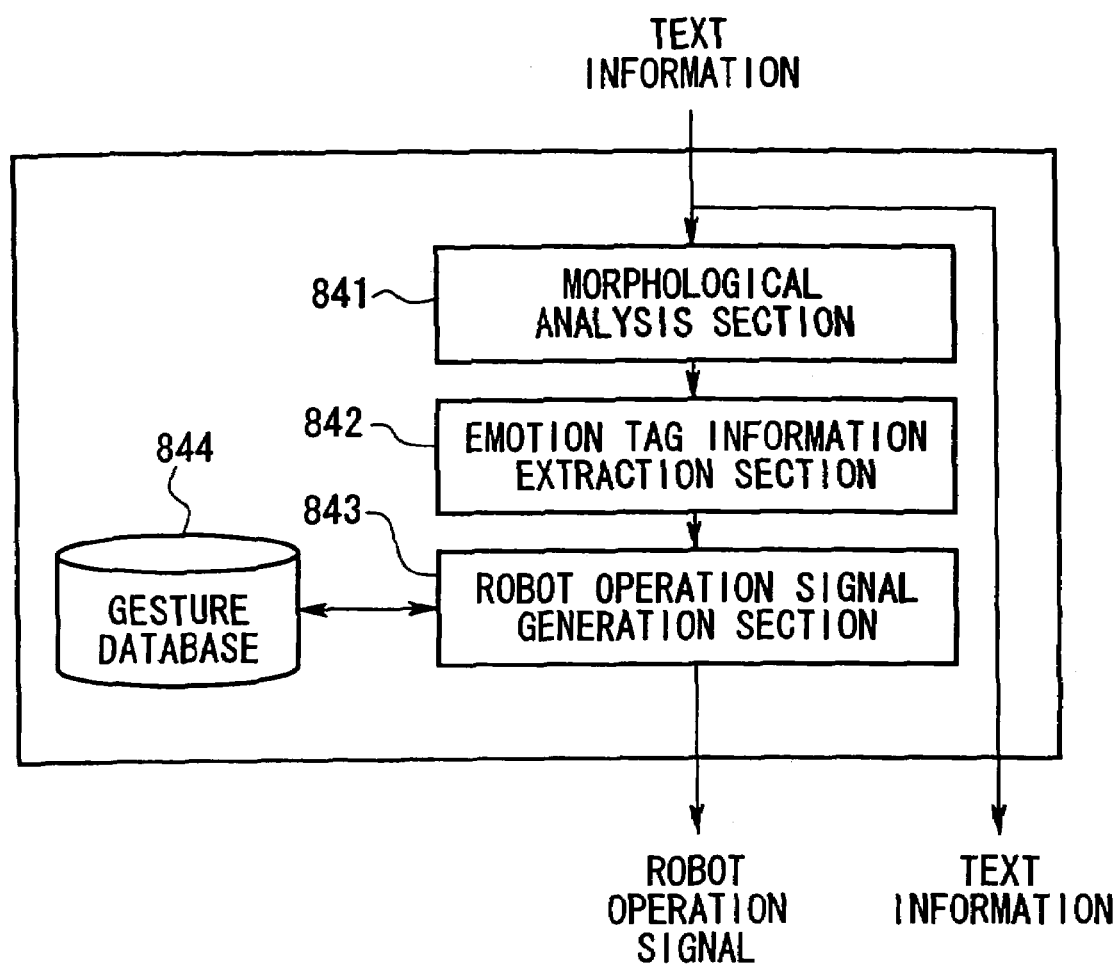
FIG. 48 is a diagram of the details of the robot control section in Embodiment 9.

FIG. 48 is a function block diagram to show the details of the robot control section 811 in the present embodiment. In the robot control section 811, the morphological analysis section 841 performs morphological analysis on the text information to extract cue-words, and the emotion tag information extraction section 842 obtains emotion tag information on the basis of the cue-words. The robot operation signal generation section 843 generates robot operation signals on the basis of the emotion tag information obtain in reference to gesture database 844.

Here, returning to FIG. 46, the synthetic sound generation section 812 generates a synthesized voice sound S803 based on the text information S801 sent from the robot control section 811. Such a technology is known to be disclosed in, for example, in Nobuhiko Kitawaki editor, "Speech Communication Technology—Speech and Acoustics Technologies for Multimedia Services", pp. 62-86, Corona, 1996 (reference 5).

Also, the motor control section 813 generates a motor control signal S804 from the motor rotation angle command value S802 sent from the robot control section 811. This motor control signal S804 is a value derived by a simple first-order equation from the motor rotation angle command value S802. Then, the motor control signal S804 is amplitude-modulated in the AM modulator 814 to generate an AM modulated wave S805. Here, the carrier wave for the AM modulated wave S805 may be selected in the vicinity of 18 KHz so that the AM modulated wave would not be heard by human ears.

The AM modulated wave S805 and the synthesized sound signal S803 are synthesized in the adder 815, and are sent to the sound board 816 in the personal computer 801, and are sent to the audio line 803 as a synthesized sound electrical signal S806.

The synthesized sound electrical signal S806 sent from the personal computer 801 passes through the audio line 803 and is input in the amplifying section 821 and the bandpass filter 823 of the robot 802, which is the receiving side. In the robot 802, the synthesized sound electrical signal S806 is amplified using the amplifier 821, and is emitted into the air space. Therefore, the person is able to hear the voice sound emitted from the speaker 822.

In the meantime, the bandpass filter 823 having its center value at the AM carrier wavelength extracts the AM modulated wave from the synthesized sound electrical signal S806, and the AM modulator 824 reproduces the motor control signal S807 from the motor control signal S807. From the motor control signal S807, the motor drive section 825 generates a servo motor command signal S808 for operating the servo motor 826. The servo motor 826, based on the servo motor command signal S808, rotates while controlling the rotation angle at the value preset by the sending side (personal computer 801) and makes the robot 802 to oscillate its neck.

Figure 49:
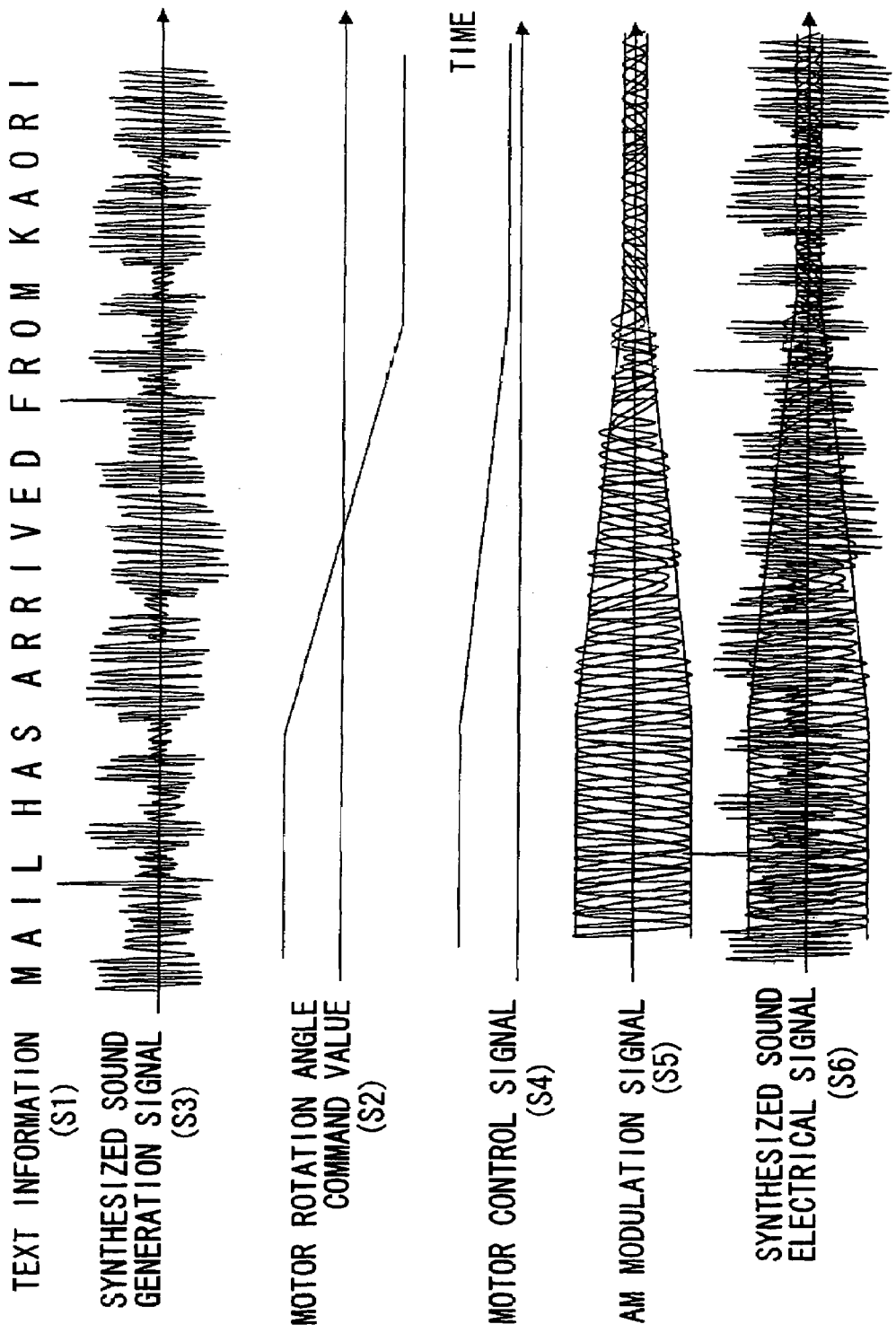
FIG. 49 is a diagram to show a relationship of signals in the personal computer side in Embodiment 9.

FIG. 49 shows an example of the relation, in the present embodiment, of the text information S801 from the sending side, synthesized sound signal S803, motor rotation angle command value S802, motor control signal S804, AM modulated wave S805, and the synthesized sound electrical signal S806. In this example, it is imagined that the robot 802 announces "mail from Kaori has arrived", and tilts its neck from left to right.

Figure 50:
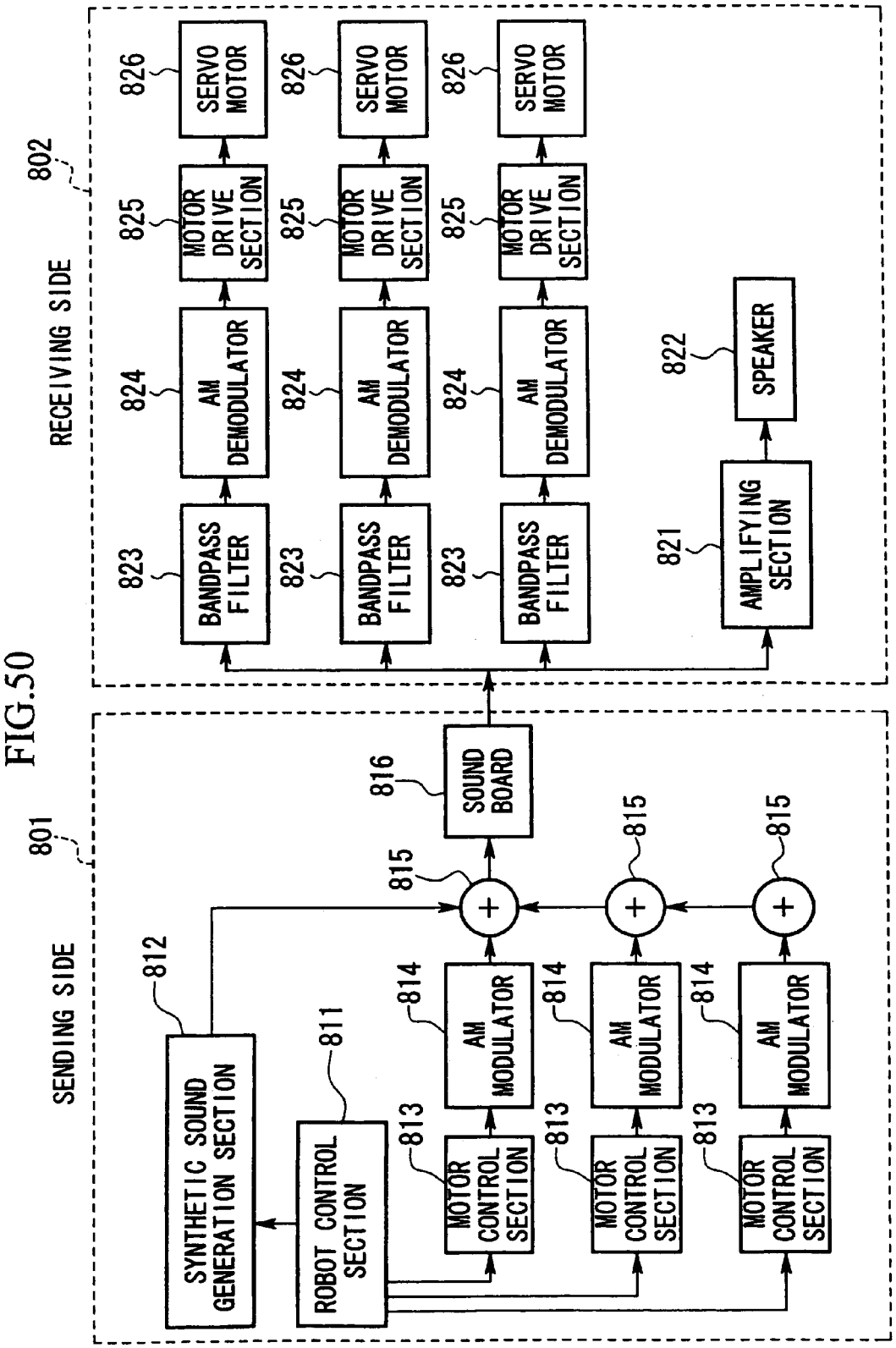
FIG. 50 is a block diagram of the functions in a variation of the robotic system shown in Embodiment 9.

Here, if it is desired for the robot to have a number of degrees of freedom, as shown in FIG. 50, in the sending side (personal computer 801), a plurality of motor control sections 813, AM modulators 814, and adders 815 are readied, and the AM frequency of the carrier wave should be varied slightly. Also, the receiving side should prepare in the same manner, and a plurality of bandpass filters 823, AM modulators 824, motor drive sections 825 and servo motors 826 should be readied.

As explained above, according to the present embodiment of the robotic system, synthesized sound signal S803 and motor control signal S804 can be transmitted at the same time from the personal computer 801 to the robot 802 using only the audio line 803. Also, without providing a special structure, emission of sound from the speaker 822 and the neck oscillation operation of the robot 802 by the servo motor 826 can be carried out synchronously. Therefore, the robotic system can be simplified and the cost lowered. Also, because the signal line for operating the robot does not need to be dedicated in the personal computer 801, while the robot 802 is being operated, scanner, terminal adapter, printer and the like can also be operated simultaneously.

Figure 51:
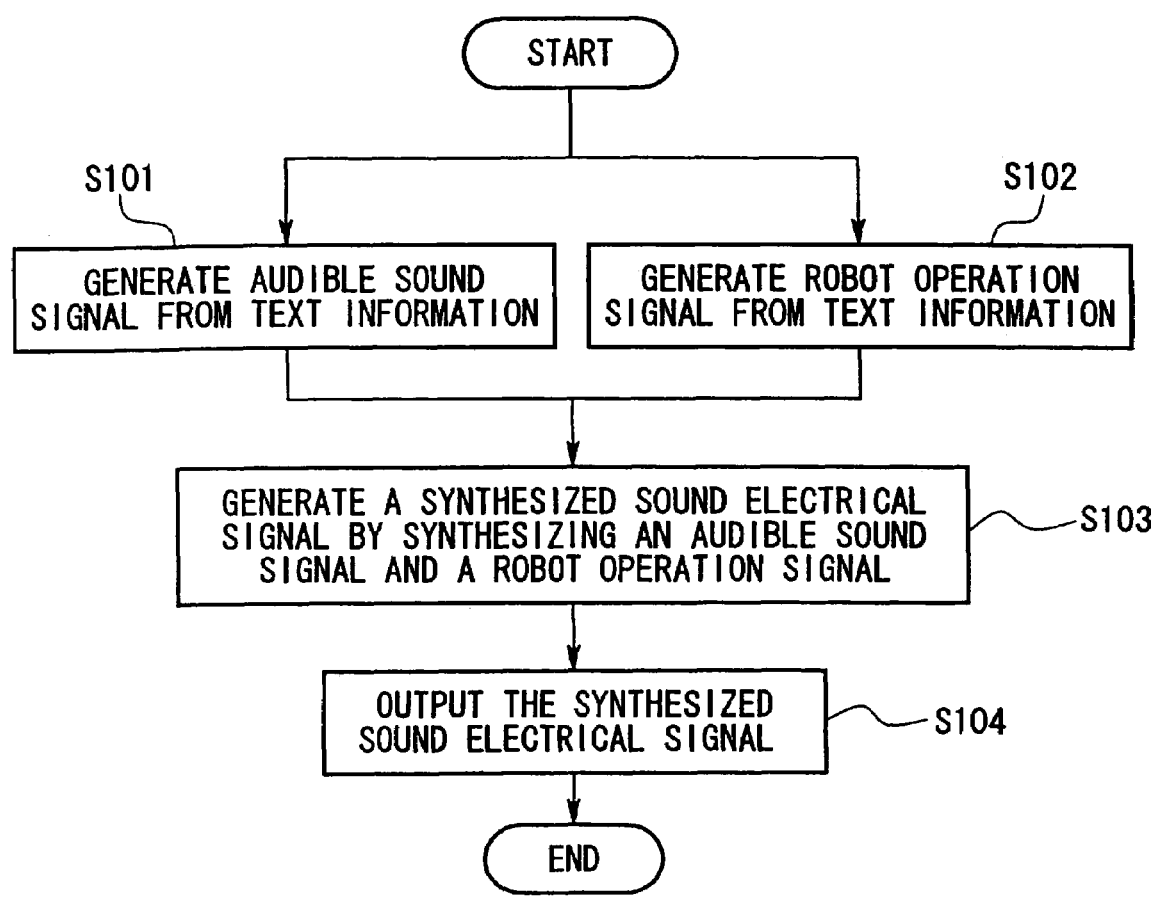
FIG. 51 is a flowchart of the synthesized sound electrical signal generation process in Embodiment 9.

FIG. 51 shows a flowchart of the process of electrically synthesizing a sound signal. In the present embodiment, an application program for executing the steps in this flowchart is recorded on a hard disc (recording medium) of the personal computer 801. Such a program can also be recorded on other computer-readable recording medium such as floppy disc, opto-magnetic disc, ROM, CD-ROM and the like.

First, in step S101, an audible sound signal from text information is generated, and in step S102, a robot operation signal is generated from the text information. Next, in step S103, a synthesized sound electrical signal is generated by synthesizing the audible sound signal generated in step S101 and the robot operation signal generated in step S102. Next, progressing to step S104, the synthesized sound electrical signal synthesize in step S103 is output. Here, in this flowchart, step S101 and step S102 are concurrently processed, but step S101 may be carried out first followed by step S102. Conversely, step S102 may be carried out followed by step S101.

Embodiment 10

Embodiment 10 will be explained with reference to FIGS. 52 to 54. Here, in Embodiment 10, the parts that are the same as those in Embodiment 9 are given the same numeric symbols in FIGS. 52 to 54.

The overall structure of the robotic system is the same as that in Embodiment 9, and is as shown in FIG. 45.

Figure 52:
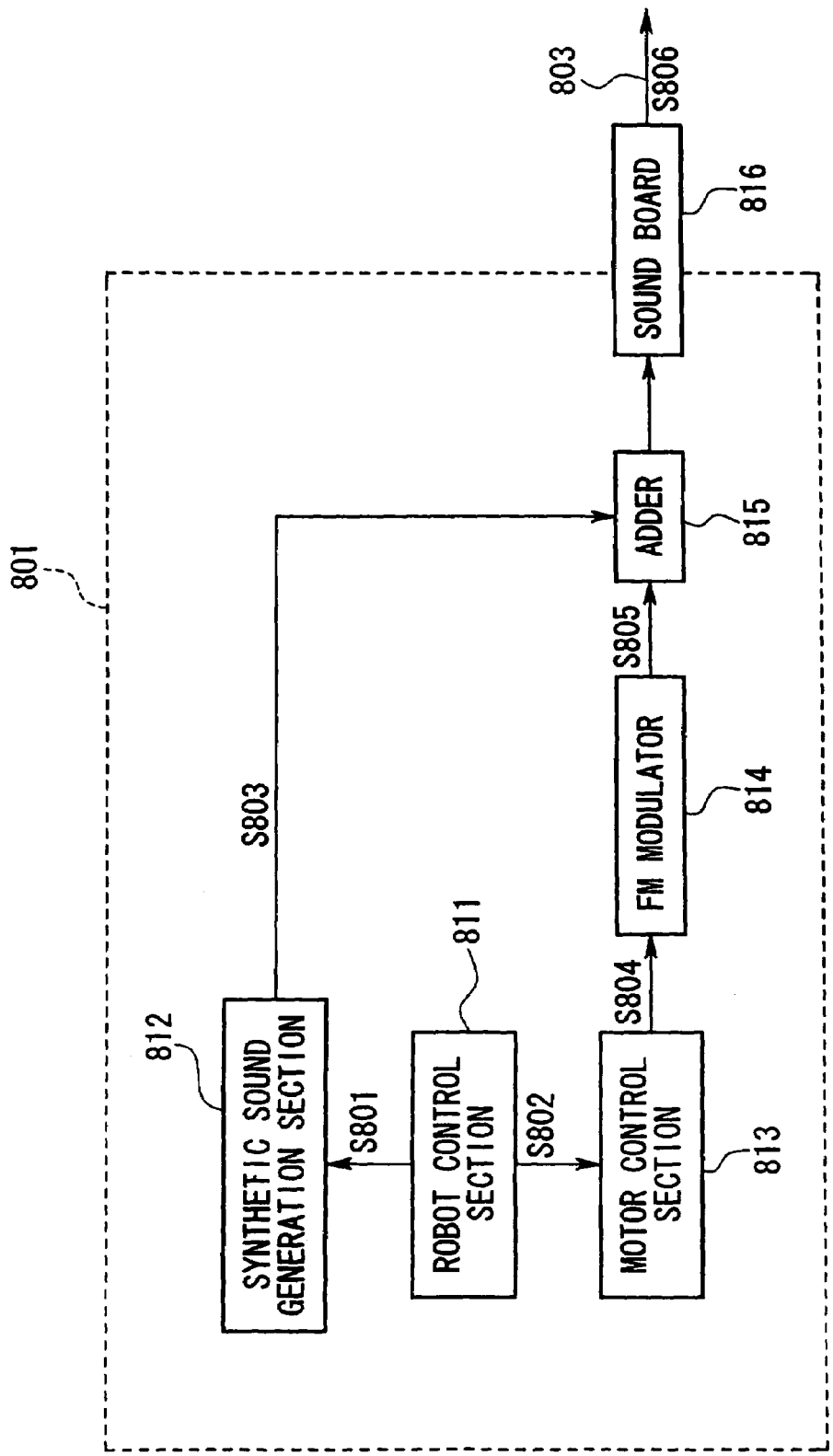
FIG. 52 is a block diagram of the functions on the personal computer side in Embodiment 10.

FIG. 52 is a function block diagram of the sending side, which is the personal computer 801 side. The personal computer 801 is comprised by a robot control section (robot operation signal generation means) 811, a synthetic sound generation section (audible sound signal generation means) 812, a motor control section 813, an AM modulator 817, an adder (electrical signal generation means) 815, and a sound board (electrical signal generation means) 816.

Figure 53:
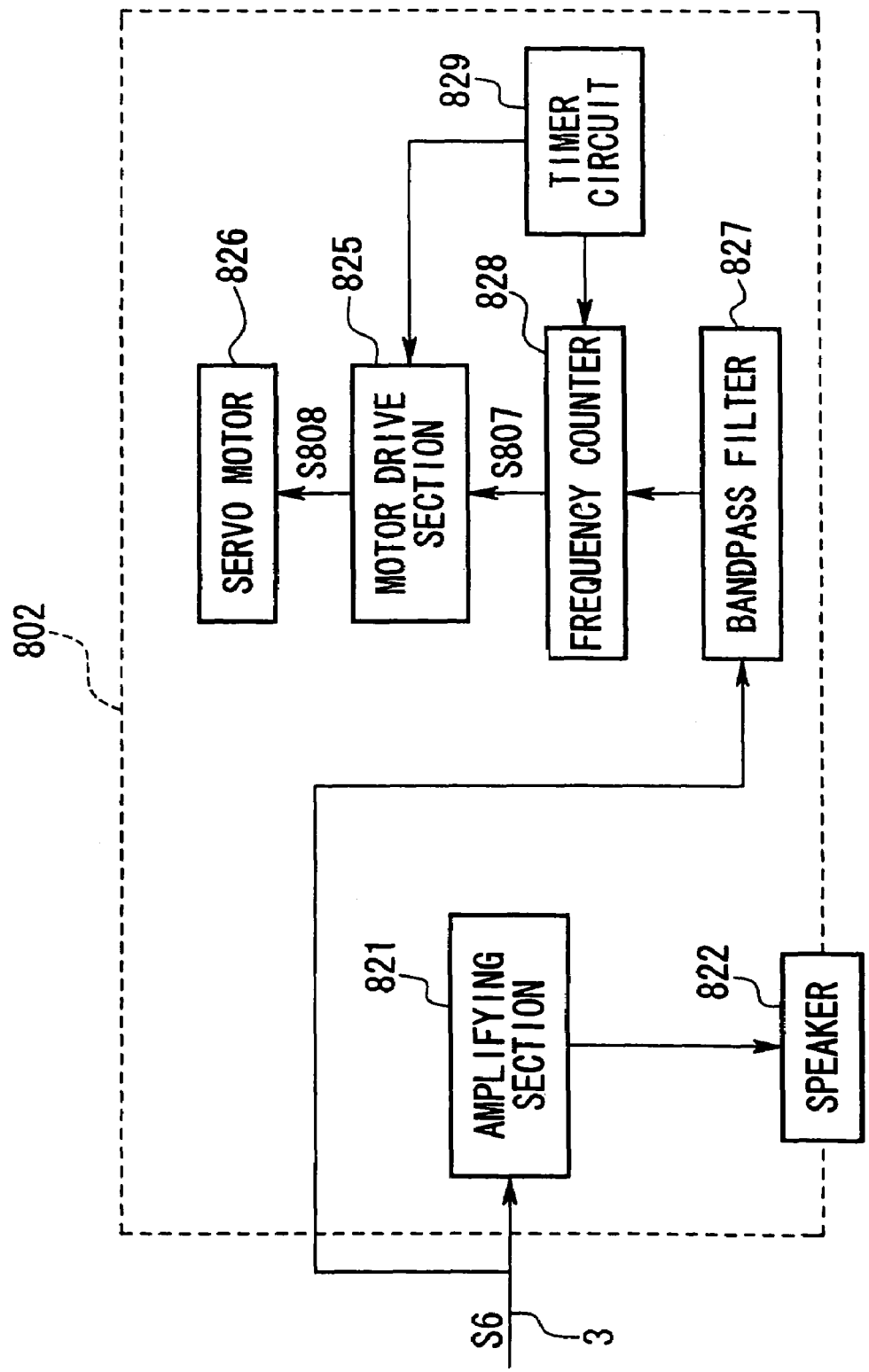
FIG. 53 is a block diagram of the functions on the robot side of the robotic system.

FIG. 53 is a function block diagram of the receiving side, that is, the robot 802 side. The robot 802 is comprised by an amplifier section 821, a speaker (emitting means) 822, a bandpass filter (separation extraction means) 827, a frequency counter 828, a motor drive section 825, a servo, motor (driving means) 826, and a timer circuit 829.

The flow of signal will be explained with reference to FIGS. 52 and 53. First, in the personal computer 801, which is the sending side, the robot control section 811 generates text information S801 and, from the generated text information S801, a motor rotation angle command value S802 for the servo motor 826, as a robot operation signal, is generated. It is permissible to adopt the method of generating the text information S801 and the motor rotation angle command value S802 as in Embodiment 9.

The synthetic sound generation section 812 generates a synthesized voice sound S803 based on the text information S801 sent from the robot control section 811. It is permissible to adopt the same method of generating the synthesized voice sound S803 as that used in Embodiment 9.

The motor control section 813 generates a motor control signal S804 from the motor rotation angle command value S802 sent from the robot control section 811. This motor control signal S804 is a value derived by a simple first-order equation from the motor rotation angle command value S802. Then, the motor control signal S804 is FM-modulated in the FM modulator 817 to generate an FM modulated wave S809. Here, the carrier wave for the FM modulated wave S809 may be selected in the vicinity of 18 KHz so that the FM modulated wave S809 would not be heard by human ears.

The FM modulated wave S809 and the synthesized sound signal S803 are synthesized in the adder 815, and are sent to the sound board 816 in the personal computer 801, and are sent to the audio line 803 as a synthesized sound electrical signal S806.

The synthesized sound electrical signal S806 sent from the personal computer 801 passes through the audio line 803 and is input in the amplifying section 821 and the bandpass filter 823 of the robot 802 as the receiving side. In the robot 802, the synthesized sound electrical signal S806 is amplified using the amplifier 821, and is emitted into the air space. Therefore, the person is able to hear the voice sound emitted from the speaker 822.

In the meantime, the bandpass filter 827 having its center value at the AM carrier wavelength extracts the FM modulated wave from the synthesized sound electrical signal S806, and the frequency counter 828 measures the frequency of the FM modulates wave. The motor driving section 825 generates a servo motor command signal S808 to drive the servo motor 826 according to the measured value of the frequency counter 828. The motor drive section 825 generates a servo motor command signal S808 for operating the servo motor 826. The servo motor 826, based on the servo motor command signal S808, rotates while controlling the rotation angle at the angle preset by the sending side (personal computer 801) and makes the robot 802 to oscillate its neck. Here, by the action of the timer circuit 829, the frequency measurement and servo motor command signal S808 are generated periodically.

Figure 54:
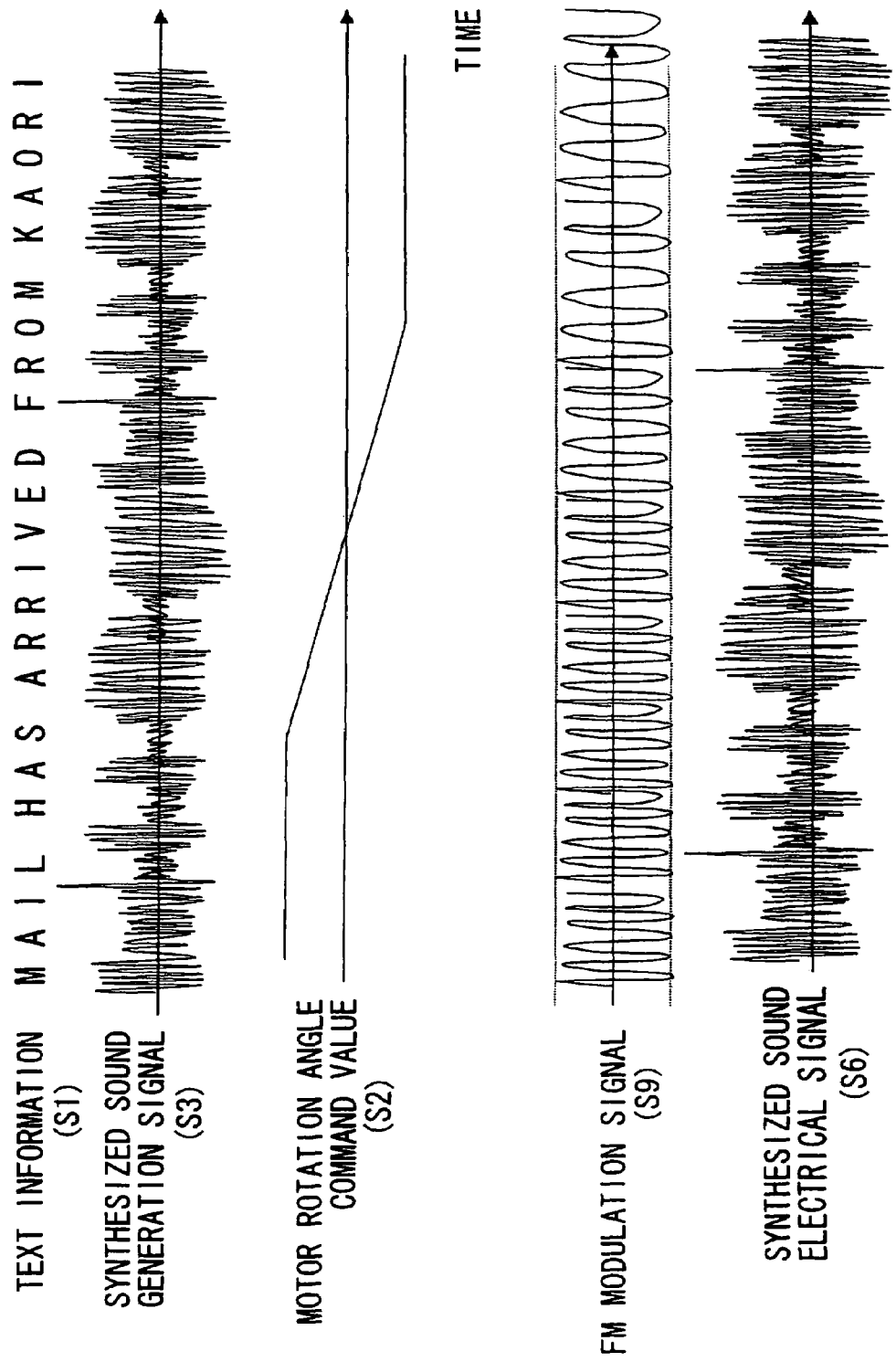
FIG. 54 is a diagram to show the relationship of each signal on the personal computer side in Embodiment 10.

FIG. 54, in Embodiment 10, is a diagram to show an example of the relation of sending side information text information S801, synthesized sound signal S803, motor rotation angle command value S802, FM modulated wave S809, synthesized sound electrical signal 806. In this example, it is imagined that the robot 802 announces "mail from Kaori has arrived", and tilts its neck from left to right. As can be understood from this diagram, in the present embodiment, the system is arranged so that the higher the motor rotation angle command value S802 the higher the frequency of the FM modulated wave S809.

Here, if it is desired for the robot to have a number of degrees of freedom, as shown in FIG. 50 in Embodiment 9, in the sending side (personal computer 801), a plurality of motor control sections 813, FM modulators 817, and adders 815 are readied, and the FM frequency of the carrier wave should be varied slightly. Also, the receiving side should prepare in the same manner, and a plurality of bandpass filters 827, frequency counters 828, motor drive sections 825 and servo motors 826 should be readied.

According to the present embodiment of the robotic system, synthesized sound signal S803 and motor control signal S804 can be transmitted at the same time from the personal computer 801 to the robot 802 using only the audio line 803.

The same effects as those in Embodiment 9 can be obtained by the robotic system in Embodiment 10. That is, according to the robotic system in Embodiment 10, using only the audio line 803, synthesized sound signal S803 and motor control signal S804 can be transmitted at the same time from the personal computer 801 to the robot 802. Also, without providing a special structure, emission of sound from the speaker 822 and the neck oscillation of the robot 802 by the servo motor 826 can be carried out synchronously. Therefore, the robotic system can be simplified and the cost lowered. Also, because the signal line for operating the robot does not need to be dedicated in the personal computer 801, while the robot 802 is being operated, scanner, terminal adapter, printer and the like can also be operated simultaneously.

Also, in the robotic system in Embodiment 10, although the apparatus becomes somewhat more complex compared with the robotic system in Embodiment 9, compared with the system using the AM modulator in Embodiment 9, more stable operation is possible and the acoustic effects are improved.

Embodiment 11

Next, Embodiment 11 will be explained with reference to the diagram in FIG. 55.

Figure 55:
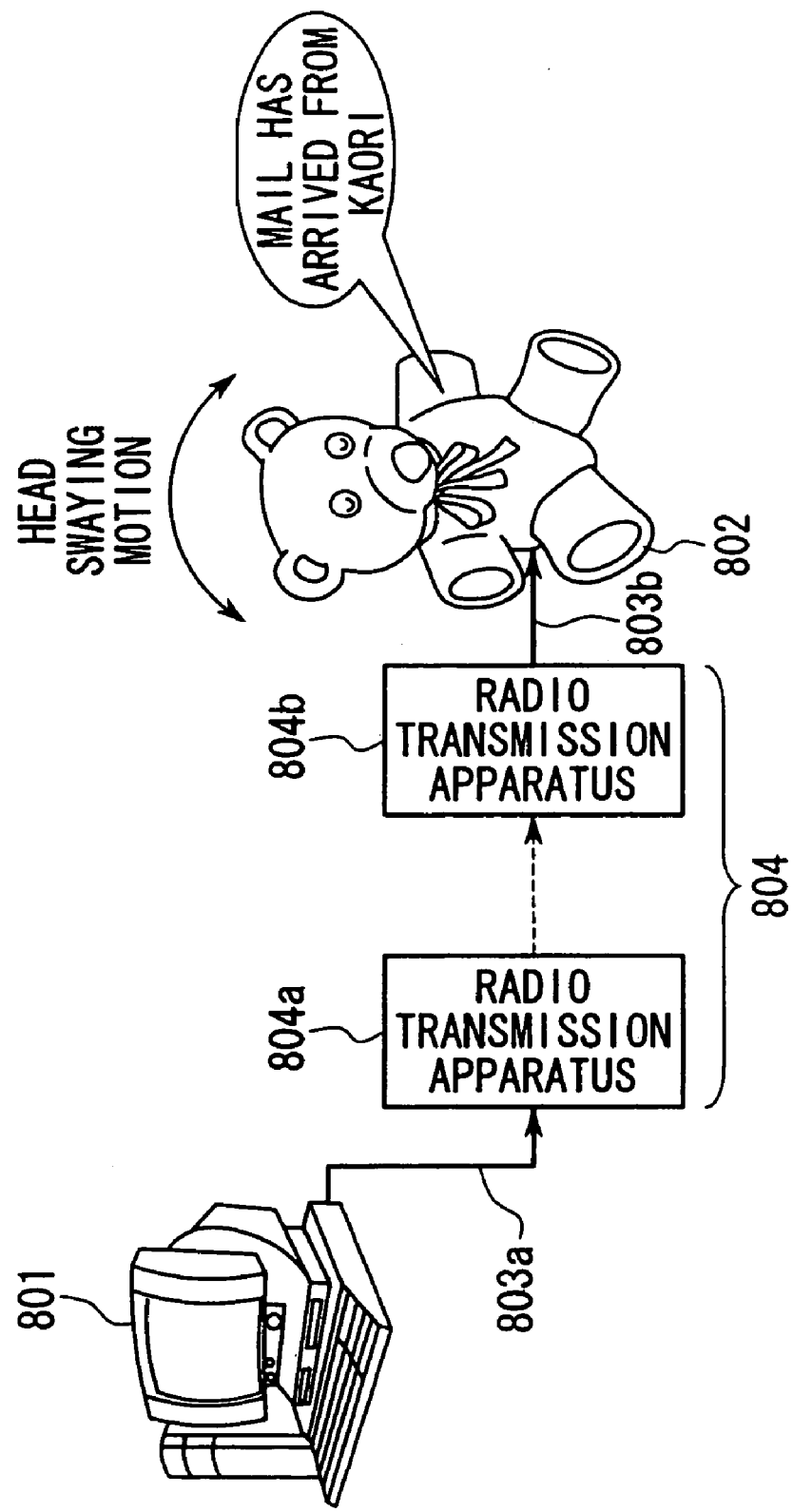
FIG. 55 is a diagram of the overall structure of the robot in Embodiment 11 of the present invention.

FIG. 55 is a system configuration diagram of a robotic system in Embodiment 11, and difference between this embodiment and Embodiments 9 and 10 is that in Embodiments 9 and 10, the synthesized sound electrical signal synthesized by synthesizing the synthesized sound signal and robot operation signal is transmitted from the personal computer 801 to the robot 802 through the audio line 803, in Embodiment 11, however, the synthesized sound electrical signal is transmitted through a radio transmission apparatus 804.

In detail, the personal computer 801 is connected to the transmitter 804a of the radio transmission apparatus 804 through the audio line 803a, and the robot 802 is connected to the receiver 804b of the radio transmission apparatus 804, and the synthesized sound electrical signal generated in the personal computer 801 is transmitted to the robot 802 by way of the radio transmission apparatus 804. In the robotic system in Embodiment 11 also, the robot 802 amplifies the transmitted synthesized sound signal and emits it into the air space, and the robot operation signal is demodulated to oscillate the neck. Here, in Embodiment 11, the audio line 803b and the receiver 804b of the radio transmission apparatus 804 constitute the electrical signal input means of the robot 802.

For the radio transmission apparatus 804, apparatus based on infrared or electrical waves may be considered. Also, in the robotic system in Embodiment 11, either the AM modulation method described in Embodiment 9 or the FM modulation method described in Embodiment 11 may be utilized. In the robotic system in Embodiment 11, the advantage is that physical transmission line is not necessary between the personal computer 801 and the robot 802.

Embodiment 12

Embodiment 12 will be explained with reference to the diagrams in FIGS. 56 and 57.

Figure 56:
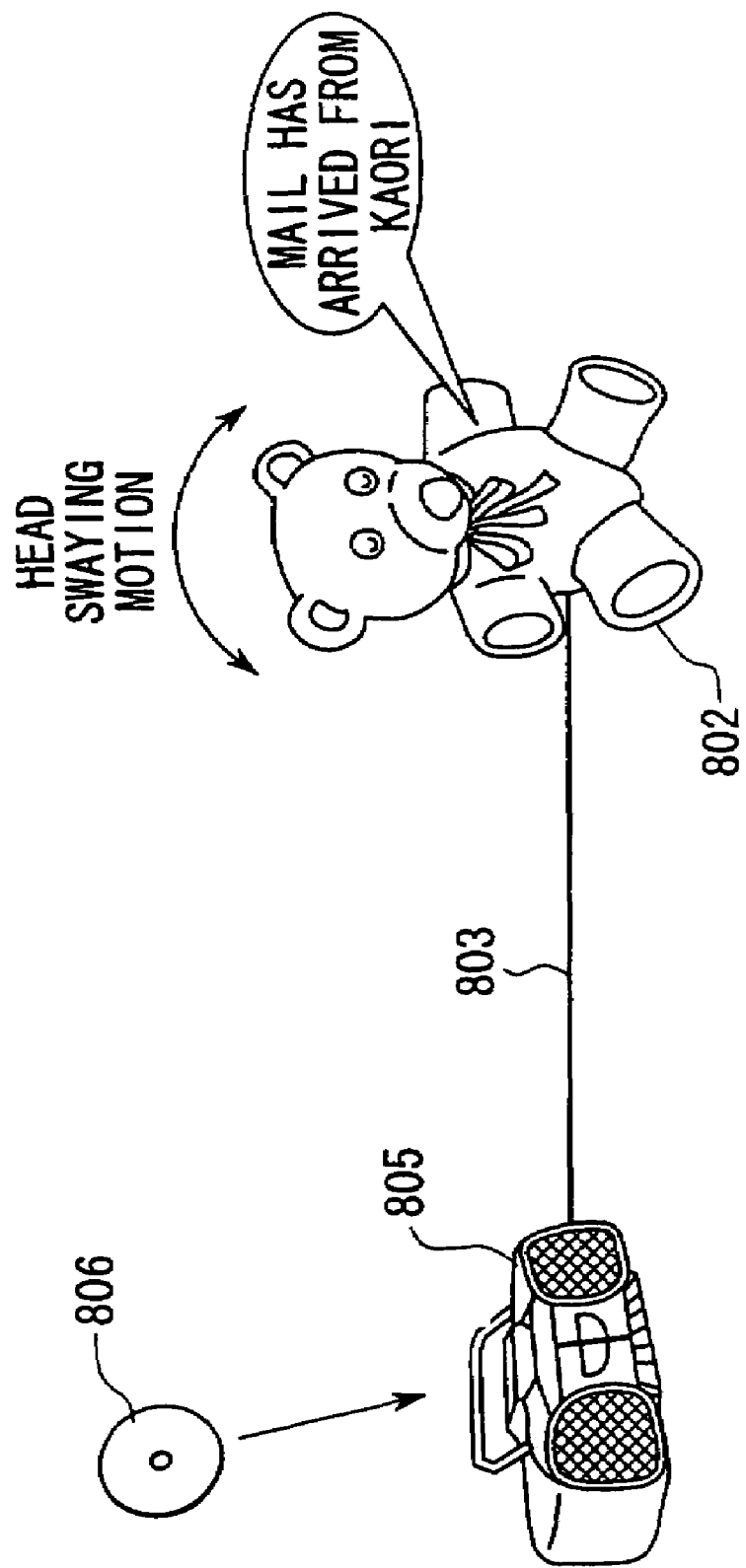
FIG. 56 is a diagram of the overall structure of the robot in Embodiment 12 of the present invention in Embodiment 12.

FIG. 56 is a configurational diagram of the robotic system in Embodiment 12, and in Embodiment 12, there is no personal computer 801, a compact disc player (abbreviated as CD player below) 805 and a robot 802 are connected by an audio line 803. Here, the robot 802 is the same as the robot 802 in Embodiment 9 or 10.

And, in the robotic systems described in Embodiments 9, 10, the synthesized sound electrical signal is generated in the personal computer 801, but in Embodiment 12, the synthesized sound electrical signal is written in the compact disc (abbreviated as CD below) 806. Then, when this CD 806 is played in the CD player 805 to read the contents of CD 806, the synthesized sound electrical signal synthesized by the synthesized sound and the robot operation signal is sent from the CD player 805 to the robot 802 and the robot emits sounds from the speaker and oscillates its neck.

Therefore, in this case also, it is possible to link the sound and motion of the robot 802. Also, in the robotic system in Embodiment 12, the advantage is that the personal computer 801 is not required.

Figure 57:
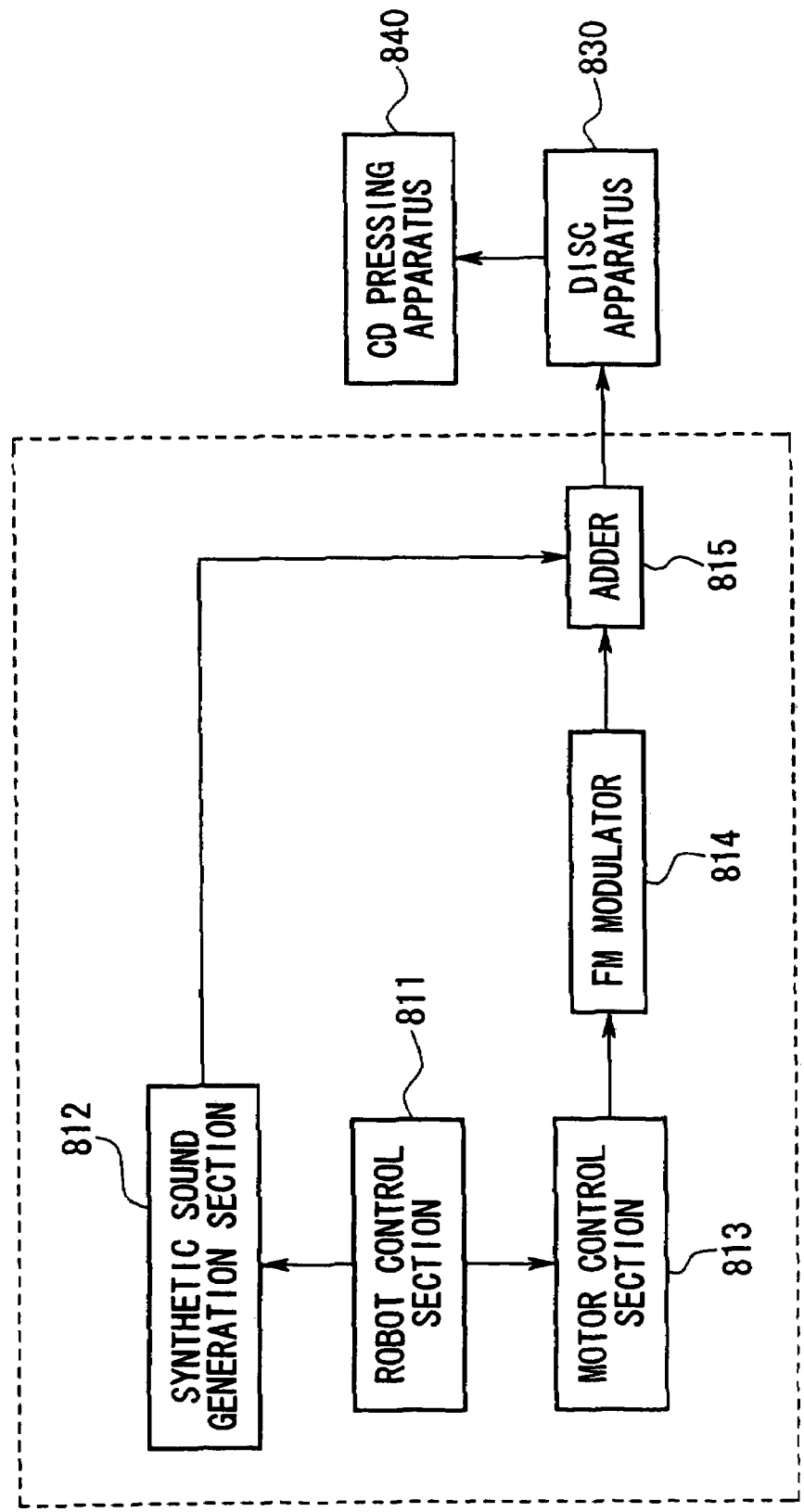
FIG. 57 is a diagram to explain a method of manufacturing a CD containing synthesized sound electrical signals in Embodiment 12.

FIG. 57, in the robotic system in Embodiment 12, is a diagram to show an example of the method of writing the synthesized sound electrical signal in a CD. The example of writing the synthesized sound electrical signal in the CD will be explained with reference to FIG. 57.

The structures of the robot control section 811, synthetic sound generation section 812, motor control section 813, FM modulator 817, adder 815, are the same as the structures inside the personal computer 810 in Embodiment 10, and their explanations are omitted. The synthesized sound signal generated in the syntheses sound generation section 812 and the FM modulated wave modulated by the FM modulator 817 serving as the robot operation signal FM are multiplexed in the adder 815 and becomes the synthesized sound electrical signal. This synthesized sound electrical signal is stored once in the disc apparatus 830. The stored data are quantized at 16-bits and are sampled at 44.1 KHz.

Sampled data can be duplicated by pressing using a pressing apparatus 840 as in normal musical CD to manufacture the CD containing the synthesized sound electrical signals.

Embodiment 13

Next, Embodiment 13 will be explained with reference to the diagrams in FIGS. 58 and 59.

The overall configuration of the robotic system in Embodiment 13 is the same as that in Embodiment 9, and will be explained using FIG. 45. The robotic system is comprised by a personal computer (computer system) 801 and the robot 802, which are connected by the audio line (audio signal input means) 803. The robot 802 is able to oscillate the neck using the servo motor housed internally, and is able to emit sounds into the air space using the internal speaker. Here, the audio line 803 has an audio line L (left) channel 803L and an audio line R (right) channel 803R.

Figure 58:
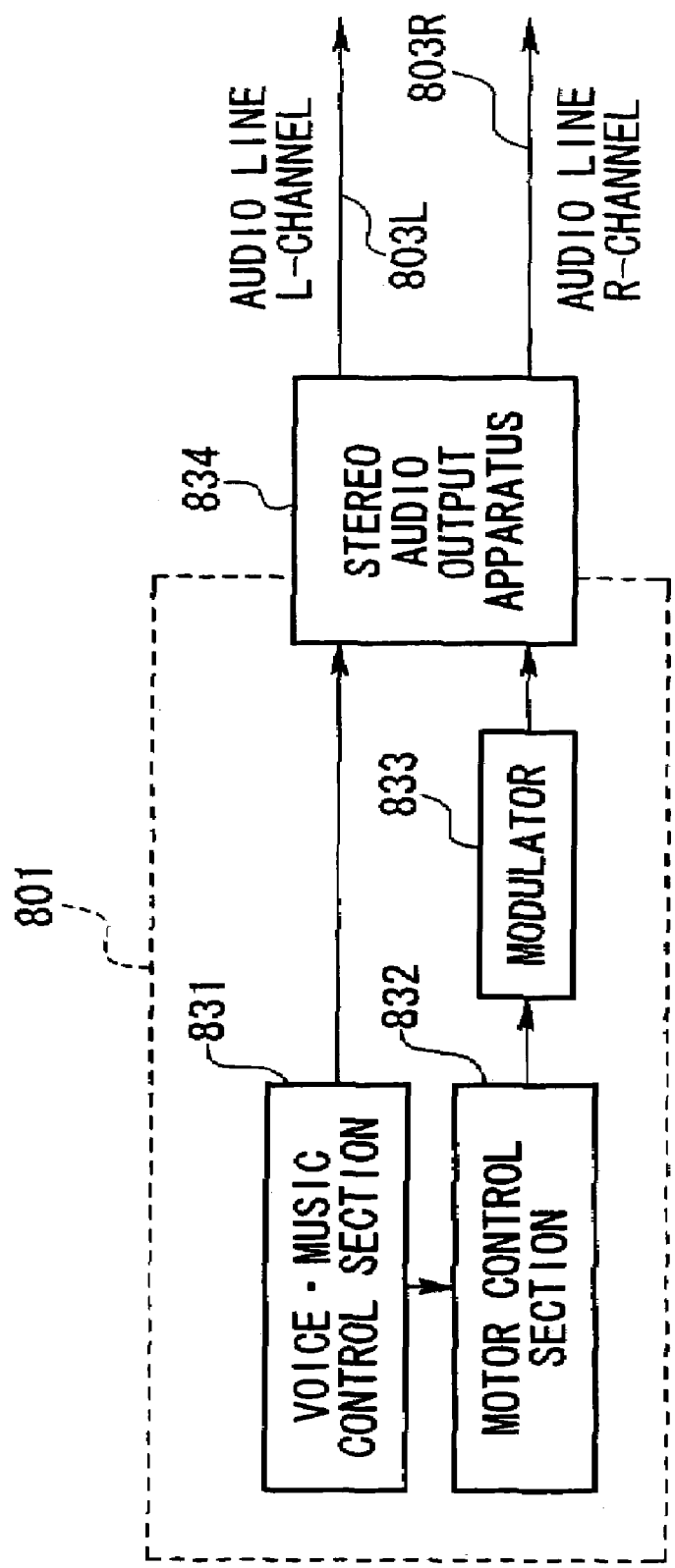
FIG. 58 is a block diagram of the function on the robot side in a robotic system in Embodiment 13.

FIG. 58 is a function block diagram, on the sending side, that is, the personal computer 801 side. The personal computer 801 is comprised by a voice•music control section (audible sound generation means) 831, a motor control section 832, a modulator (audio signal generation means) 833, and a stereo audio-output apparatus (audio signal outputting means) 834. The stereo audio outputting apparatus 834 has two channels, an L-channel and an R-channel, for outputting audio signals.

FIG. 59 is a function block diagram, on the receiving side, that is, the robot 802 side. The robot 802 is comprised by a speaker (broadcasting means) 835, a demodulator (robot operation signal reproducing means) 836, a motor drive section 837, and a servo motor (drive means) 838.

Next, the flow of signal will be explained with reference to FIGS. 58 and 59. First, the personal computer 801, which is the sending side, the voice•music control section 831 generates an audible sound signal of voice or music, and outputs this audible sound signal to the stereo audio control section 834 as well as to the motor control section 832. The motor control section 832 generates a motor rotation angle command signal from the audible sound signal input from the voice•music control section 831, and outputs it to the modulator 833. The modulator 833 modulates or encodes the motor rotation angle command signal input from the motor control section 832 to generate an audio signal, and output it to the stereo audio outputting apparatus 834. Here, the method of generating audio signal in the modulator 833 may include various methods such as AM modulation, FM modulation, PM modulation, PC modulation and the like. The carrier frequency of the modulated wave may be any frequency, but it is preferable to choose frequency regions that are inaudible to human ears.

Then, the stereo audio outputting apparatus 834 sends the audible sound signal input from the voice•music control section 831 to the robot 802 from the audio signal outputting L-channel through the audio line L-channel 803L, and at the same time, sends the audio signal input from the modulator 833 for driving the motor to the robot 802 from the audio signal outputting R-channel through the audio line R-channel 803R.

The robot 802, which is the receiving side, emits the audible sound signal input by way of the audio line L-channel 803 into the air space through the speaker 835. Therefore, the person is able to hear the sound or music emitted from the speaker 835.

In the meantime, the audio signal input through the audio line R-channel 803R is input in the demodulator 836, and the demodulator 836 demodulates or decodes the audio signal to reproduce the motor rotation angle command signal, and output it to the motor drive section 837. The motor drive section 837 generates a servo motor command signal to drive the servo motor, and outputs it to the servo motor 838. Thus, the servo motor 838 rotates to the rotation angle preset by the sending side (personal computer 801) according to the servo motor command signal, and oscillates the neck of the robot 802.

As explained above, according to the robotic system in Embodiment 13, it is possible to communicate between the personal computer 801 and the robot 802 by transmitting the audible sound signal through the audio line L-channel 803L and the robot operation signal through the audio line R-channel 803R, so that there is no need for a dedicated operation signal line. Therefore, the robotic system can be simplified and the cost lowered. Also, because the signal line for operating the robot does not need to be dedicated in the personal computer 801, while the robot 802 is being operated, scanner, terminal adapter, printer and the like can also be operated simultaneously.

Also, in Embodiments 9~11, an audible sound signal and a robot operation signal are synthesized in the personal computer 801 to generate a synthesized sound electrical signal, and this synthesized sound electrical signal is transmitted to the robot 802 through the audio line 803 and others, and in robot 802, the robot operation signal is separated and extracted from the received synthesized sound electrical signal, and using the extracted robot operation signal the servo motor 826 is driven, so that it is necessary to provide synthesizing means for synthesizing the synthesized sound electrical signal and separating extracting means for separating and extracting the robot operation signal from the synthesized sound electrical signal, but in Embodiment 13, the audible sound signal and the robot operation signal are communicated independently so that the synthesizing means or separating extracting means become unnecessary, and the system is simplified.

Embodiment 14

In Embodiment 14 to be explained next, the present invention is applied to a system for advertisement and sales promotion.

FIG. 60 is a block diagram to show the structure of the system in Embodiment 14. This system, originated by a retailer's request or through a service offered by an advertising agent, embeds coupon information in a commercial message broadcast by voice only, or a commercial message broadcast by voice and image by a broadcasting station using the data hiding technique and the like, and the consumer receiving this message obtains an incentive such as discount from the retailer by accumulating points from the coupons.

As shown in FIG. 60, advertising agent has a synthesizing apparatus 904 that can embed digital information other than the voice sound in the voice sound, using the data hiding technique and the like. Also, this advertising agent is provided with a web server 921 and a consumer database 922.

Also, the broadcasting station has a program sending apparatus 905 and a transmitter 906.

Also, the consumer has a receiving antennae 908 for receiving broadcasts sent from the sending antennae 907, a receiver 909, an extraction apparatus 910 for extracting information embedded in the voice sound, and a personal computer 911.

Also, the retailer has a terminal for receiving and viewing the information that is accumulated in the consumer database 922.

Next, the flow of the signal in the present embodiment will be explained. The retailer produces a commercial message 901 for advertising own company, and request an advertising agent to embed coupon information in the commercial message 901, and broadcast this embedded commercial message. Upon receiving the request, the advertising agent side produces coupon data 902 for the commercial message, and using a synthesizing apparatus 904, embeds a signal (digital signal) 2 based on coupon data 902 in the audible sound signal 1 in the commercial message 901, and outputs it as the synthesized sound electrical signal 3. Here, because the synthesizing apparatus 904 synthesizes using the data hiding technique, a listener cannot recognize signal 2 in the synthesized sound output from the synthesizing apparatus 904.

Coupon data 902 contains, at least, sending discrimination information for identifying dispatching of the commercial message, sending date and time, effective period of the coupon, and coupon point information.

The synthesized sound electrical signal 3 is sent out according to broadcasting schedule by the program sending apparatus 905 in the broadcasting station, modulated in the transmitter 906, and is sent out from the sending antennae 907 as electrical waves. At the consumer side, based on the voice sound received in the receiving antennae 908 and demodulated in the receiver 909, signal 2 is extracted by the extraction apparatus 910, and the extracted signal is forwarded to the personal computer 911. The personal computer is provided with dedicated software, and the coupon data 902 is reproduced by executing this software, and the coupon points are accumulated.

As the points are accumulated, the consumer can receive an incentive equal to the saved points by accessing the web server 921. In this case, communication between the personal computer 911 and the web server 921 is performed through the Internet, for example. The web server 921 receives the coupon data accumulated by this consumer from the consumer side, and after checking its legitimacy by matching with the original coupon data 902, writes the point data of this consumer in the consumer database. Here, because the web server 921 checks the sending discrimination information contained in the coupon data 902, when the consumer side makes an request to accumulate points using a non-existent sending discrimination information or to accumulate points more than two times for the same sending discrimination information, such requests can be denied.

Accordingly, information on the points written in the consumer database 922 and an effective period of a point can be inspected using a terminal 923 provided in the retailer, and based on this, the retailer awards the consumer a special incentive such as price discount.

According to the present embodiment, because the consumer can not only enjoy the process of accumulating the points for obtaining incentives but the consumer also becomes actively interested in searching for broadcast commercial messages, so that the effect of advertising is increased, leading to enhanced sales.

Here, the present embodiment relates to business transactions between retailer and consumer, but the present invention is not limited to this, it is possible to utilize the sales promotional system to all types of business transactions among any parties.

The processes described above may be performed by recording application programs for performing the processes, and loading and executing the programs in a computer system to synthesize signals, transmit the synthesized signals, extract the signal from the synthesized sound, and to exercise various types of controls using the extracted signal. "Computer system", in this context, includes any OS (operating systems) and peripheral hardwares.

Computer-readable recording media include portable media such as floppy disks, opto-magnetic disks, ROM, CD-ROM, as well as fixed memory devices such as hard disks housed in computer systems. Further, computer-readable recording media include those that hold programs for a given length of time, such as volatile memories (RAM) contained internally in computers for servers and client computer systems used in transmitting application programs through networks such as the Internet or communication lines of telephone circuits.

The above programs may be transmitted from the computer system storing such programs in a memory device and the like to other computer systems through a transmission medium or by transmission waves through the transmission medium.

Here, a transmission medium for transmitting programs refer to a medium having a capability to transmit information such as networks (communication networks) represented by the Internet or communication lines represented by telephone circuits.

Application programs may perform a part of the described functions. Further, they may be operated in conjunction with pre-recorded programs already stored in computer systems to provide differential files (differential programs).

So far, various embodiments of the present invention have been described with reference to the diagrams, but the specific structures are not limited to those exemplified, and includes designs that can be included within a range of the essence of the present invention.

What is claimed is:

1. A method for transmitting acoustic signals, comprising:
   electrically synthesizing an audible sound signal and an insertion signal so as to generate a synthesized sound electrical signal;
   converting the synthesized sound electrical signal and outputting an acoustic signal externally;
   receiving and re-converting the acoustic signal into a re-converted synthesized sound electrical signal;
   extracting the insertion signal from the re-converted synthesized sound electrical signal, said insertion signal being code information corresponding to a character string in a natural language; and
   controlling a sound generation machine according to the insertion signal extracted in said extracting, the sound generation machine pronouncing the character string in a natural language corresponding to the code information.

2. The method of claim 1, wherein said controlling is performed using a command.

3. A method for transmitting acoustic signals, comprising:
   electrically synthesizing an audible sound signal and an insertion signal so as to generate a synthesized sound electrical signal;
   converting the synthesized sound electrical signal and outputting the acoustic signal;
   sending the synthesized sound electrical signal via a transmission path;
   receiving the synthesized sound electrical signal,
   extracting the insertion signal from the received synthesized sound electrical signal, the insertion signal being a code information corresponding to a character string in a natural language; and
   controlling sound generation machine according to the extracted insertion signal, the sound generation machine pronouncing the character string in a natural language corresponding to the code information.

4. The method of claim 3, wherein said controlling is performed using a command.

5. A method for transmitting acoustic signals, comprising:
   electrical synthesizing an audible sound signal and an insertion signal into a plurality of synthesized sound electrical signals through a plurality of channels;
   converting each of the plurality of synthesized sound electrical signals into an acoustic signal in a respective channel;
   outputting externally each of the acoustic signal in the respective channel;
   sending each of the synthesized sound electrical signals in the respective channel through a corresponding transmission path;
   receiving the plurality of synthesized sound electrical signals in individual channels;
   extracting the insertion signal from the received synthesized sound electrical signals; and
   controlling an operation of a machine using the extracted insertion signal such that the machine operates in synchronization with the audible sound signal, wherein
   the machine is a robot,
   the audible sound signal is a music signal, and
   the robot is controlled so as to dance in synchronization with the music signal.

6. An apparatus for receiving a radio signal which is generated by modulating with a synthesized sound electrical signal, said synthesized sound electrical signal being generated by electrically synthesizing an audible sound signal and an insertion signal, said apparatus for receiving a radio signal comprising:
   a demodulating apparatus for demodulating the radio signal to generate the synthesized sound electrical signal;
   an acoustic signal outputting apparatus for converting the synthesized sound electrical signal into an acoustic signal and outputting the acoustic signal;
   an extracting apparatus for extracting the insertion signal from the synthesized sound electrical signal demodulated by the demodulating apparatus; and
   a control apparatus for controlling an apparatus by the insertion signal extracted by the extraction apparatus,
   wherein said demodulating apparatus and said acoustic signal outputting apparatus and said extraction apparatus are installed in an automotive vehicle, and said control apparatus controls a car navigation apparatus.

7. The apparatus of claim 6, wherein said data associated with the broadcast contents includes at least one of:
   a name;
   a telephone number;
   location information; and
   information on a uniform resource locator (URL).

8. The apparatus of claim 6, wherein said control apparatus further register the data associated with the broadcast contents in a target district information database.

9. The apparatus of claim 8, wherein said control apparatus is capable of registering data in response to a user's instruction.

10. The apparatus of claim 6, wherein said extracting apparatus is capable of starting extracting the insertion signal in response to a user's instruction.

11. The apparatus of claim 6, wherein
    said audible sound signal represents a broadcast content of a program or a commercial message,
    said insertion signal includes data associated with the broadcast content, and
    said control apparatus controls so as to store the data in the car navigation apparatus.

12. A method for receiving a radio signal which is generated by modulating with a synthesized sound electrical signal, said synthesized sound electrical signal being generated by electrically synthesizing an audible sound signal and an insertion signal, said method for receiving a radio signal comprising:
    demodulating the radio signal to generate the synthesized sound electrical signal;
    converting the synthesized sound electrical signal into an acoustic signal and outputting the acoustic signal;
    extracting the insertion signal from the synthesized sound electrical signal demodulated in said demodulating; and
    controlling an apparatus by the insertion signal extracted by said extracting,
    wherein said demodulating, said converting, said outputting, and said extracting are performed in an automotive vehicle, and in said controlling, a car navigation apparatus is controlled by the insertion signal.

13. The method of claim 12, wherein said data associated with the broadcast contents includes at least one of:
a name;
a telephone number;
location information; and
information on a uniform resource locator (URL).

14. The method of claim 12, wherein said controlling includes:
registering the data associated with the broadcast contents in a target district information database.

15. The method of claim 14, wherein said controlling further includes:
registering data in response to a user's instruction.

16. The method of claim 12, wherein said extracting includes:
starting extracting the insertion signal in response to a user's instruction.

17. The method of claim 12 wherein
said audible sound signal represents a broadcast content of a program or a commercial message,
said insertion signal includes data associated with the broadcast content, and
said controlling includes storing the data associated with the broadcast content in the car navigation apparatus.

18. A program storage device readable by a machine, tangibly embodying a program of instructions executable by the machine to perform a method for receiving a radio signal which is generated by modulating with a synthesized sound electrical signal, said synthesized sound electrical signal being generated by electrically synthesizing an audible sound signal and an insertion signal, said method for receiving a radio signal comprising:
demodulating the radio signal to generate the synthesized sound electrical signal;
converting the synthesized sound electrical signal into an acoustic signal and outputting the acoustic signal;
extracting the insertion signal from the synthesized sound electrical signal demodulated in said demodulating; and
controlling an apparatus by the insertion signal extracted by said extracting,
wherein said demodulating, said converting, said outputting, and said extracting are performed in an automotive vehicle, and in said controlling, a car navigation apparatus is controlled by the insertion signal.

19. The program storage device of claim 16, wherein said data associated with the broadcast contents includes at least one of:
a name;
a telephone number;
location information; and
information on a uniform resource locator (URL).

20. The program storage device of claim 16, wherein said controlling includes:
registering the data associated with the broadcast contents in a target district information database.

21. The program storage device of claim 20, wherein said controlling further includes:
registering data in response to a user's instruction.

22. The program storage device of claim 18, wherein said extracting includes:
starting extracting the insertion signal in response to a user's instruction.

23. The program storage device of claim 18, wherein
said audible sound signal represents a broadcast content of a program or a commercial message,
said insertion signal includes data associated with the broadcast content, and
said controlling includes storing the data associated with the broadcast content in the car navigation apparatus.

* * * * *

UNITED STATES PATENT AND TRADEMARK OFFICE
CERTIFICATE OF CORRECTION

| | |
|---|---|
| PATENT NO. | : 7,657,435 B2 |
| APPLICATION NO. | : 11/200288 |
| DATED | : February 2, 2010 |
| INVENTOR(S) | : Satoshi Iwaki et al. |

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 1213 days.

Signed and Sealed this

Third Day of August, 2010

David J. Kappos
*Director of the United States Patent and Trademark Office*